United States Patent
Long et al.

(10) Patent No.: US 8,537,912 B2
(45) Date of Patent: Sep. 17, 2013

(54) EXTREMELY HIGH SPEED BROADBAND ACCESS OVER COPPER PAIRS

(75) Inventors: Guozhu Long, Fremont, CA (US); Amir H. Fazlollahi, San Jose, CA (US); Liming Fang, Shenzhen (CN); Yuchen Jia, Sihui (CN)

(73) Assignee: Futurewei Technologies, Inc., Plano, TX (US)

( * ) Notice: Subject to any disclaimer, the term of this patent is extended or adjusted under 35 U.S.C. 154(b) by 309 days.

(21) Appl. No.: 13/034,353

(22) Filed: Feb. 24, 2011

(65) Prior Publication Data

US 2012/0219085 A1 Aug. 30, 2012

(51) Int. Cl.
*H04K 1/10* (2006.01)

(52) U.S. Cl.
USPC ........... 375/260; 375/219; 375/220; 375/257; 375/267; 375/295; 375/299; 375/316; 375/340; 375/347; 455/101; 455/132; 455/500; 455/562.1; 370/272; 370/273; 370/276; 370/297; 370/334; 370/464; 370/480; 341/173; 341/180; 379/93.01

(58) Field of Classification Search
USPC .................. 375/260, 219, 220, 257, 267, 295, 375/299, 316, 340, 347; 455/101, 132, 500, 455/562.1; 370/272, 273, 276, 297, 334, 370/464, 480; 341/173, 180; 379/93.01
See application file for complete search history.

(56) References Cited

U.S. PATENT DOCUMENTS

| 5,534,912 | A * | 7/1996 | Kostreski ...................... 725/106 |
| 6,507,608 | B1 | 1/2003 | Norrell |
| 2008/0071848 | A1 | 3/2008 | Baireddy et al. |

FOREIGN PATENT DOCUMENTS

EP 2091196 A1 8/2009

OTHER PUBLICATIONS

ITU-T, Very high speed digital subscriber line transceiver 2 (VDSL2), Access Network, Feb. 2006, ITU-T, G.933.2, pp. 26-35, and 216-220.*
K-micro, "Home Networking Analog Front End IC," Kawasaki Microelectronics Confidential, KHN11200, 1 page.

* cited by examiner

*Primary Examiner* — Leon Flores
(74) *Attorney, Agent, or Firm* — Conley Rose, P.C.; Grant Rodolph; Clint Wilkins

(57) ABSTRACT

Disclosed is an apparatus that includes a plurality of parallel digital signal transmitters that each receive one of a plurality of digital sub-signals wherein each of the plurality of digital signal transmitters is configured to transmit one of the plurality of digital sub-signals that each have about the same bandwidth. The apparatus also includes a combiner coupled to the transmitters and configured to shift some of the plurality of digital sub-signals and to combine the plurality of shifted digital sub-signals into a combined digital signal that has a total bandwidth of that is approximately equal to the sum of the bandwidths of the plurality of digital sub-signals. The total bandwidth comprises a plurality of shifted bandwidths of the plurality of digital sub-signals at about the same offset with respect to each other. The combined digital signal is transmitted over a digital subscriber loop.

12 Claims, 39 Drawing Sheets

EXTREMELY HIGH SPEED BROADBAND ACCESS OVER COPPER PAIRS

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Digital Subscriber Line (DSL) technology is a broadband access technology that enables fast data transmissions to and from customer's premises over traditional telephone copper wires. Widely used DSL technologies include Asymmetric Digital Subscriber Line (ADSL) and Very High Speed Digital Subscriber Line (VDSL) technologies. Typically, ADSL technology is used at frequencies up to about two megahertz (MHz) and line distances up to about 6000 meters. VDSL technology is used at frequencies up to about 30 MHz and line distances up to about 1,500 meters. ADSL has evolved into VDSL as fiber optic lines have been increasingly deployed from provider distribution sites closer to customer premises. Currently, advanced VDSL (VDSL2) can provide bidirectional communications at about 100 megabits per second (Mbit/s) data rate in each direction using about 30 MHz bandwidth. In recent years, the access range for DSL has become shorter as the fiber optic lines have extended deeper towards user locations. The reduction in copper loop lengths allows using substantially wider frequency bandwidth than 30 MHz and thus higher data rates for broadband communications over copper wires.

SUMMARY

In one embodiment, the disclosure includes an apparatus. The apparatus includes a plurality of parallel digital signal transmitters, e.g., DSL transmitters, that each receive one of a plurality of digital sub-signals wherein each of the plurality of digital signal transmitters is configured to transmit one of the plurality of digital sub-signals that each have about the same bandwidth. The apparatus also includes a combiner coupled to the transmitters and configured to shift some of the plurality of digital sub-signals and to combine the plurality of shifted digital sub-signals into a combined digital signal that has a total bandwidth of the plurality of digital sub-signals, wherein the total bandwidth of the combined digital signal is approximately equal to the sum of the bandwidths of the plurality of digital sub-signals. The total bandwidth comprises a plurality of shifted bandwidths of the plurality of digital sub-signals at about the same offset with respect to each other. The combined digital signal is transmitted over a digital subscriber loop.

In another embodiment, the disclosure includes a network component. The network component includes a splitter configured to split a received digital signal that has an extended bandwidth into a plurality of digital sub-signals within the extended bandwidth. The splitter is further configured to shift at least some of the plurality of digital sub-signals such that each of the plurality of shifted digital sub-signals comprises substantially a same lowest frequency band. The received digital signal is received from a local loop at least partially comprising an electrically conducting waveguide. The network component further includes a plurality of digital signal receivers each configured to receive one of the plurality of the shifted digital sub-signals at a substantially similar lowest frequency band. Additionally, the network component includes a data stream bonding circuit coupled to the digital signal receivers. The extended bandwidth comprises a plurality of shifted bandwidths of the digital signals at about the same offset with respect to each other.

In yet another embodiment, the disclosure includes a method. The method includes transmitting a plurality of digital sub-signals at about the same bandwidth and shifting the digital signals in frequency such that each of the plurality of digital sub-signals comprises a different bandwidth and an offset between successive shifted digital sub-signals is about the same with respect to other successive shifted digital sub-signals. The method further includes combining the shifted digital sub-signals to form a combined digital signal that has an extended bandwidth; and transmitting the combined digital signal over a digital subscriber loop.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
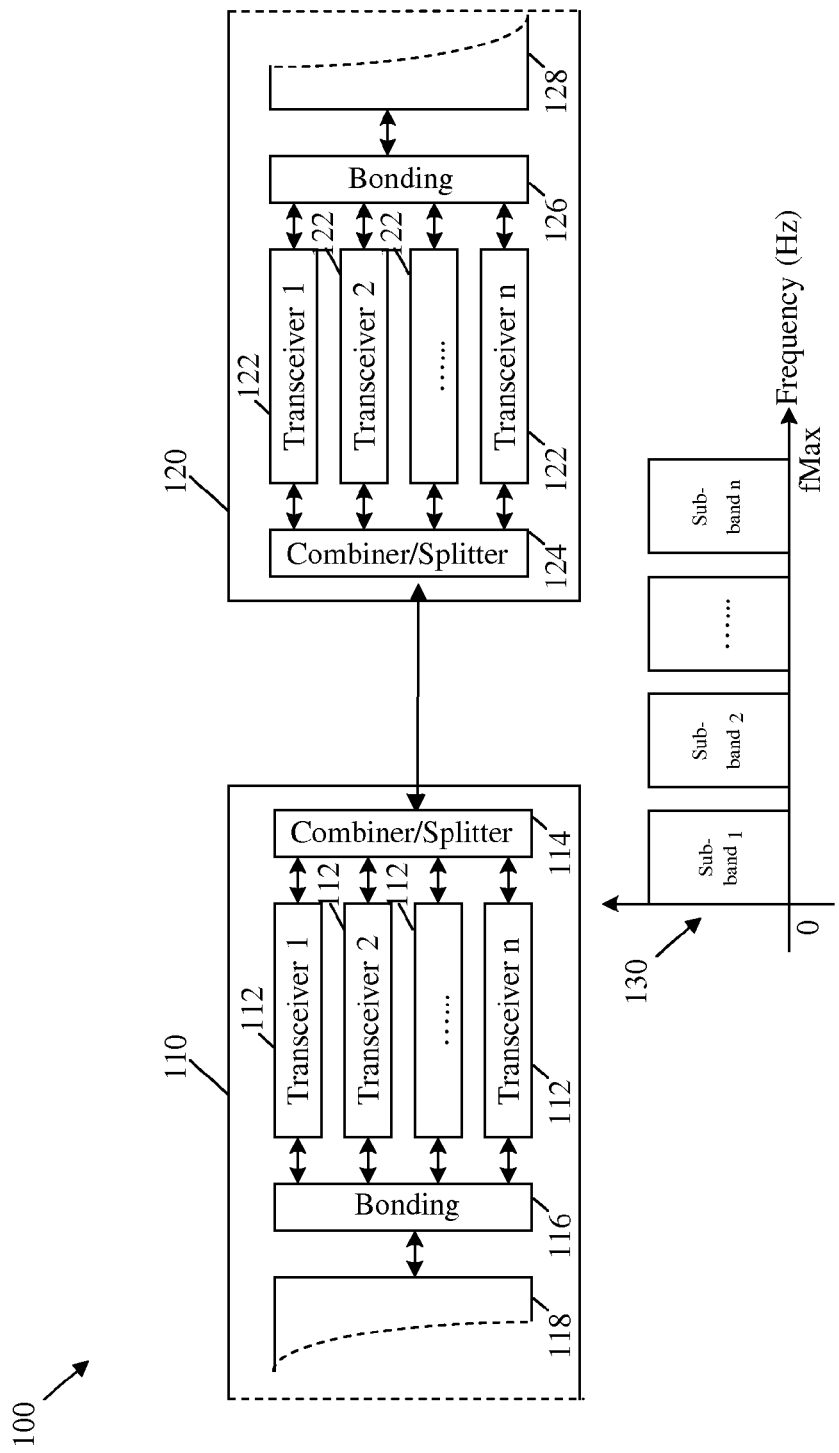
FIG. 1 is a schematic diagram of an embodiment of a multi-transceiver system.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

For relatively smaller distances between customer premises and distribution sites, e.g., less than about 200 meters, the usable frequency range for DSL signals may increase, e.g., to substantially beyond 30 MHz, which may allow substantially high access speeds. Some current techniques may be used for increasing the DSL data rate on copper pairs. Dynamic Spectrum Management (DSM) Layer Three (L3) vectoring crosstalk cancellation is one technique that may be used with VDSL2 based transceivers, where the far-end crosstalk levels may be reduced to improve performance by coordinating the signals of different users. The degree of improvement may depend on the channel characteristics. Another technique is multi-pair bonding, which may use multiple DSL lines to carry a single asynchronous transfer mode (ATM)-based stream or Ethernet-based stream. Another technique is the "phantom mode" or "SuperMIMO mode", where, in addition to the regular physical copper pairs, virtual pairs may be generated from multiple twisted-pairs using common mode or other technologies. As such, in some embodiments, the total number of channels may be increased from original N physical pairs to up to 2N−1 pairs, which may about double the data rate.

Disclosed herein are systems and methods for increasing the DSL bandwidth and achieving substantially higher data rates for relatively short access distances, such as less than or equal to about 200 meters. The copper loop usable bandwidth may be increased beyond about 30 MHz to about 100 MHz or more and the aggregated data rates may be extended to about one gigabits per second (Gbit/s). The frequency band may be separated into a plurality of sub-bands, which may be handled using a plurality of corresponding transmitters, receivers, or transceivers and may be combined using frequency band shifting techniques. Each sub-band may be handled by a typical transmitter/receiver, such as, for example, a DSL transmitter/receiver, which may be coupled in parallel to one or more similar transmitters/receivers. Each sub-band may also comprise one or more upstream and/or downstream sub-bands (e.g., for transmission and/or reception). Each typical transmitter/receiver may, for example, be capable of handling about 30 MHz bandwidth, such as a VDSL2 transmitter/receiver. The total bandwidth of the multi-transceiver system may be about equal to the sum of the sub-bands, which may allow a substantially higher data rate in comparison to the case of a single transceiver. The sub-bands may be combined and/or separated in the time domain in either the digital domain or the analog domain; or in the frequency domain in the digital domain. The multi-transceiver scheme may also be implemented for multi-pair DSL systems that comprise a plurality of physical pairs which may create a plurality of additional virtual pairs.

FIG. 1 illustrates an embodiment of a multi-transceiver system 100 that may be used to provide substantially high speed access over traditional copper wires. The multi-transceiver system 100 may be used for high speed access on short loops, e.g., less than about 200 meters in length, over single or multi-pair copper wires. At this short access range, the usable bandwidth may be substantially higher than 30 MHz, which may be the maximum frequency of previous or current DSL technologies. The multi-transceiver system 100 may comprise a first multi-transceiver 110 that may be located at a XDSL remote terminal unit at operator end (XTU-O) and a second multi-transceiver 120 that may be located at customer premise, i.e., remote site (XTU-R). The first multi-transceiver 110 and the second multi-transceiver 120 may be coupled to each other via a single pair or multi-pair copper wire. For instance, the first multi-transceiver 110 may correspond to a VDSL Transceiver Unit at an Optical Network Unit (VTU-O) and the second multi-transceiver 120 may correspond to a VDSL Transceiver Unit at a Remote Terminal (VTU-R).

The first multi-transceiver 110 may comprise a plurality of transceivers 112, a combiner/splitter 114, a data stream bonding circuit 116, and one or more additional processing circuitry 118. The transceivers 112 may be arranged in parallel and positioned between the combiner/splitter 114 and the data stream bonding circuit 116. The additional processing circuitry 118 may be coupled to the data stream bonding circuit 116. The components of the first multi-transceiver 110 may be arranged as shown in FIG. 1. Each transceiver 112 may comprise a transmitter and a receiver configured to send and receive a DSL signal at about the same DSL bandwidth. For instance, the transceiver 112 may be a standard VDSL2 transceiver that has a bandwidth of about 30 MHz.

The combiner/splitter 114 may be a signal processing circuit configured to shift and combine a plurality of sub-bands for a plurality of transmitted sub-signals from the transceivers 112 into a total bandwidth for a combined signal in the copper wire, split the total bandwidth into the sub-bands, or both. The sub-bands of the sub-signals in the transceivers 112 may be shifted with respect to each other to form the total bandwidth for the multi-transceiver 112. The sub-signals may be shifted and combined in the time domain, such as using analog components or digital components, or in the frequency domain, as described in detail below. FIG. 1 shows a frequency band 130 for the multi-transceiver 110 (and similarly the multi-transceiver 120) that may extend from about zero MHz to a maximum frequency, fMax. The frequency band 130 may represent the total bandwidth and may comprise a plurality of n sub-bands, e.g., sub-band 1, sub-band 2 . . . , and sub-band n, for a plurality of n transceivers 112, where n is an integer. If the transceivers 112 have typical VDSL2 bandwidths, the total bandwidth of the multi-transceiver 110 may be greater than about 30 MHz. For example, fMax may be equal to about 100 MHz or about 200 MHz.

The data stream bonding circuit 116 may be configured to distribute the data stream to a plurality of sub-streams transmitted by sub-signals from the transmitters in transceivers 112 into a combined signal for processing; and combining sub-streams out of the receivers in transceivers 112 after splitting a received combined signal into a plurality of sub-signals for the receivers in transceivers 112. The additional data processing circuitry 118 may be configured for additional data processing. In one embodiment, the sub-signals may be modulated using discrete multi-tone (DMT) modulation. For example, the frequency band 130 may range from about zero MHz to about 100 MHz using a frequency spacing between sub-carriers, Δf, of about 4.3125 Kilohertz (KHz) or about 8.625 KHz. As such, there may be about 100e6/Δf total sub-carriers to be processed, e.g., about 23,188 sub-carriers in the case of about 4.3125 KHz frequency spacing and about 11,594 sub-carriers in the case of about 8.625 KHz frequency spacing. The Fast Fourier Transform (FFT)/Inverse FFT (IFFT) size may be greater than or equal to about 65,384 for about 4.3125 KHz frequency spacing and greater than or equal to about 32,768 for about 8.625 KHz frequency spacing. The frequency spacing may be further increased by increasing a symbol rate to reduce the FFT/IFFT size, and reducing time duration during which each FFT computation has to complete.

The second multi-transceiver 120 may comprise a plurality of second transceivers 122, a second combiner/splitter 124, a second data stream bonding circuit 126, and one or more second additional data processing circuitry 128. The components of the second multi-transceiver 120 may be arranged and configured similar to the corresponding components of the first multi-transceiver 110, and thus may provide similar signal functions. The components of the second multi-transceiver 120 may or may not comprise the same sub-components and/or circuitry to provide the corresponding functions. The sub-components and circuitry of the components in the first multi-transceiver 110 and/or the second multi-transceiver 120 are described in detail below.

Using a plurality of parallel transceivers with a combiner/splitter and a data stream bonding circuit in the multi-transceivers 110 and 120 may provide a substantially large bandwidth, e.g., greater than the VDSL2 maximum bandwidth, and thus substantially high communications data rates for relatively short distances between XTU-O and XTU-R. The multi-transceiver system 100 may be used instead of a single more complex transceiver at each of the XTU-O and XTU-R to provide substantially high data rates. For example, the more complex transceiver may comprise a more complex digital front end (DFE) or analog front end (AFE), which may not be currently commercially available or may have substantially high cost and/or complexity, and thus may not be feasible. For instance, the sampling clock for AFE may be at least equal to about 200 MHz if fMax is equal to about 100 MHz. For DFE, the FFT/IFFT size may be at least about 65,536, about 32,768, or about 16,384 for about 4.3125 KHz, about 8.625 KHz, or about 17.25 KHz frequency spacing, respectively. The quantity of tones that may be processed for echo cancellation, channel equalization, and/or other algorithms may be about 23,188, about 11,594, or about 5,797 for about 4.3125 KHz, about 8.625 KHz, or about 17.25 KHz frequency spacing, respectively. Other front-end circuits may also need to be modified due to the increase in frequency band compared to previous DSL technologies.

Figure 2:
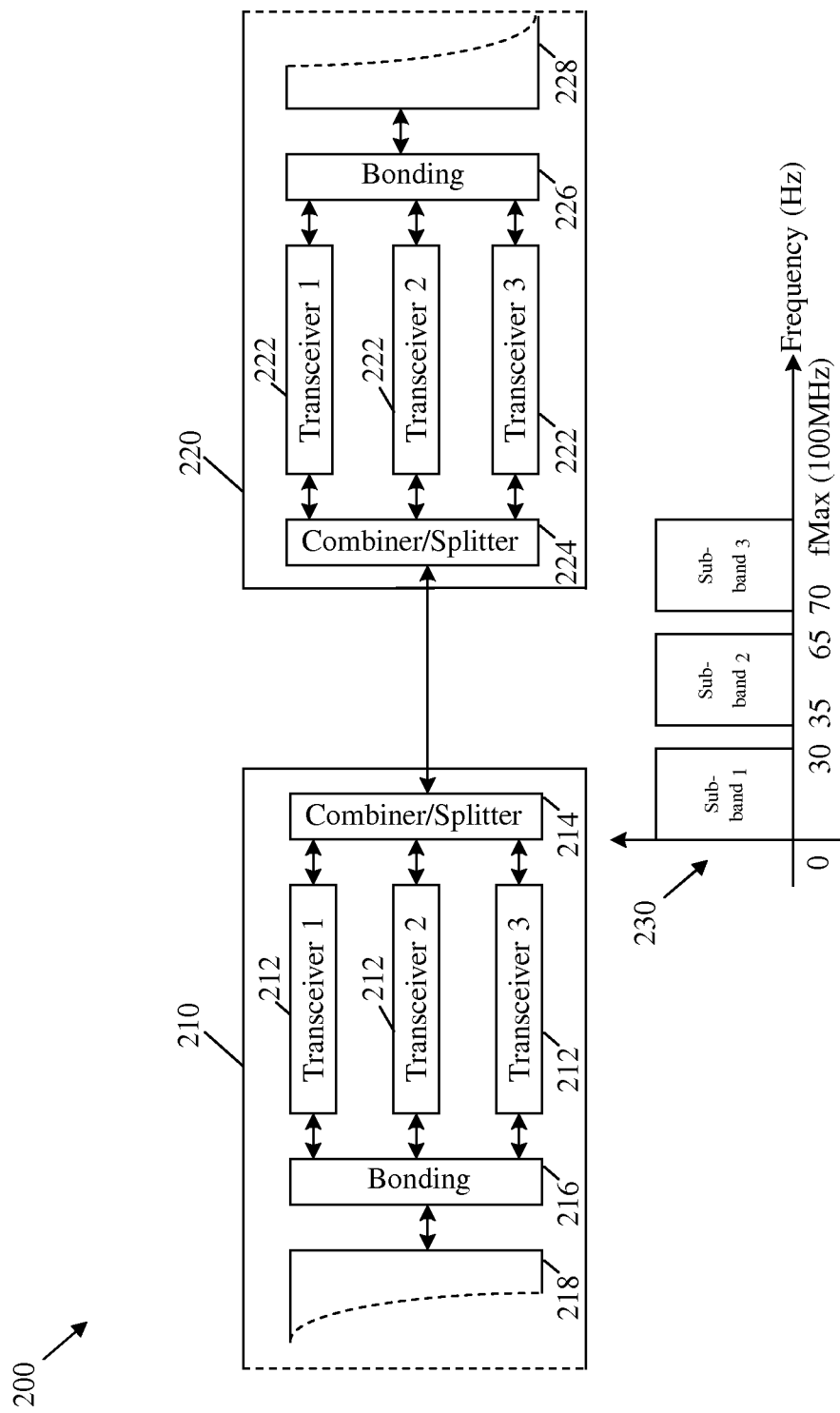
FIG. 2 is a schematic diagram of another embodiment of a multi-transceiver system.

FIG. 2 illustrates an embodiment of another multi-transceiver system 200 that may be configured substantially similar to the multi-transceiver system 100 and used to provide substantially high speed access over traditional copper wires. The multi-transceiver system 200 may comprise a first multi-transceiver 210, e.g., at CO, and a second multi-transceiver 220, e.g., at CPE. The two multi-transceivers 210 and 220 may be coupled to each other via a single pair or multi-pair copper wire. Specifically, the first multi-transceiver 210 and the second multi-transceiver 220 may be based on a VDSL2 design. Accordingly, each multi-transceiver may comprise about three VDSL2 transceivers in parallel that may each have about 30 MHz bandwidth.

The first multi-transceiver 210 may, for example, comprise about three transceivers 212 (labeled transceiver 1, transceiver 2, and transceiver 3), a combiner/splitter 214, a data stream bonding circuit 216, and one or more additional data processing circuitry 218. Similarly, the second multi-transceiver 220 may comprise about three second transceivers 222, a second combiner/splitter 224, a second data stream bonding circuit 226, and one or more second additional data processing circuitry 228. The components of the multi-transceivers 210 and 220 may be configured substantially similar to the corresponding components of the multi-transceiver system 100.

FIG. 2 shows a frequency band 230 for the multi-transceiver 210 (and similarly the multi-transceiver 220) that may extend from about zero MHz to a maximum frequency, fMax, of about 100 MHz. The frequency band 230 may represent the total bandwidth and may comprise about three shifted sub-bands of the three transceivers 212 and similarly the second transceivers 222. A first sub-band (sub-band 1) may range from about zero MHz to about 30 MHz, which may be a typical and non-shifted VDSL2 bandwidth. A second sub-band (sub-band 2) may range from about 35 MHz to about 65 MHz, which may be a typical VDSL2 bandwidth shifted by about 35 MHz. A third sub-band (sub-band 3) may range from about 70 MHz to about 100 MHz, which may be a typical VDSL2 bandwidth shifted by about 70 MHz. The sub-bands may also comprise a plurality of upstream and/or downstream sub-bands.

In the frequency band 230, a frequency spacing of about 8.625 KHz may be used in the three sub-bands and a guard band of about 5 MHz may be used between each two adjacent sub-bands. In another implementation, each sub-band may be extended to more than about 30 MHz, for example to about a 35 MHz range, without maintaining a guard band between the sub-bands. Alternatively, the width of the guard band maintained between the sub-bands may depend on the components and techniques used for combining and splitting the sub-bands in the multi-transceivers 210 and 220. The components and techniques may be implemented in the analog signal domain, the digital signal domain, or the frequency domain.

Figure 3:
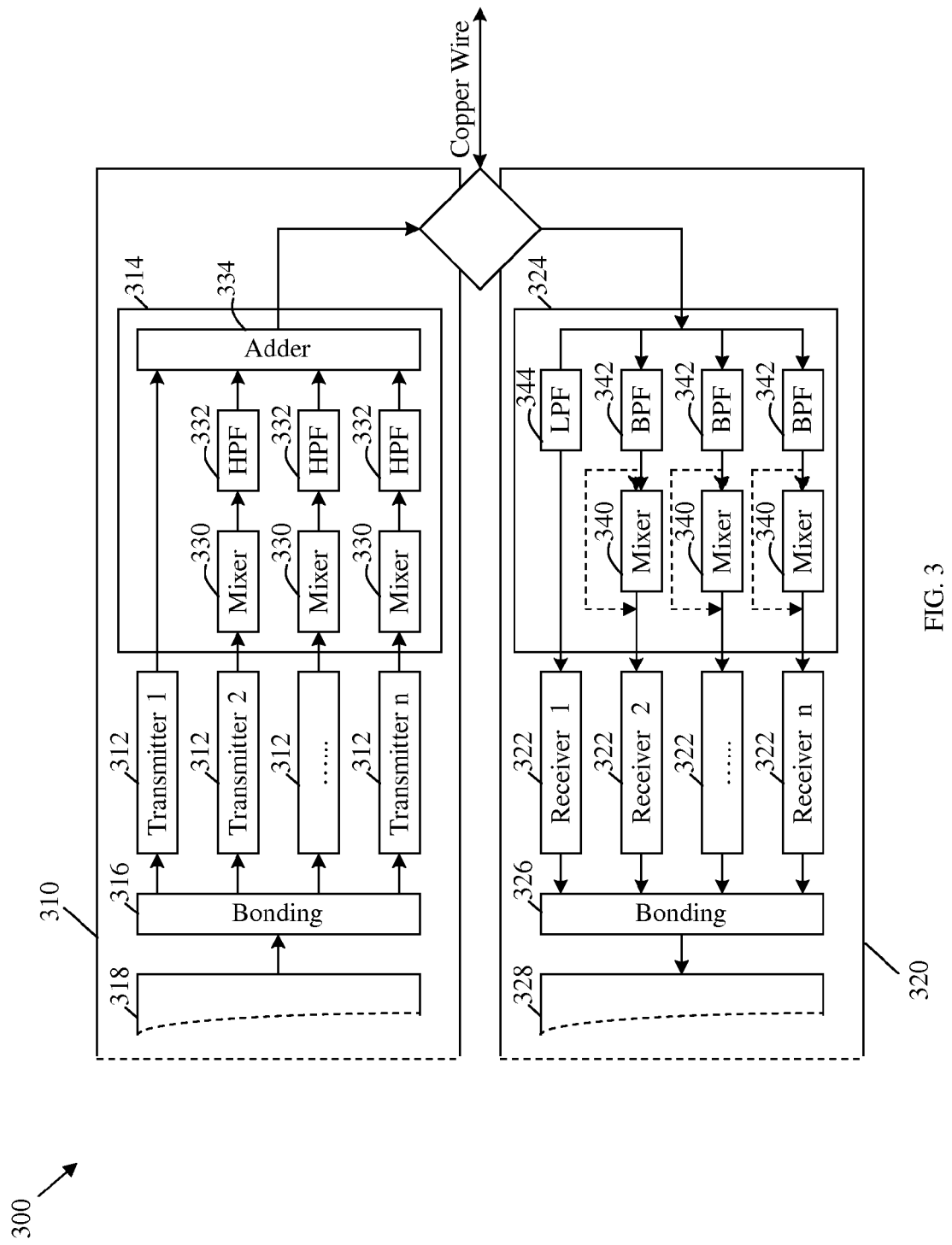
FIG. 3 is a schematic diagram of an embodiment of an analog multi-transceiver system.

FIG. 3 illustrates an embodiment of an analog combining/splitting multi-transceiver system 300 that may correspond to the multi-transceiver system 100. The analog combining/splitting multi-transceiver system 300 may be configured to shift, combine, and split a plurality of sub-bands using analog components and techniques in the time domain. The analog combining/splitting multi-transceiver system 300 may comprise a multi-transmitter 310 and a multi-receiver 320 that may be coupled to another multi-transceiver system (similar to multi-transceiver system 300, not shown in FIG. 3) via a single pair or multi-pair copper wires. The multi-transmitter 310 may transmit an analog signal, which may be received by the multi-receiver (similar to multi-receiver 320, not shown in FIG. 3) at the other end of the copper pair.

The multi-transmitter 310 may comprise a plurality of transmitters 312 in parallel, e.g., n transmitters (labeled transmitter 1, transceiver 2 . . . , and transmitter n), where n is an integer. The transmitters 312 may be positioned between a combiner 314 and a data stream bonding circuit 316. The multi-transmitter 310 may also comprise additional data processing circuitry 318. The components of the multi-transmitter 310 may be configured substantially similar to the corresponding components of the multi-transceiver 110, where the transmitters 312 may be used to transmit a plurality of sub-signals and the combiner 314 may shift and combine the sub-bands of the sub-signals.

The combiner 314 may be an analog combiner that comprises a plurality of analog signal processing components. The combiner 314 may comprise a plurality of parallel mixers 330 coupled to some of the transmitters 312, a plurality of parallel High Pass Filters (HPFs) 332 that correspond to the mixers 330, and an adder 334 coupled to the HPFs 332. The quantity of mixers 330 and similarly the quantity of HPFs 332 may be less than the quantity of transmitters 312 by about one. The adder 334 may also be coupled to one of the transmitters 312 that may not be coupled to a corresponding mixer 330 and corresponding HPFs 332. The components of the combiner 314 may be arranged as shown in FIG. 3.

The mixers 330 may be configured to shift up the sub-bands of the sub-signals from the corresponding transmitters 312 with respect to each other, e.g., by adding corresponding positive frequency shifts. Each sub-band may have about equal fixed bandwidth, e.g., about 30 MHz range, and may be shifted by a corresponding mixer 330 by an increment of a fixed offset bandwidth, e.g., about 30 or about 35 MHz. For example, a first sub-band (from transmitter 2) may be shifted up by about 30 or 35 MHz, a second sub-band (from transmitter 3) may be shifted up by about 60 or 70 MHz . . . , and a (n−1)-th sub-band (from transmitter n) may be shifted up by about n×30 or n×35 MHz. The HPFs 332 may be configured to filter the frequency spectrum of each of the shifted sub-bands from the corresponding mixers 320, e.g., to avoid overlapping between different sub-bands.

The adder 334 may be configured to combine the sub-signals by adding the shifted sub-bands to each other. The adder 334 may also add to the shifted sub-bands a non-shifted sub-band from the transmitter 312 that is not coupled to a mixer 330. The non-shifted sub-band may correspond to the lowest frequency band among the sub-bands. The sub-bands may be added to obtain a total bandwidth for a combined signal that comprises the sub-signals, which may be forwarded to the multi-receiver 320. For example, the shifted and filtered sub-bands from transmitter 2 to transmitter n may be added to a non-shifted sub-band from transmitter 1 that has an about equal bandwidth, e.g., that ranges from about zero MHz to about 30 MHz. The total bandwidth of the combined signal may correspond to the frequency band 130.

The multi-receiver 320 may comprise a plurality of receivers 322 in parallel, e.g., n receivers (labeled receiver 1, receiver 2 . . . , and receiver n), where n is the number of transmitters 312 in the multi-transmitter (similar to multi-transceiver 310, not shown in FIG. 3) at the other end of the copper pair. Each of the receivers 322 may correspond to and receive a sub-signal from one of the transmitters at the other end of the copper pair (similar to transmitter 312, not shown). The receivers 322 may be positioned between a splitter 324 and a second data stream bonding circuit 326. The multi-receiver 320 may also comprise additional data processing circuitry 328. The components of the multi-receiver 320 may be configured substantially similar to the corresponding components of the multi-transceiver 110, where the splitter 324 may split and reverse shift or shift down the sub-bands of the sub-signals before forwarding the sub-signals to the receivers 322.

The splitter 324 may be an analog splitter that comprises a plurality of analog signal processing components. The splitter 324 may comprise a plurality of parallel second mixers 340 coupled to some of the receivers 322, a plurality of parallel Band Pass Filters (BPFs) 342 that correspond to the second mixers 340, and a Low Pass Filter (LPF) 344 coupled to one of the receivers 322 that may not be coupled to a corresponding second mixer 340 and a corresponding BPF 342. Thus, the quantity of second mixers 340 and similarly the quantity of BPFs 342 may be less than the quantity of receivers 322 by about one. The components of the splitter 324 may be arranged as shown in FIG. 3.

The BPFs 342 may be configured to filter or pass through the shifted sub-bands of the sub-signals in the combined signal received from the multi-transmitter 310. The shifted sub-bands may correspond to the sub-bands received at the adder 334. The second mixers 340 may be configured to shift down the sub-bands to about the same frequency range by subtracting corresponding positive frequency shifts. The sub-bands may be shifted down to provide each corresponding receiver 322 about the same fixed sub-band, e.g., of about 30 MHz in range. For example, a first sub-band (for receiver 2) may be shifted down by about 30 or 35 MHz, a second sub-band (for receiver 3) may be shifted down by about 60 or 70 MHz . . . , and a (n−1)-th sub-band (for receiver n) may be shifted down by about n×30 or n×35 MHz. The LPF 344 may be configured to filter or pass through the non-shifted sub-band that corresponds to one of the transmitters at the other end of the copper pair (similar to transmitters 312, not shown) (e.g., transmitter 1) and provide the non-shifted sub-band to a corresponding receiver 322 (e.g., receiver 1). In another embodiment, the shifted sub-bands may be shifted down using under-sampling functions (indicated by the dashed arrow lines) instead of the second mixers 340 to provide about the same sub-band to the receivers 322.

Figure 4:
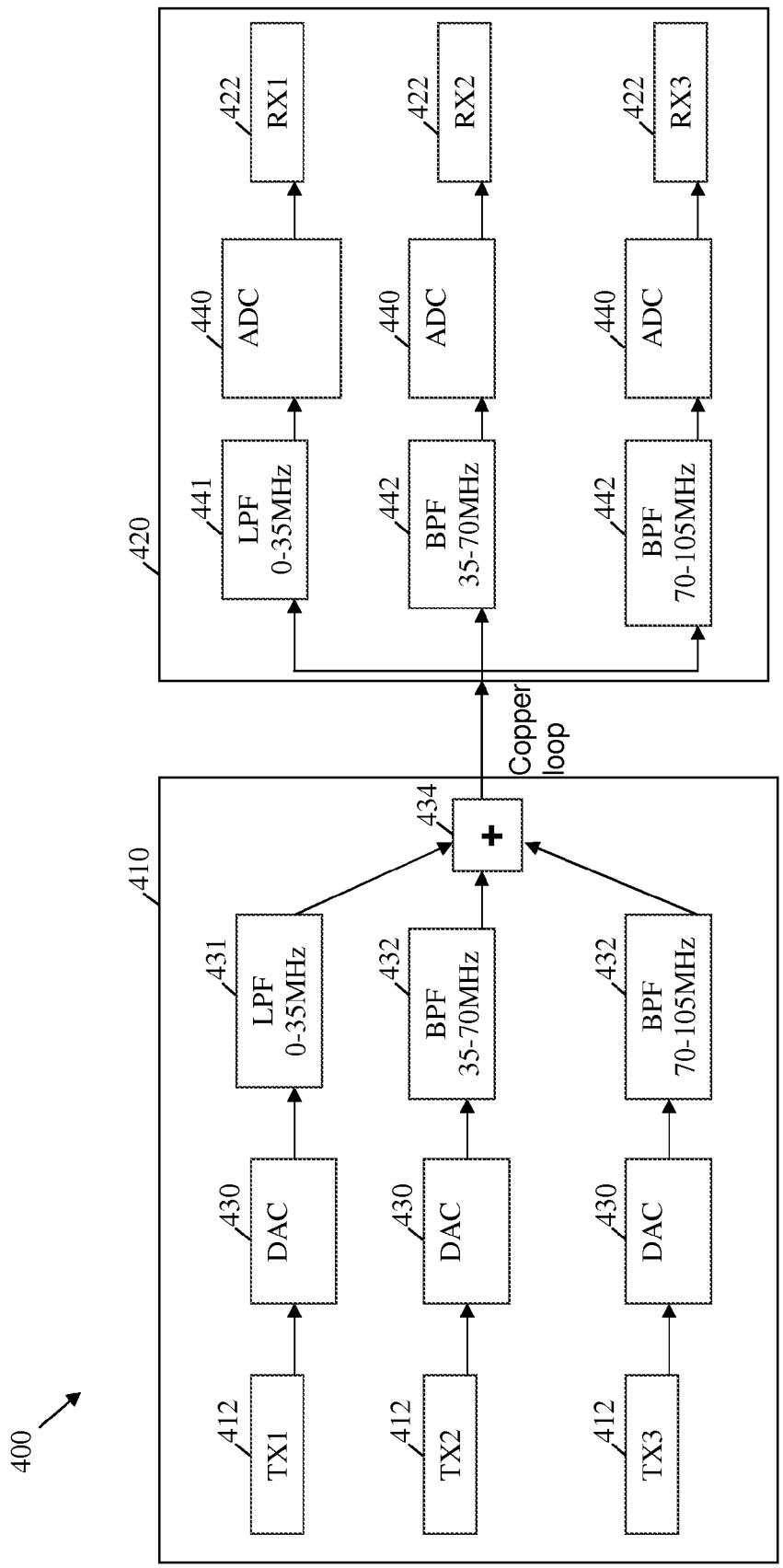
FIG. 4 is a schematic diagram of another embodiment of an analog multi-transceiver system.

FIG. 4 illustrates an embodiment of another analog multi-transceiver system 400 that may correspond to the multi-transceiver system 100. The analog multi-transceiver system 400 may be configured to shift, combine, and split a plurality of sub-bands using analog components and techniques in the time domain. The analog multi-transceiver system 400 may comprise a multi-transmitter 410 and a multi-receiver 420 that may be coupled to each other via a copper loop wire or loop. The multi-transmitter 410 may transmit an analog signal, which may be received by the multi-receiver 420.

The multi-transmitter 410 may be a VDSL2 based multi-transmitter and may comprise about three transmitters 412 in parallel (labeled TX1, TX2, and TX3), about three corresponding digital-to-analog converters (DAC)s 430, a LPF 431, about two BPFs 432, and an adder 434. The DACs 430, the LPF 431, the BPFs 432, and the adder 434 may be part of a combiner block that combines a plurality of sub-signals from the transmitters 412. The components of the multi-transmitter 410 may be arranged as shown in FIG. 4.

The transmitters 412 may be configured to transmit about three sub-signals, which may have about the same bandwidths. The DACs 430 may be configured to convert the sub-signals from digital sub-signals to analog sub-signals. The LPF 431 may be configured to filter or pass through one of the sub-signals at a lowest (non-shifted) sub-band. The BPFs 432 may be configured to filter or pass through the corresponding sub-signals with different corresponding shifted sub-bands (with respect to the non-shifted sub-band). The sub-bands may have about the same width and may be at fixed offsets with respect to each other. For instance, each sub-band may have about 35 MHz range, where a first sub-band may extend from about zero MHz to about 35 MHz, a second sub-band may extend from about 35 MHz to about 70 MHz, and a third sub-band may extend from about 70 MHZ to about 105 MHZ. The adder 434 may be configured to combine the sub-signals into a combined signal that has a total bandwidth equal to about the sum of the sub-bands.

The multi-receiver 420 may be a VDSL2 based multi-receiver and may comprise about three receivers 422 in parallel (labeled RX1, RX2, and RX3), about three corresponding analog-to-digital converters (ADCs) 440, a second LPF 441, and about two second BPFs 442. The ADCs 440, the second LPF 441, and the second BPFs 442 may be part of a splitter block that splits the combined signal from the multi-transmitter 410 into the sub-signals from the transmitters 412. The components of the multi-receiver 420 may be arranged as shown in FIG. 4.

The second LPF 441 may be configured to filter or pass through the lowest (non-shifted) sub-signal in the combined signal. The second BPFs 442 may be configured to filter or pass through the shifted sub-signals (with shifted sub-bands) in the combined signal. Thus, the second LPF 441 and the second BPFs 442 may forward the sub-signals that have about the same sub-bands as the sub-signals processed in the multi-transmitter 410 to the ADCs 440. The ADCS 440 may convert the corresponding sub-signals from analog signals to digital signals. The ADCs 440 may then send the corresponding sub-signals with the different sub-bands to the corresponding receivers 422.

Figure 5:
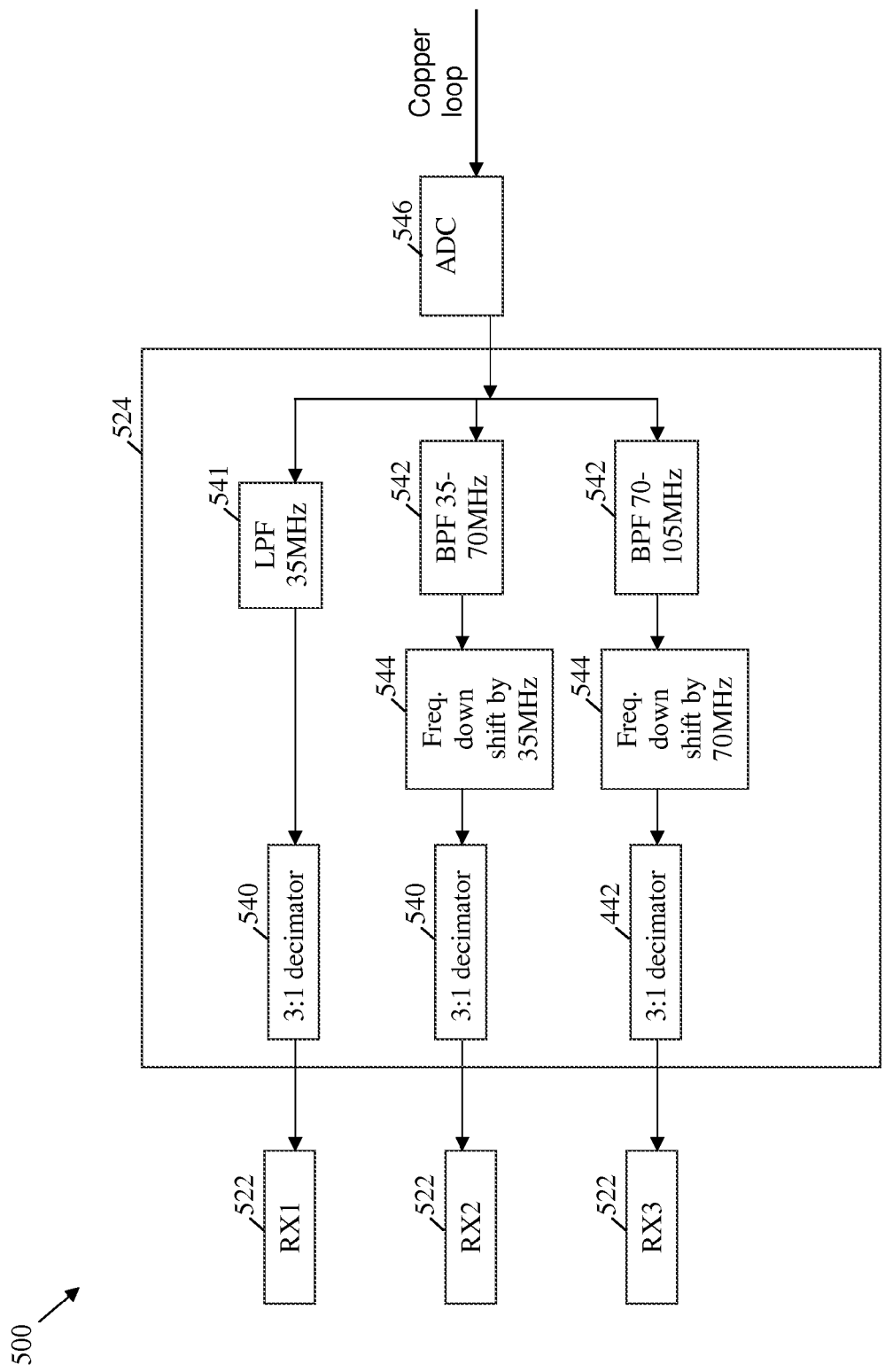
FIG. 5 is a schematic diagram of an embodiment of an analog multi-receiver.

FIG. 5 illustrates an embodiment of an analog multi-receiver 500 that may correspond to the multi-receiver 120. The analog multi-receiver 500 may be configured to split a received signal into a plurality of sub-signals with different sub-bands using analog components and techniques in the time domain. The analog multi-receiver 500 may be coupled to a multi-transmitter (not shown) via a copper loop and may receive an analog signal from the multi-transmitter. The analog multi-receiver 500 may be a VDSL2 based multi-receiver and may comprise about three receivers 522 in parallel (labeled RX1, RX2, and RX3), about three corresponding decimators 540, a LPF 541, about two BPFs 542, about two frequency down-shift blocks 544, and an ADC 546. The decimators 540, LPF 541, BPFs 542, and frequency down-shift blocks 544 may be part of a one-to-three splitter 524 positioned between the receivers 522 and the ADC 546. The components of the analog multi-receiver 500 may be arranged as shown in FIG. 5.

The ADC 546 may be configured to convert the signal received from the multi-transmitter from an analog signal to digital signal. The LPF 541 may be configured to filter or pass through the lowest (non-shifted) sub-signal in the received signal. The BPFs 542 may be configured to filter or pass through the shifted sub-signals (with shifted sub-bands) in the received signal. Thus, the LPF 541 and the BPFs 542 may provide about three sub-signals that have about the same sub-bands as the sub-signals processed in the multi-transmitter. Using one ADC in the analog multi-receiver 500 may reduce the PSD difference between the sub-bands. The frequency down-shift blocks 544 may be configured to shift down about two of the sub-bands by subtracting corresponding positive frequency shifts. The sub-bands may be shifted down to provide each corresponding receiver 522 about the same fixed sub-band, e.g., of about 30 MHz in range. Thus, the decimators 540 may receive about two sub-signals with non-shifted sub-bands from the frequency down-shift blocks 544 and one sub-signal with a non-shifted sub-band directly from the LPF 541. The decimators 540 may be three-to-one (3:1) decimators configured to reduce the sampling data rate in the sub-signals, e.g., to about a third of the received data rate, before sending the sub-signals to the receivers 522.

Figure 6:
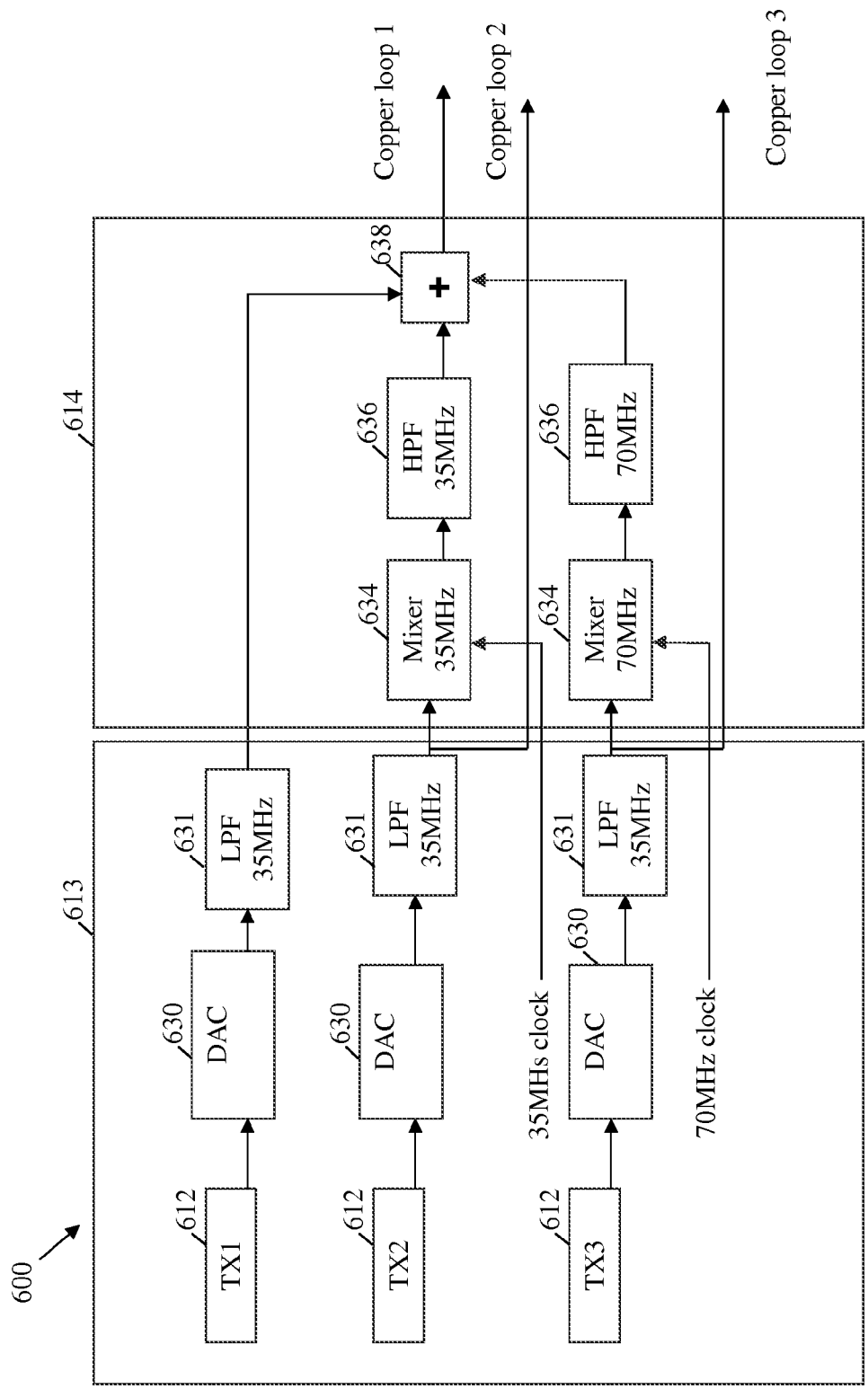
FIG. 6 is a schematic diagram of an embodiment of an analog multi-transmitter.

FIG. 6 illustrates an embodiment of an analog multi-transmitter 600 that may correspond to the multi-transmitter 110. The analog multi-transmitter 600 may be configured to shift and combine a plurality of sub-signals with different sub-bands using analog components and techniques in the time domain. The analog multi-transmitter 600 may be coupled to a multi-receiver (not shown) via a copper loop and may transmit an analog signal to the multi-receiver. The analog multi-transmitter 600 may be a VDSL2 based multi-transmitter and may comprise about three transmitters 612 in parallel (labeled TX1, TX2, and TX3), about three DACs 630, and about three LPFs 631. The analog multi-transmitter 600 may also comprise about two mixers 634 coupled to about two of the LPFs 631, about two corresponding HPFs 636, and an adder 638. The components of the analog multi-transmitter 600 may be arranged as shown in FIG. 6.

The transmitters 612 and DACs 630 may be part of a DFE or AFE chip 613 and may be configured substantially similar to the transmitters 422 and DACs 430, respectively. The LPFs 631 may be configured to pass though about three sub-signals with similar non-shifted sub-bands. The mixers 634, HPFs 636, and adder 638 may be part of a combiner block 614 and configured to shift and combine the sub-signals from the LPFs 631. The mixers 634 may be configured to shift up the sub-bands of two of the sub-signals. Each sub-band may have about equal fixed bandwidth, e.g., about 35 MHz range, and may be shifted by a corresponding mixer 634 by an increment of a fixed offset bandwidth, e.g., about 35 MHz. The HPFs 636 may be configured to filter the frequency spectrum of each of the shifted sub-bands from the corresponding mixers 634, e.g., to avoid overlapping between different sub-bands. The adder 638 may be configured to combine the sub-signals from the HPFs 636 and one of the LPFs 631 into a combined signal that has a total bandwidth equal to about the sum of the sub-bands. The combined signal may then be transmitted from the adder 638 on a first copper loop (Copper loop 1). In some embodiments, the analog multi-transmitter 600 may also transmit a sub-signal with non-shifted sub-band from one of the LPFs 631 on a second copper loop (Copper loop 2) and a second sub-signal with non-shifted sub-band from another LPF 631 on a third copper loop (Copper loop 3).

Figure 7:
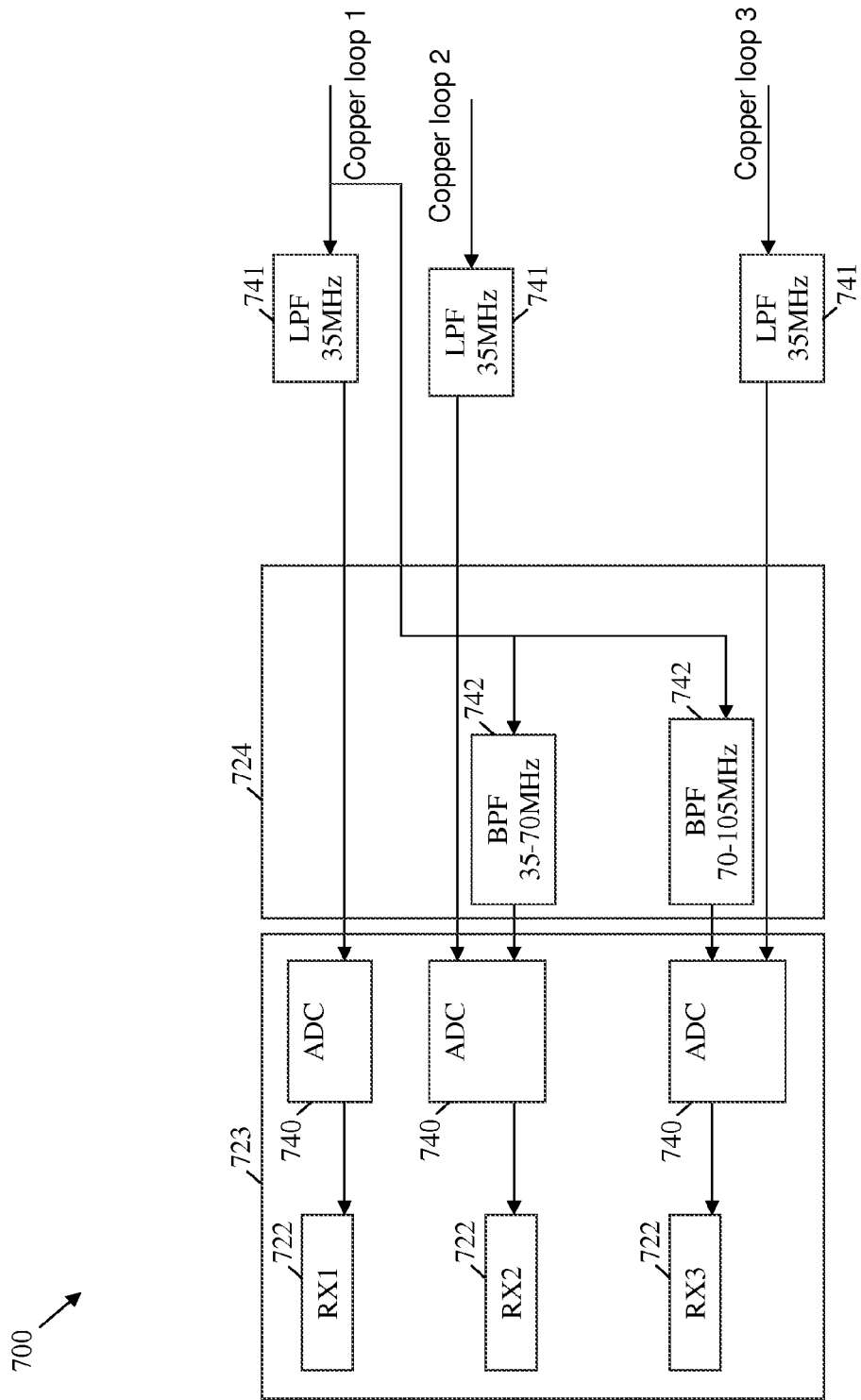
FIG. 7 is a schematic diagram of another embodiment of an analog multi-receiver.

FIG. 7 illustrates an embodiment of another analog multi-receiver 700 that may correspond to the multi-receiver 120. The analog multi-receiver 700 may be configured to split a received signal into a plurality of sub-signals with different sub-bands using analog components and techniques in the time domain. The analog multi-receiver 700 may be coupled to a multi-transmitter (not shown) via a copper loop and may receive an analog signal from the multi-transmitter. The analog multi-receiver 700 may be a VDSL2 based multi-receiver and may comprise about three receivers 722 in parallel (labeled RX1, RX2, and RX3), about three ADCs 740, about three LPFs 741, and about two BPFs 742. The receivers 722 and the ADCs 740 may be part of a DFE or AFE chip 723, and the BPFs 742 may be part of an analog filter 724. The components of the analog multi-transmitter 700 may be arranged as shown in FIG. 7.

The LPFs 741 may be configured to filter or pass through the sub-signal with the lowest sub-band (e.g., from about zero MHz to about 35 MHz) in the received signal to one of the ADCs 740. The sub-signal may be filtered from the received signal on a first copper loop (Copper loop 1). The BPFs 742 may be configured to filter or pass through about two sub-signals with shifted sub-bands (35-70 MHz and 70-105 MHz) in the received signal on the first copper loop. Thus, the ADCs 740 may receive about three sub-signals with three different sub-bands from the BPFs 742 and one of the LPFs 741. The ADCS 740 may be configured to convert the received sub-signals from analog sub-signals to digital sub-signals and send the sub-signals to the receivers 722. In some embodiments, a second LPF 741 and a third LPF 741 may filter or pass through a second sub-signal and a third sub-signal with the same lowest sub-band (e.g., from about zero MHz to about 35 MHz) to a second ADC 740 and a third ADC 740, respectively. The second LPF 741 and the third LPF 741 may receive the second sub-signal and the third sub-signal on a second copper loop (Copper loop 2) and a third copper loop (Copper loop 3), respectively.

Figure 8:
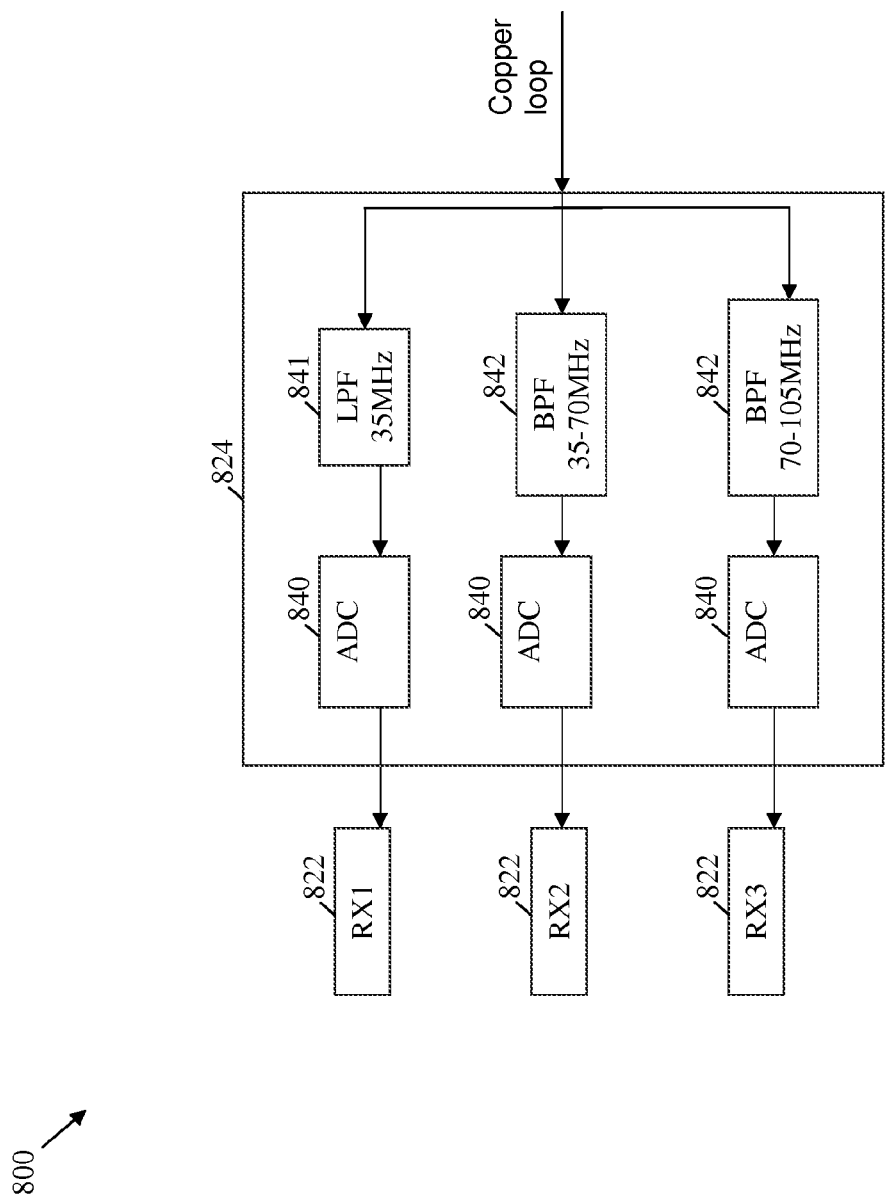
FIG. 8 is a schematic diagram of another embodiment of an analog multi-receiver.

FIG. 8 illustrates an embodiment of an analog multi-transceiver 800 that may correspond to the multi-receiver 120. The analog multi-receiver 800 may be configured to split a received signal into a plurality of sub-signals with different sub-bands using analog components and techniques in the time domain. The analog multi-receiver 800 may be coupled to a multi-transmitter (not shown) via a copper loop and may receive an analog signal from the multi-transmitter. The analog multi-receiver 800 may be a VDSL2 based multi-receiver and may comprise about three receivers 822 in parallel (labeled RX1, RX2, and RX3), about three ADCs 840, an LPF 841, and about two BPFs 842. The ADCs 840, LPF 841, and BPFs 842 may be part of a one-to-three splitter 824. The components of the analog multi-receiver 800 may be arranged as shown in FIG. 8.

The LPF 841 may be configured to filter the received combined signal and pass through a sub-signal with the lowest sub-band, e.g., below about 35 MHz. The BPFs 842 may be configured to pass through a second sub-signal with a first shifted sub-band, e.g., between about 35 MHz and about 70 MHz, and a second sub-signal with a second sub-band, e.g., between about 75 MHs and about 105 MHz. The ADCs 840 may be configured to convert the sub-signals from analog to digital signals and send the sub-signals to the receivers 822 for processing. Using three ADCs to convert the three sub-signals may allow for greater PSD difference between the sub-bands.

Figure 9:
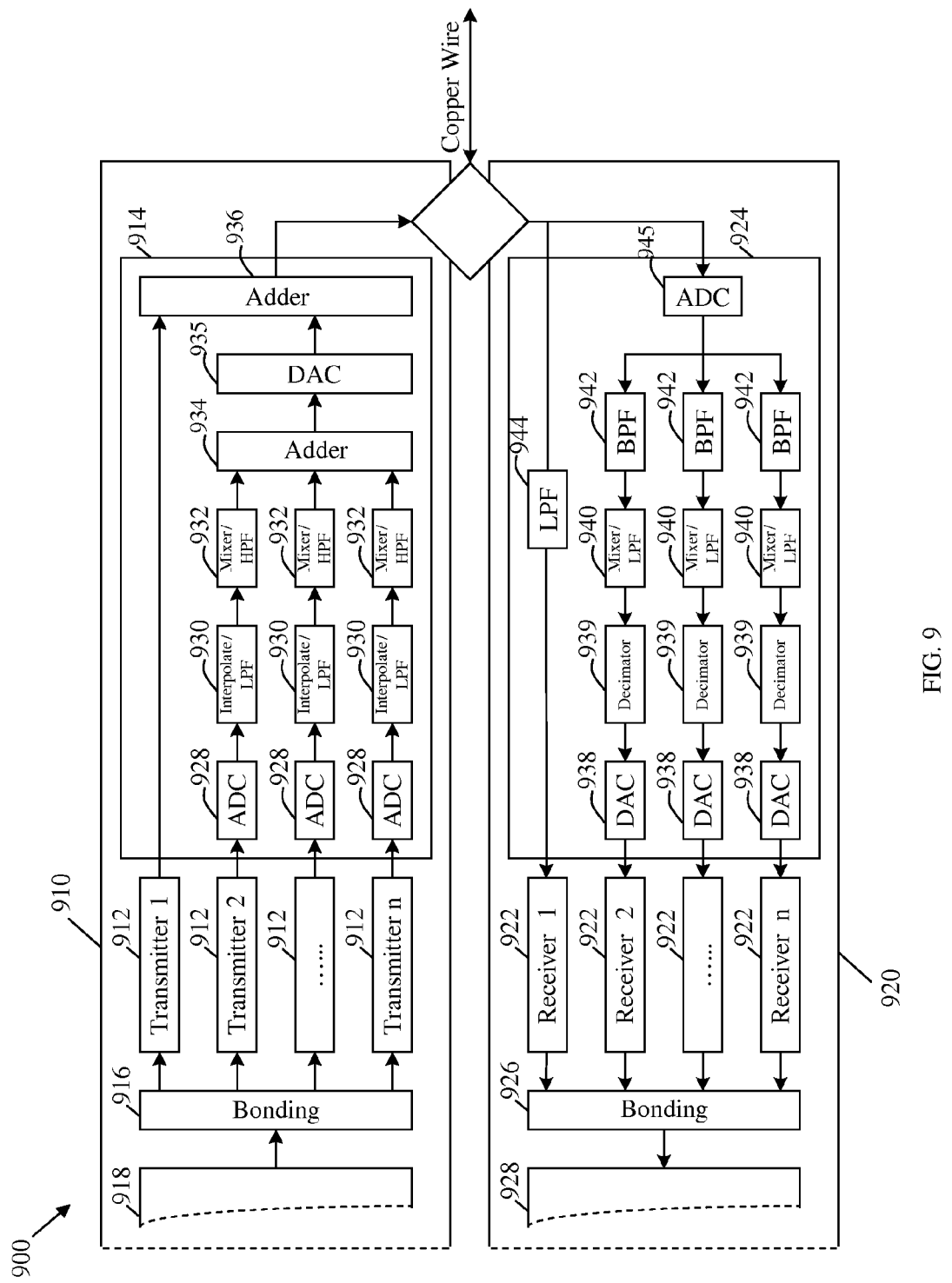
FIG. 9 is a schematic diagram of an embodiment of a digital multi-transceiver system.

FIG. 9 illustrates an embodiment of a digital multi-transceiver system 900 that may correspond to the multi-transceiver system 100. The digital multi-transceiver system 900 may be configured to shift, combine, and split a plurality of sub-bands using digital components and techniques in the time domain. The digital multi-transceiver system 900 may comprise a multi-transmitter 910 and a multi-receiver 920 that may be coupled to each other via a single pair or multi-pair copper wire. The multi-transmitter 910 may transmit an analog signal, which may be received by the multi-receiver 920.

The multi-transmitter 910 may comprise a plurality of transmitters 912 in parallel, e.g., n transmitters (labeled transmitter 1, transceiver 2 . . . , and transmitter n), where n is an integer. The transmitters 912 may be positioned between a combiner 914 and a signal bonding circuit 916. The multi-transmitter 910 may also comprise additional processing circuitry 918. The components of the multi-transmitter 910 may be configured substantially similar to the corresponding components of the multi-transceiver 110, where the transmitters 912 may be used to transmit a plurality of sub-signals and the combiner 914 may shift and combine the sub-bands of the sub-signals.

The combiner 914 may be a digital combiner that comprises a plurality of digital signal processing components. The combiner 914 may comprise a plurality of parallel ADCs 928, a plurality of parallel interpolator and LPF (interpolate/LPF) blocks 30, a plurality of parallel mixer and HPF (mixer/HPF) blocks 932, and adder 934, a DAC 935, and a second adder 936. The quantity of ADCs 928 and similarly the quantity of interpolate/LPF bocks 929 and mixer/HPF blocks 930 may be less than the quantity of transmitters 912 by about one. The second adder 936 may be coupled to the parallel components via the DAC 935 and the adder 934 and may also be coupled to one of the transmitters 912 that may not be coupled to a corresponding ADC 928, interpolator/LPF block 930, and mixer/HPF block 932. The components of the combiner 914 may be arranged as shown in FIG. 9.

The ADCs 928 may be configured to convert the corresponding sub-signals from the transmitters 912 from analog to digital signals. Each interpolator/LPF blocks 930 may comprise an interpolator configured to interpolate the corresponding sub-signal data rate to the DAC 935 sampling speed and a LPF configured to filter the sub-signal. Each mixer/HPF block 932 may comprise a mixer configured to shift up the sub-band of the corresponding sub-signal, e.g., by adding a corresponding positive frequency shift, e.g., similar to the mixers 330, and a HPF configured to filter the frequency spectrum of the shifted sub-band. The adder 934 may be configured to combine sub-signals with the shifted sub-bands from other mixer/HPF blocks 932. The DAC 935 may be configured to convert the combined signal from the adder 934 from digital to analog signal. The adder 936 may be configured to add the analog combined signal to an analog sub-signal with a non-shifted sub-band from the transmitter 912 that is not coupled to a corresponding ADC 928, interpolator/LPF block 930, and mixer/HPF block 932. The non-shifted sub-band may correspond to the lowest frequency band among the sub-bands. The final combined signal may have a total bandwidth that comprises all the sub-bands of the sub-signals. For example, the total bandwidth of the combined signal may correspond to the frequency band 130.

The multi-receiver 920 may comprise a plurality of receivers 922 in parallel, e.g., n receivers (labeled receiver 1, receiver 2 . . . , and receiver n), where n is the number of transmitters 912 in the multi-transmitter 910. Each of the receivers 922 may correspond to and receive a sub-signal from one of the transmitters 912. The receivers 922 may be positioned between a splitter 924 and a second signal bonding circuit 926. The multi-receiver 920 may also comprise additional processing circuitry 928. The components of the multi-receiver 920 may be configured substantially similar to the corresponding components of the multi-transceiver 110, where the splitter 924 may split and reverse shift the sub-bands of the sub-signals before forwarding the sub-signals to the receivers 922.

The splitter 924 may be a digital splitter that comprises a plurality of digital signal processing components. The splitter 924 may comprise a plurality of parallel second DACs 938, a plurality of parallel decimators 939, a plurality of parallel mixer and LPF (mixer/LPF) blocks 940, a LPF 944, a plurality of BPFs 942, and a second ADC 945. The quantity of second DACs 938 and similarly the quantity of decimators 939, mixer and LPF blocks 940, and BPFs 942 may be less than the quantity of receivers 922 by about one. The second ADC 945 may be coupled to the copper wire and to some of the receivers 922 via the parallel components. The LPF 941 may be coupled to the copper wire (in parallel to the second ADC 945) and to one of the receivers 922 that is not coupled to a second DAC 938, decimator 939, mixer and LPF block 940, and BPF 942. The components of the splitter 924 may be arranged as shown in FIG. 9.

The second ADC 945 may be configured to convert a received combined signal that comprises a plurality of sub-signals from analog to digital signal. The LPF 941 may be configured to filter or pass through the non-shifted sub-band from one of the transmitters 912 (e.g., transmitter 1) to provide the non-shifted sub-band to a corresponding receiver 922 (e.g., receiver 1). The BPFs 942 may be configured to filter or pass through the shifted sub-bands of the sub-signals in the combined signal received from the multi-transmitter 910. Each mixer and LPF block 940 may comprise a mixer configured to shift down a corresponding sub-band by subtracting a corresponding positive frequency shift, and a LPF configured to filter the sub-signals. The sub-bands may be shifted down and filtered to provide each corresponding receiver 922 about the same fixed sub-band, e.g., of about 30 MHz in range. The decimators 939 may be configured to adjust the corresponding sub-signals data rates and the second DACs 938 may be configured to convert the sub-signals from digital to analog signals before sending the sub-signals to the corresponding receivers 922.

Figure 10:
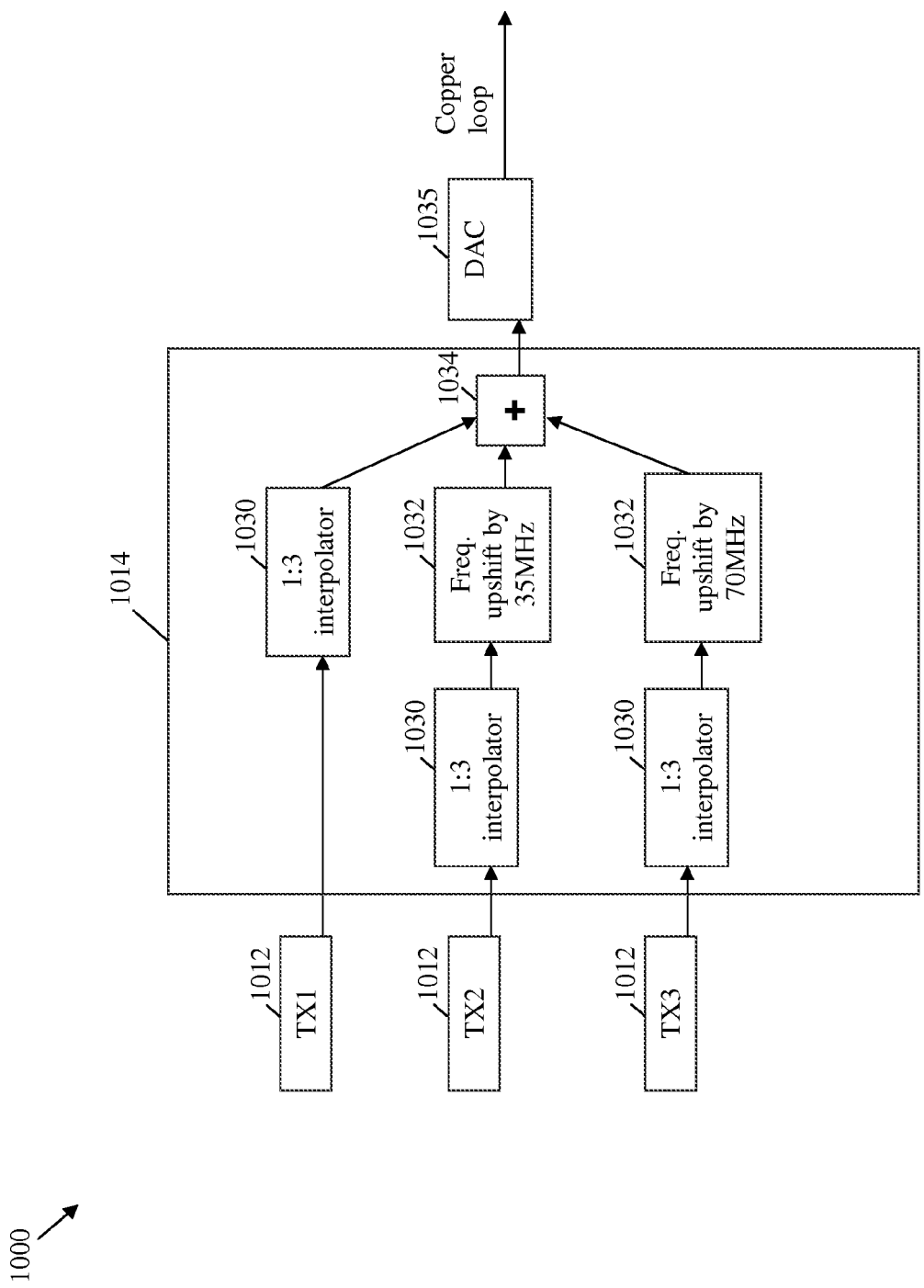
FIG. 10 is a schematic diagram of an embodiment of a digital multi-transmitter.

FIG. 10 illustrates an embodiment of a digital multi-transmitter 1000 that may correspond to the multi-transmitter 110. The digital multi-transmitter 1000 may be configured to shift and combine a plurality of sub-signals with different sub-bands using digital components and techniques in the time domain. The digital multi-transmitter 1000 may be coupled to a multi-receiver (not shown) via a copper loop and may transmit an analog signal to the multi-receiver. The digital multi-transmitter 1000 may be a VDSL2 based multi-transmitter and may comprise about three transmitters 1012 in parallel (labeled TX1, TX2, and TX3), about three interpolators 1030, about two frequency up-shift blocks 1032, an adder 1034, and a DAC 1035. The interpolators 1030, the frequency up-shift blocks 1032, and the adder 1034 may be part of a three-to-one combiner 1014 positioned between the transmitters 1012 and the DAC 1035. The components of the digital multi-transmitter 1000 may be arranged as shown in FIG. 10.

The transmitters 1012 may be configured to transmit about three sub-signals that may have about the same sub-bands, as described above. The interpolators 1030 may be configured to interpolate the data rates of the corresponding sub-signals' data rates to the DAC's 1035 sampling speed. The interpolators 1030 may be 1:3 interpolators that increase the data rate by a ratio of one-to-three. The frequency up-shift blocks 1032 may be configured to up-shift the frequency range of the corresponding sub-signals from the interpolators 1030 by corresponding offsets. A first frequency up-shift block 1032 may add a frequency shift of about 35 MHz to one of the sub-signals and a second frequency up-shift block 1032 may as a frequency shift of about 75 MHz to another sub-signal. The adder 1034 may be configured to combine the sub-signals from the frequency up-shift blocks 1032 and one of the interpolators 1030 into a combined signal that has a total bandwidth equal to about the sum of the sub-bands. The sub-signal received directly by the adder 1034 from the interpolator 1030 may have a non-shifted sub-band with the lowest frequencies. The DAC 1035 may convert the combined signal from the adder 1034 from digital to analog and transmit the signal on the copper loop.

Figure 11:
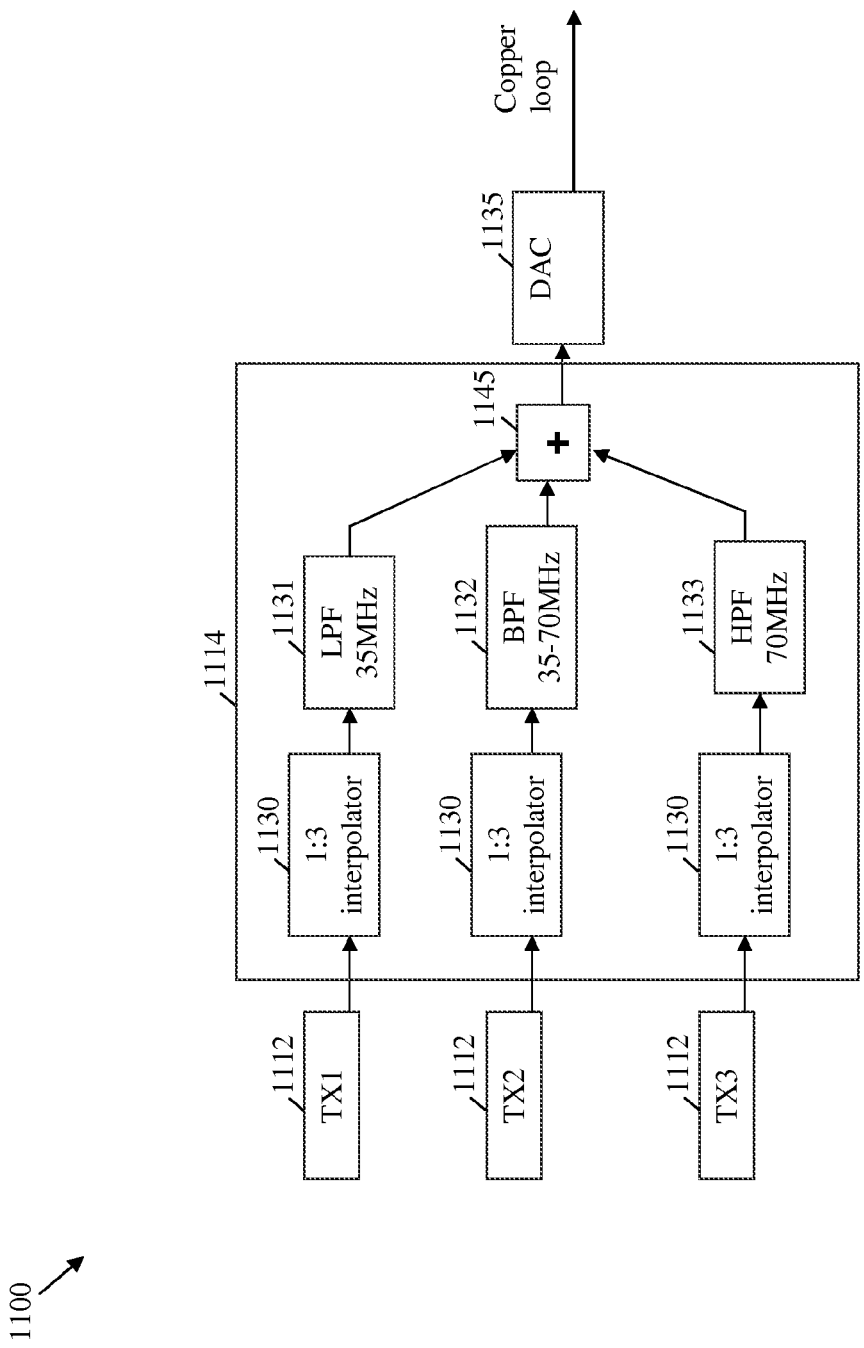
FIG. 11 is a schematic diagram of another embodiment of a digital multi-transmitter.

FIG. 11 illustrates an embodiment of another digital multi-transmitter 1100 that may correspond to the multi-transmitter 110. The digital multi-transmitter 1100 may be configured to shift and combine a plurality of sub-signals with different sub-bands using digital components and techniques in the time domain. The digital multi-transmitter 1100 may be coupled to a multi-receiver (not shown) via a copper loop and may transmit an analog signal to the multi-receiver. The digital multi-transmitter 1100 may be a VDSL2 based multi-transmitter and may comprise about three transmitters 1112 in parallel (labeled TX1, TX2, and TX3), about three interpolators 1130, a LPF 1131, a BPF 1132, a HPF 1133, an adder 1134, and a DAC 1135. The interpolators 1130, LPF 1131, BPF 1132, HPF 1133, and adder 1134 may be part of a three-to-one combiner 1114 positioned between the transmitters 1112 and the DAC 1135. The components of the digital multi-transmitter 1100 may be arranged as shown in FIG. 11.

The transmitters 1112, the interpolators 1130, the adder 1134, and the DAC 1135 may be configured substantially similar to the transmitters 1012, the interpolators 1030, the adder 1034, and the DAC 1035, respectively. The LPF 1131 may be configured to pass through a first sub-signal with a non-shifted sub-band, e.g., below about 35 MHz. The BPF 1132 may be configured to pass through a second sub-signal with a shifted sub-band, e.g., between about 35 MHz and about 70 MHz. The LPF 1133 may be configured to pass through a third sub-signal with a second shifted sub-band, e.g., above about 70 MHz.

Figure 12:
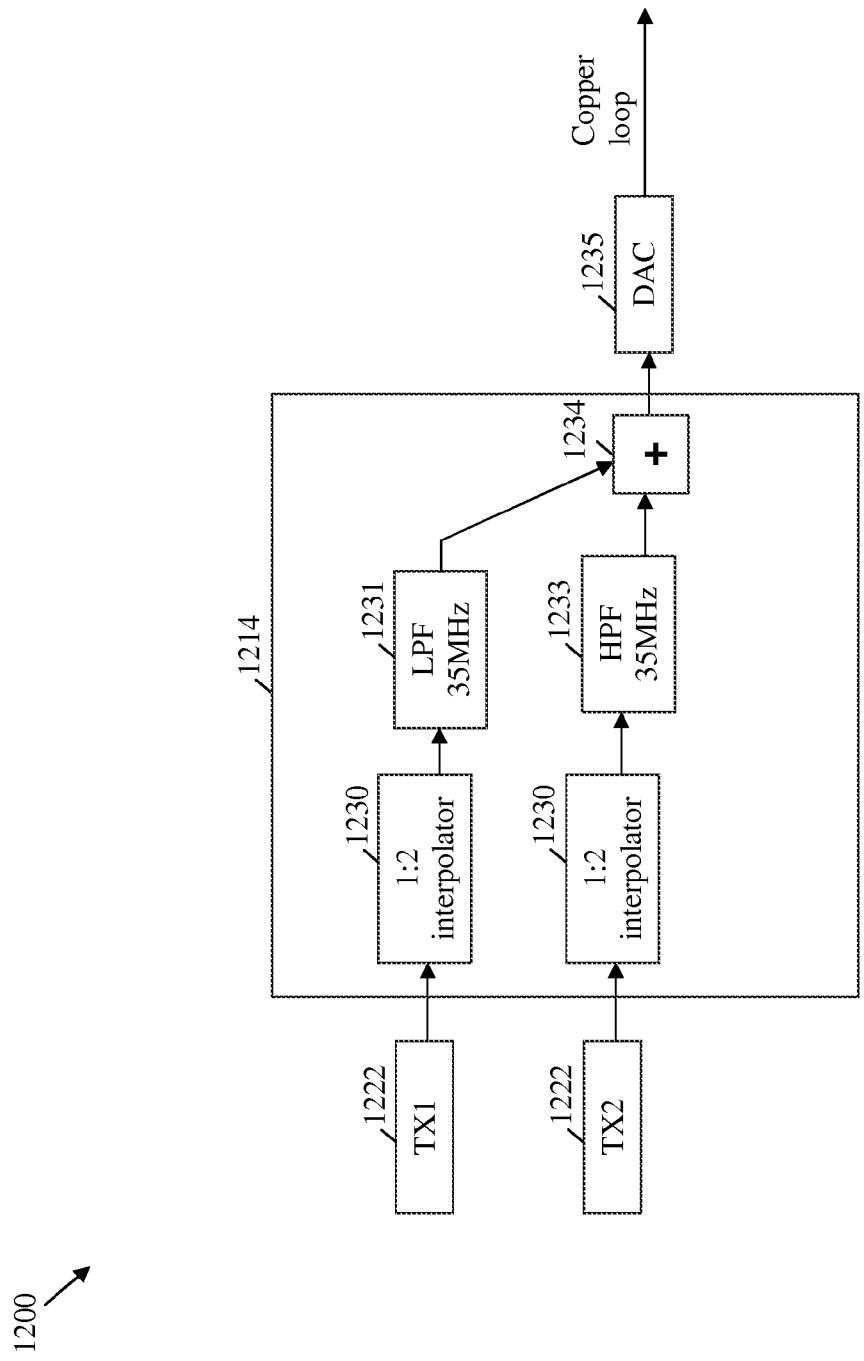
FIG. 12 is a schematic diagram of another embodiment of a digital multi-transmitter.

FIG. 12 illustrates an embodiment of another digital multi-transmitter 1200 that may be configured to shift, combine, and transmit a plurality of sub-signals with different sub-bands. The digital multi-transmitter 1200 may be a VDSL2 based multi-transmitter and may comprise about two parallel transmitters 1212 (labeled TX1 and TX2), about two interpolators 1230, a LPF 1231, a HPF 1233, an adder 1234, and a DAC 1235. The interpolators 1230, LPF 1231, HPF 1233, and adder 1234 may be part of a two-to-one combiner 1214 positioned between the transmitters 1212 and the DAC 1235. The components of the digital multi-transmitter 1200 may be arranged as shown in FIG. 12.

The transmitters 1212, the interpolators 1230, and the DAC 1235 may be configured substantially similar to the transmitters 1012, the interpolators 1030, and the DAC 1035, respectively. The LPF 1231 may be configured to pass through a first sub-signal with a non-shifted sub-band, e.g., below about 35 MHz. The LPF 1231 may be configured to pass through a second sub-signal with a shifted sub-band, e.g., above about 35 MHz. The adder 1234 may be configured to combine the two sub-signals from the LPF 1231 and the HPF 1233 into a combined signal that has a total bandwidth equal to about the sum of the two sub-bands.

Figure 13:
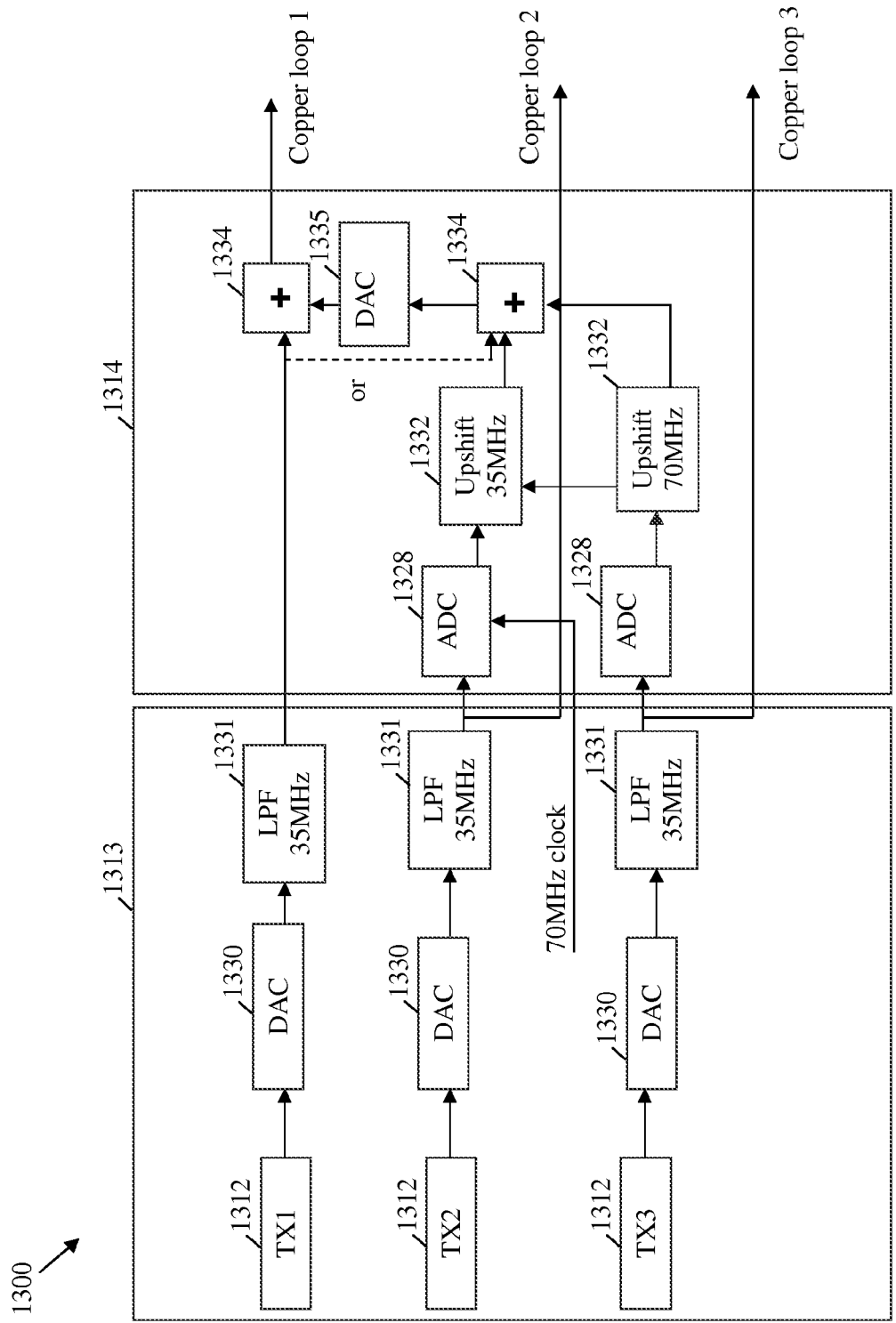
FIG. 13 is a schematic diagram of another embodiment of a digital multi-transmitter.

FIG. 13 illustrates an embodiment of another digital multi-transmitter 1300 that may be configured to shift, combine, and transmit a plurality of sub-signals with different sub-bands. The digital multi-transmitter 1300 may be a VDSL2 based multi-transmitter and may comprise about three parallel transmitters 1322 (labeled TX1, TX2, and TX3), about three DACs 1330, about three LPFs 1331, about two ADCs 1328, about two frequency up-shift blocks 1332, about two adders 1334, and an additional DAC 1335. The transmitters 1312, DACs 1330, and LPFs 1331 may be part of a DFE or AFE chip 1313 and may be configured similar to the transmitters 412, DACs 430, and LPF 431, respectively. The ADCs 1328, frequency up-shift blocks 1332, adders 1334, and DAC 1335 may be part of a combiner block 1314 that combines a plurality of sub-signals from the transmitters 1312. The components of the digital multi-transmitter 1300 may be arranged as shown in FIG. 13.

The two ADCs 1328 may convert two sub-signals from two corresponding LPFs 1331, which may have about the same bandwidth (e.g., up to about 35 MHz), from analog to digital signals. A first frequency up-shift block 1332 and a second frequency up-shift block 1332 may shift up the frequency range of one of the sub-signals from the ADCs 1328 by a first offset (e.g., about 35 MHz offset) and the frequency range of the other sub-signal by a second offset (e.g., about 75 MHz offset). The ADCs 1328 may have a data rate of about 70 MHz. The shifted sub-signals may be combined by a first adder 1334 and then forwarded to the DAC 1335, which may convert the combined signal from digital to analog. The analog combined signal may be combined by a second adder 1334 with a sub-signal that has a non-shifted sub-band and that is received directly from one of the LPFs 1331. The second adder 1334 may then forward a combined signal that has a total bandwidth including about three sub-bands on a first copper loop (Copper loop 1). In some embodiments, the digital multi-transmitter 1300 may also transmit a sub-signal with non-shifted sub-band from one of the LPFs 1331 on a second copper loop (Copper loop 2) and a second sub-signal with non-shifted sub-band from another LPF 1331 on a third copper loop (Copper loop 3).

Figure 14:
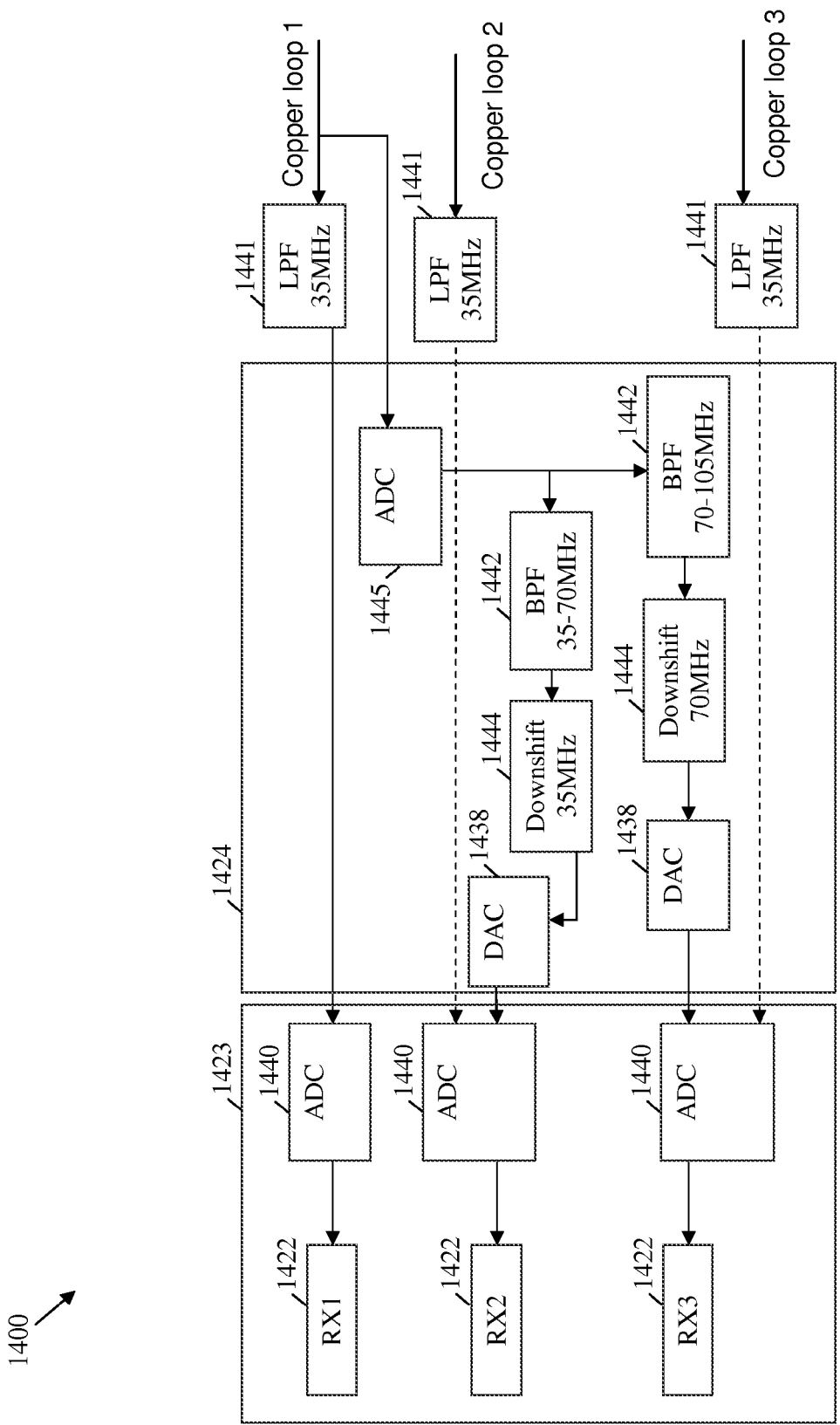
FIG. 14 is a schematic diagram of an embodiment of a digital multi-receiver.

FIG. 14 illustrates an embodiment of a digital multi-receiver 1400 that may be configured to split a received signal into a plurality of sub-signals with different sub-bands using digital components and techniques. The digital multi-receiver 1400 may be coupled to a multi-transmitter (not shown) via a copper loop and may receive an analog signal from the multi-transmitter. The digital multi-receiver 1400 may be a VDSL2 based multi-receiver and may comprise about three receivers 1422 in parallel (labeled RX1, RX2, and RX3), about three ADCs 1440, about three LPFs 1441, about two BPFs 1442, an additional ADC 1445, about two frequency down-shift blocks 1444, and about two DACs 1438. The receivers 1422 and the ADCs 1440 may be part of a DFE or AFE chip 1423, and the BPFs 1442, additional ADC 1445, frequency down-shift blocks 1444, and DACs 1438 may be part of a digital splitter 1424. The components of the digital multi-receiver 1400 may be arranged as shown in FIG. 14.

The ADCs 1440 and receivers 1422 may be configured substantially similar to the ADCs 740 and receivers 722, respectively. The LPFs 1441 may be configured to pass through the sub-signal with the lowest sub-band (e.g., up to about 35 MHz) in the received signal to one of the ADCs 1440. The sub-signal may be filtered from the received signal on a first copper loop (Copper loop 1). The additional ADC 1445 may also receive the signal on the first copper loop and convert the received signal from analog to digital. The BPFs 1442 may be configured to pass through about two sub-signals with shifted sub-bands (35-70 MHz and 70-105 MHz) in the signal from the additional ADC 1445. The two sub-signals may be forwarded from the BPFs 1442 to the corresponding frequency down-shift blocks 1444, which may shift down the frequency range of the two sub-signals properly. The down shifted sub-signals may then be converted by the DACs 1438 from digital to analog and subsequently forwarded to two corresponding ADCs 1440. Thus, the ADCs 1440 may receive about three sub-signals with three different sub-bands from the DACs 1438 and one of the LPFs 1441. In some embodiments, a second LPF 1441 and a third LPF 1441 may pass through a second sub-signal and a third sub-signal with the same lowest sub-band (e.g., from about zero MHz to about 35 MHz) to a second ADC 1440 and a third ADC 1440, respectively. The second LPF 1441 and the third LPF 1441 may receive the second sub-signal and the third sub-signal on a second copper loop (Copper loop 2) and a third copper loop (Copper loop 3), respectively.

Figure 15:
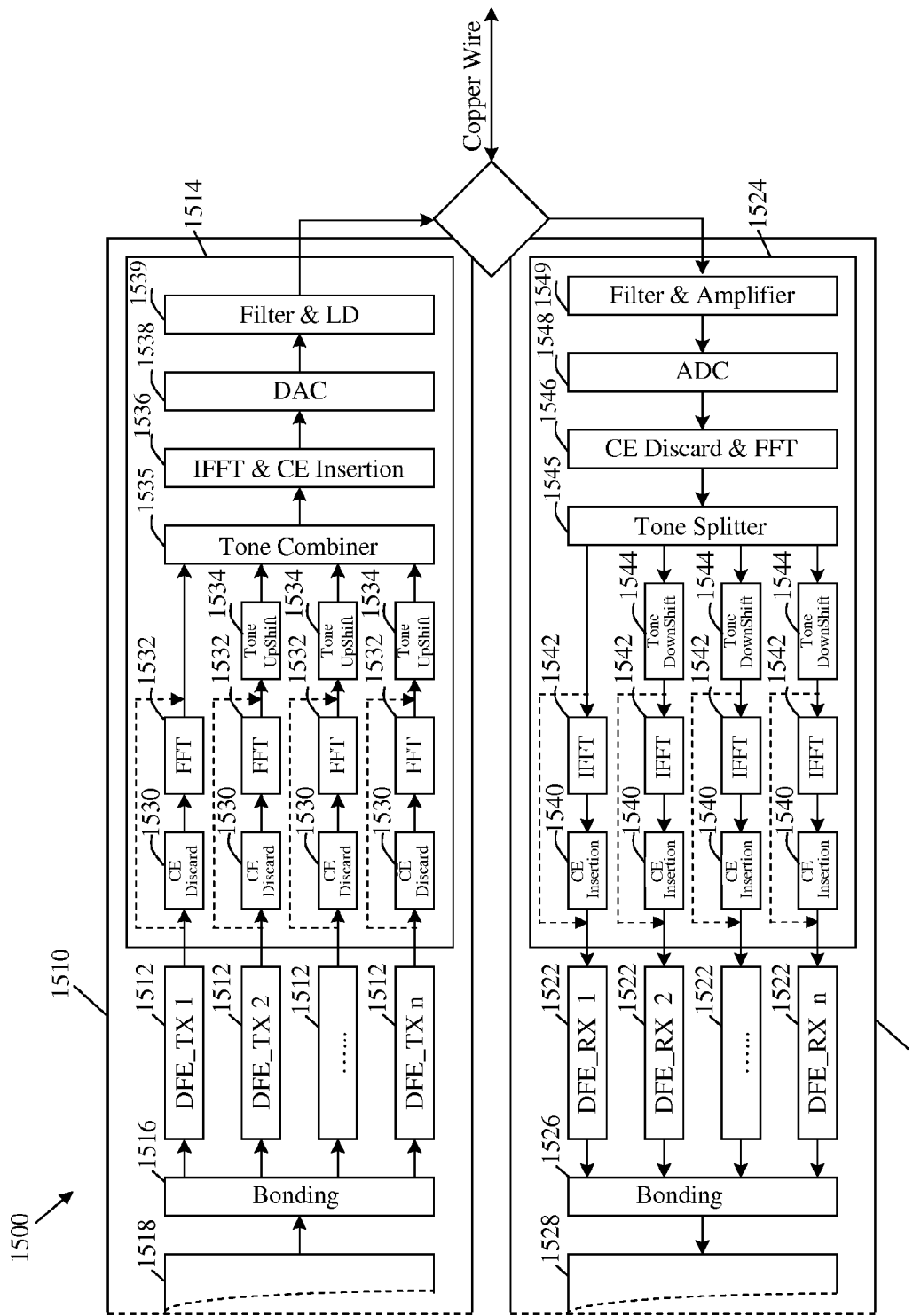
FIG. 15 is a schematic diagram of an embodiment of a frequency domain multi-transceiver system.

FIG. 15 illustrates an embodiment of a frequency domain multi-transceiver system 1500 that may correspond to the multi-transceiver system 100. The frequency domain multi-transceiver system 1500 may be configured to shift, combine, and split a plurality of sub-bands using signal processing components and techniques in the frequency domain. The frequency domain multi-transceiver system 1500 may comprise a multi-transmitter 1510 and a multi-receiver 1520 that may be coupled to another multi-transceiver system (similar to multi-transceiver system 1500, not shown in the FIG. 15) via single pair or multi-pair copper wires. The multi-transmitter 1510 may transmit an analog signal, which may be received by the multi-receiver (similar to multi-transceiver 1520, not shown in FIG. 15) at the other end of the copper wires.

The multi-transmitter 1510 may comprise a plurality of transmitters 1512 in parallel, e.g., n transmitters (labeled DFE-TX 1, DFE-TX 2 . . . , and DFE-TX n), where n is an integer. The transmitters 1512 may be positioned between a combiner 1514 and a data stream bonding circuit 1516. The transmitters 1512 may be located on a DFE chip, which may support at least one of two types of digital signals, time domain signals with cyclic extension (CE) and frequency domain signals without CE. The multi-transmitter 1510 may also comprise additional processing circuitry 1518. The components of the multi-transmitter 1510 may be configured substantially similar to the corresponding components of the multi-transceiver 110, where the transmitters 1512 may be used to transmit a plurality of sub-signals and the combiner 1514 may shift and combine the sub-bands of the sub-signals.

The combiner 1514 may be a digital combiner that comprises a plurality of digital signal frequency processing (DSP) components. The combiner 1514 may comprise a plurality of parallel CE discard blocks 1530, a plurality of parallel FFT blocks 1532, a plurality of parallel tone up-shift blocks 1534, a tone combiner 1535, an IFFT and CE insertion block 1536, a DAC 1538, and a filter and line driver (LD) block 1539. The quantity of CE discard blocks 1530 and FFT blocks 1532 may be equal to the quantity of transmitters 1512, where each transmitter 1512 may be coupled to a FFT block 1532 via a CE discard block 1530. The quantity of tone up-shift blocks 1534 may be less than the quantity of transmitters 1512 by about one. The tone combiner 1535 may be coupled to some of the FFT blocks 1532 via the corresponding tone up-shift blocks 1534 and may be directly coupled to one of the FFT block 1532. The tone combiner 1535 may also be coupled to the filter and LD block 1539 via the IFFT and CE insertion block 1536 and the DAC 1538. The components of the combiner 1514 may be arranged as shown in FIG. 15.

The CE discard blocks 1530 may be configured to remove or discard the CE in the time domain sub-signals received from the transmitters 1512 (in the DFE chip). The FFT blocks 1532 may be configured to convert the time domain sub-signals from the CE discard blocks 1530 into corresponding frequency domain sub-signals, which may be forwarded to the tone combiner 1535 via the tone up-shift blocks 1534. Additionally, one sub-signal may be forwarded from one FFT block 1532 directly to the tone combiner 1535. Alternatively, a plurality of frequency domain signals from the transmitters 1512 may be directly forwarded to the tone combiner 1535 via the tone up-shift blocks 1534 without using the CE discard blocks 1530 and the FFT blocks 1532 (indicated by the dashed arrow lines). One sub-signal may also be forwarded directly from one transmitter 1512 to the tone combiner 1535 without using a corresponding tone up-shift block 1534.

The tone up-shift blocks 1534 may be configured to shift the sub-bands of the sub-signals with respect to each other, e.g., by adding corresponding positive frequency shifts. Each sub-band may have about equal fixed bandwidth, e.g., about 30 MHz or 35 MHz range, and may be shifted by a corresponding tone up-shift block 1534 by an integer multiple of a fixed offset bandwidth, e.g., about 30 or about 35 MHz. The tone combiner 1535 may be configured to combine the sub-signals by adding the shifted sub-bands to each other. The tone combiner 1535 may also add to the shifted sub-bands a non-shifted sub-band from the transmitter 1512 that is not coupled to a tone up-shift block 1534. The non-shifted sub-band may correspond to the lowest frequency band among the sub-bands. The sub-bands may be added to obtain a total bandwidth of a combined signal that comprises the sub-signals.

The IFFT and CE insertion block 1536 may comprise an IFFT block configured to convert the combined signal from the frequency domain to the time domain and a CE insertion block configured to add CE to the combined signal. The DAC 1538 may be configured to convert the combined signal received from the IFFT and CE insertion block 1536 from a digital signal to an analog signal. The filter and LD block 1539 may comprise a filter configured to pass through the total bandwidth for a combined signal, which may prevent or reduce noise in the signal. The filter and LD block 1539 may also comprise a LD configured to transmit the combined signal on the copper wire appropriately, e.g., at a proper power level.

The multi-receiver 1520 may comprise a plurality of receivers 1522 in parallel, e.g., n receivers (labeled DFE-RX 1, DFE-RX 2 . . . , and DFE-RX n), where n is the quantity of transmitters 1512. The receivers 1522 may be positioned between a splitter 1524 and a second data stream bonding circuit 1526. The receivers 1522 may be located on a DFE chip, which may support time domain signals with CE and/or frequency domain signals without CE. The multi-receiver 1520 may also comprise additional data processing circuitry 1528. The components of the multi-transmitter 1520 may be configured substantially similar to the corresponding components of the multi-transceiver 110, where the splitter 1524 may split and reverse shift the sub-bands of the sub-signals before forwarding the sub-signals to the receivers 1522.

The splitter 1524 may be a digital splitter that comprises a plurality of DSP components. The splitter 1524 may comprise a plurality of parallel CE insertion blocks 1540, a plurality of parallel IFFT blocks 1542, a plurality of parallel tone down-shift blocks 1544, a tone splitter 1545, an CE discard and FFT block 1546, an ADC 1548, and a filter and amplifier block 1549. The quantity of CE insertion blocks 1540 and IFFT blocks 1542 may be equal to the quantity of receivers 1522, where each receiver 1522 may be coupled to a IFFT block 1542 via a CE insertion block 1540. The quantity of tone down-shift blocks 1544 may be less than the quantity of receivers 1522 by about one. The tone splitter 1545 may be coupled to some of the IFFT blocks 1542 via the corresponding tone down-shift blocks 1544 and may be directly coupled to one of the IFFT block 1542. The tone splitter 1545 may also be coupled to the filter and amplifier block 1549 via the CE discard and FFT block 1546 and the ADC 1548. The components of the splitter 1524 may be arranged as shown in FIG. 15.

The filter and amplifier block 1549 may comprise a filter configured to pass through the total bandwidth of the combined signal from the multi-transmitter 1510 and an amplifier configured to amplify the signal power to an appropriate level. The ADC 1548 may be configured to convert the signal from an analog to a digital signal. The CE discard and FFT block 1546 may comprise a CE discard block configured to remove or discard the CE in the signal and a FFT block configured to convert the signal from a time domain signal to a frequency domain signal. The tone splitter 1545 may be configured to split the received combined signal into a plurality of sub-signals, which may have adjacent frequency ranges of about equal widths, e.g., of about 30 MHz width. The tone splitter 1545 may forward a plurality of shifted sub-signals to the tone down-shift blocks 1544 and one additional non-shifted sub-signal, which may have a non-shifted sub-band, directly to one of the IFFT blocks 1542.

Each of the tone down-shift blocks 1544 may receive one of the sub-signals and shift down the sub-band of the sub-signal by subtracting a corresponding positive frequency shift. The sub-bands may be shifted down to provide each corresponding receiver 1522 about the same non-shifted sub-band, e.g., from about zero Hz to about 30 MHz. The IFFT blocks 1542 may be configured to convert the corresponding sub-signals from the tone down-shift blocks 1544 from the frequency domain to the time domain. The CE insertion blocks 1540 may be configured to add CE to the corresponding sub-signals. As such, the CE insertion blocks 1540 may forward a plurality of non-shifted time-domain sub-signals with CE to the corresponding receivers 1522. Alternatively, a plurality of non-shifted frequency domain signals may be forwarded directly from the tone down-shift blocks 1544 to the corresponding receivers 1522 without using the IFFT blocks 1542 and the CE insertion blocks 1540. In this case, the tone splitter 1545 may also forward one non-shifted frequency domain sub-signal directly to one of the receivers 1522.

Figure 16:
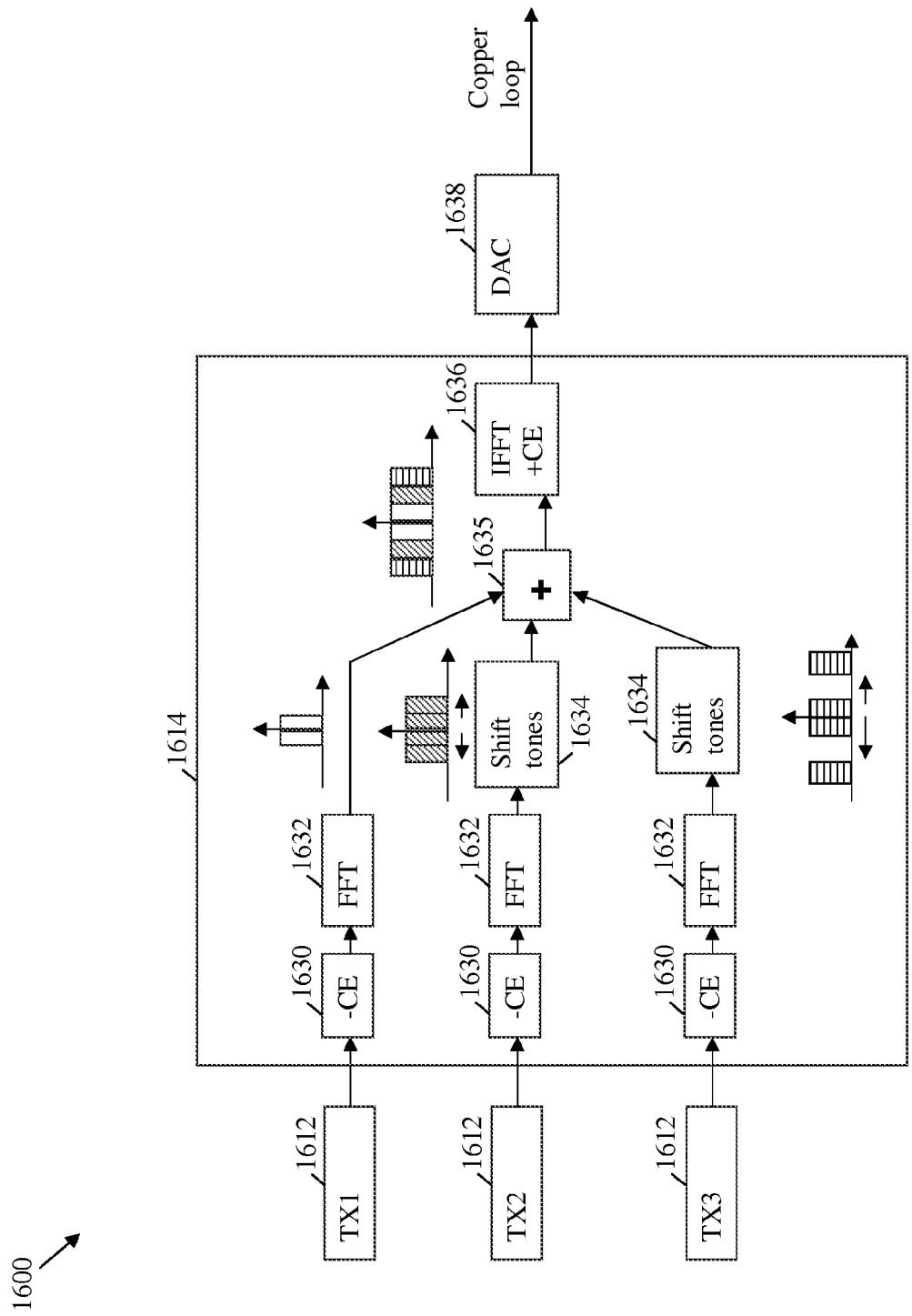
FIG. 16 is a schematic diagram of an embodiment of a frequency domain multi-transmitter.

FIG. 16 illustrates an embodiment of a frequency domain multi-transmitter 1600 that may be configured to shift, combine, and transmit a plurality of sub-signals with different sub-bands using signal processing components and techniques in the frequency domain. The frequency domain multi-transmitter 1600 may be a VDSL2 based multi-transmitter and may comprise about three parallel transmitters 1612 (labeled TX1, TX2, and TX3), about three CE discard (−CE) blocks 1630, about three FFT blocks 1632, about two tone up-shift blocks 1634, and adder 1635, and IFFT and CE insertion (+CE) block 1636, and a DAC 1638. The CE discard blocks 1630, FFT blocks 1632, tone up-shift blocks 1634, adder 1635, and IFFT and CE insertion block 1636 may be part of a three-to-one combiner 1614. The components of the frequency domain multi-transmitter 1600 may be arranged as shown in FIG. 16.

The transmitters 1612, CE discard blocks 1630, FFT blocks 1632, and tone up-shift blocks 1634 may be configured substantially similar to the corresponding components of the multi-transmitter 1510. The adder 1635, the IFFT and CE insertion block 1636, and the DAC 1638 may also be configured substantially similar to the tone combiner 1535, the IFFT and CE insertion block 1536, and the DAC 1538, respectively. FIG. 16 also shows the frequency bands of the sub-bands from the FFTs 1632 and the combined bandwidth from the adder 1635.

Figure 17:
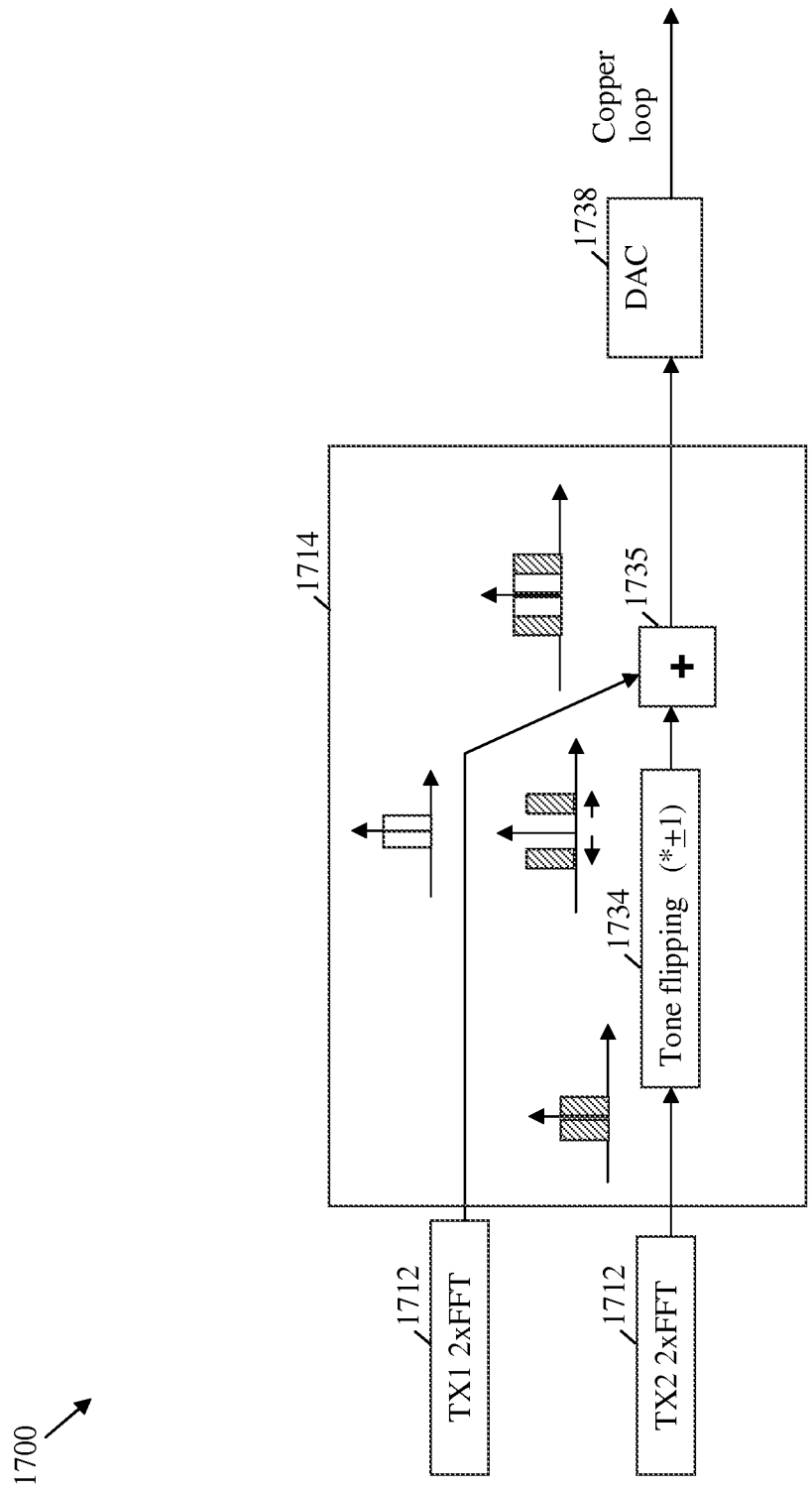
FIG. 17 is a schematic diagram of another embodiment of a frequency domain multi-transmitter.

FIG. 17 illustrates an embodiment of another frequency domain multi-transmitter 1700 that may be configured to shift, combine, and transmit a plurality of sub-signals with different sub-bands using signal processing components and techniques in the frequency domain. The frequency domain multi-transmitter 1700 may be a VDSL2 based multi-transmitter and may comprise about two parallel transmitters 1712 (labeled TX1 2×FFT and TX2 2×FFT), a tone flipping block 1734, and adder 1735, and a DAC 1738. The tone flipping block 1734 and the adder 1735 may be part of a two-to-one combiner 1714. The components of the frequency domain multi-transmitter 1700 may be arranged as shown in FIG. 17.

The transmitters 1712 and the DAC 1738 may be configured substantially similar to the corresponding components of the multi-transmitter 1510. Additionally, the transmitters 1712 may be configured to implement a double-size FFT function (2×FFT) to transmit frequency domain sub-signals with extended frequency range. The tone flipping block 1734 may be configured to flip the tones in a sub-signal received from one of the transmitters 1712, which may effectively shift the frequency range of the sub-signal. The adder 1735 may be configured to combine a sub-signal from one of the transmitters 1712, which may have a non-shifted frequency range or sub-band, and the sub-signal from the tone flipping block 1734, which may have a shifted frequency range or sub-band. Thus, the adder 1735 may send a combined signal that has a total bandwidth comprising the shifted and non-shifted sub-bands to the DAC 1738. The extended frequency range of the sub-signals from the transmitters 1712 may simplify combining the sub-signals at the adder 1735. FIG. 17 also shows the frequency bands of the shifted and non-shifted sub-bands and the combined bandwidth from the adder 1735.

Figure 18:
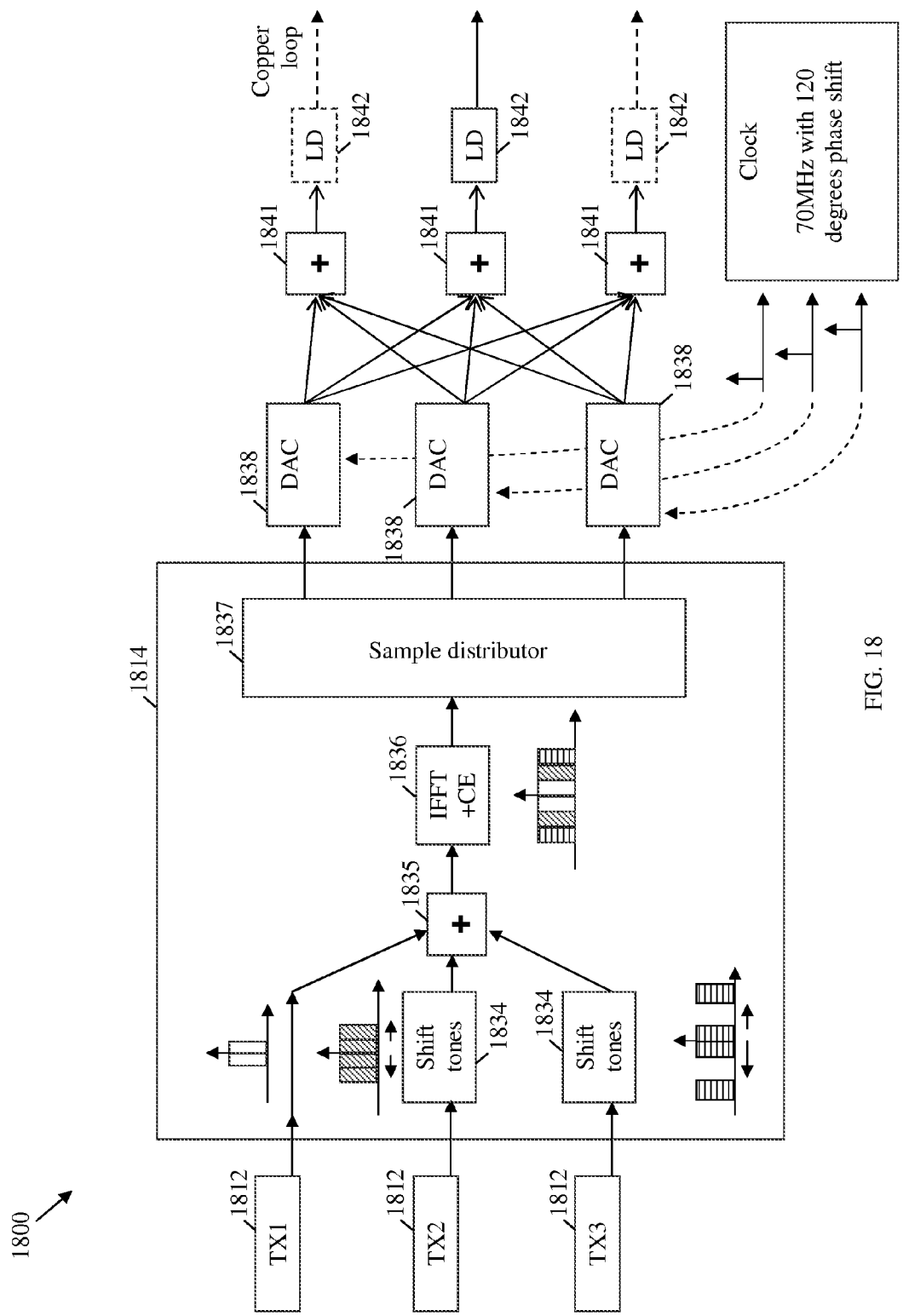
FIG. 18 is a schematic diagram of another embodiment of a frequency domain multi-transmitter.

FIG. 18 illustrates an embodiment of another frequency domain multi-transmitter 1800 that may be configured to shift, combine, and transmit a plurality of sub-signals with different sub-bands using signal processing components and techniques in the frequency domain. The frequency domain multi-transmitter 1800 may be a VDSL2 based multi-transmitter and may comprise about three parallel transmitters 1812 (labeled TX1, TX2, and TX3), about two tone up-shift blocks 1834, an adder 1835, an IFFT and CE insertion block 1836, a sample distributor 1837, about three DACs 1838, about three additional adders 1841, and about three LDs 1842. The tone up-shift blocks 1834, adder 1835, IFFT and CE insertion block 1836, and sample distributor 1837 may be part of a three-to-one combiner 1814. The components of the frequency domain multi-transmitter 1800 may be arranged as shown in FIG. 18.

The transmitters 1812 and DAC 1838 may be configured substantially similar to the corresponding components of the multi-transmitter 1510. The tone up-shift blocks 1834, the adder 1835, and the IFFT and CE insertion block 1836 may be configured substantially similar to the tone up-shift blocks 1534, the tone combiner 1535, and the IFFT and CE insertion block 1536, respectively. Specifically, the tone up-shift blocks 1834 and the adder 1835 may receive the sub-signals from the transmitters 1812 in the frequency domain and shift and add the sub-signals appropriately. FIG. 18 also shows the frequency bands of the sub-bands and the combined bandwidth from the IFFT and CE insertion block 1836. The sample distributor 1837 may be configured to distribute the combined signal from the IFFT and CE insertion block 1836 into about three different signals (e.g., for different channels), which may have about the same total bandwidth and forward each of the signals to a corresponding DAC 1838.

Each DAC 1838 may be configured to convert the corresponding signal from digital to analog and forward the corresponding signal to each of the additional adders 1841. Each additional adder 1841 may combine the signals from the DACs 1838 and forward the combined signal to a corresponding LD 1842, which may in turn transmit the combined signal on a corresponding copper loop on a separate channel. Specifically, the channels may be activated consecutively or alternatively using a clock phase shift to select the corresponding DAC 1838 and switching on the corresponding LD 1842. For instance, the clock may have a rate of about 70 MHz and the clock's phase may be shifted by about 120 degrees between the different channels.

Figure 19:
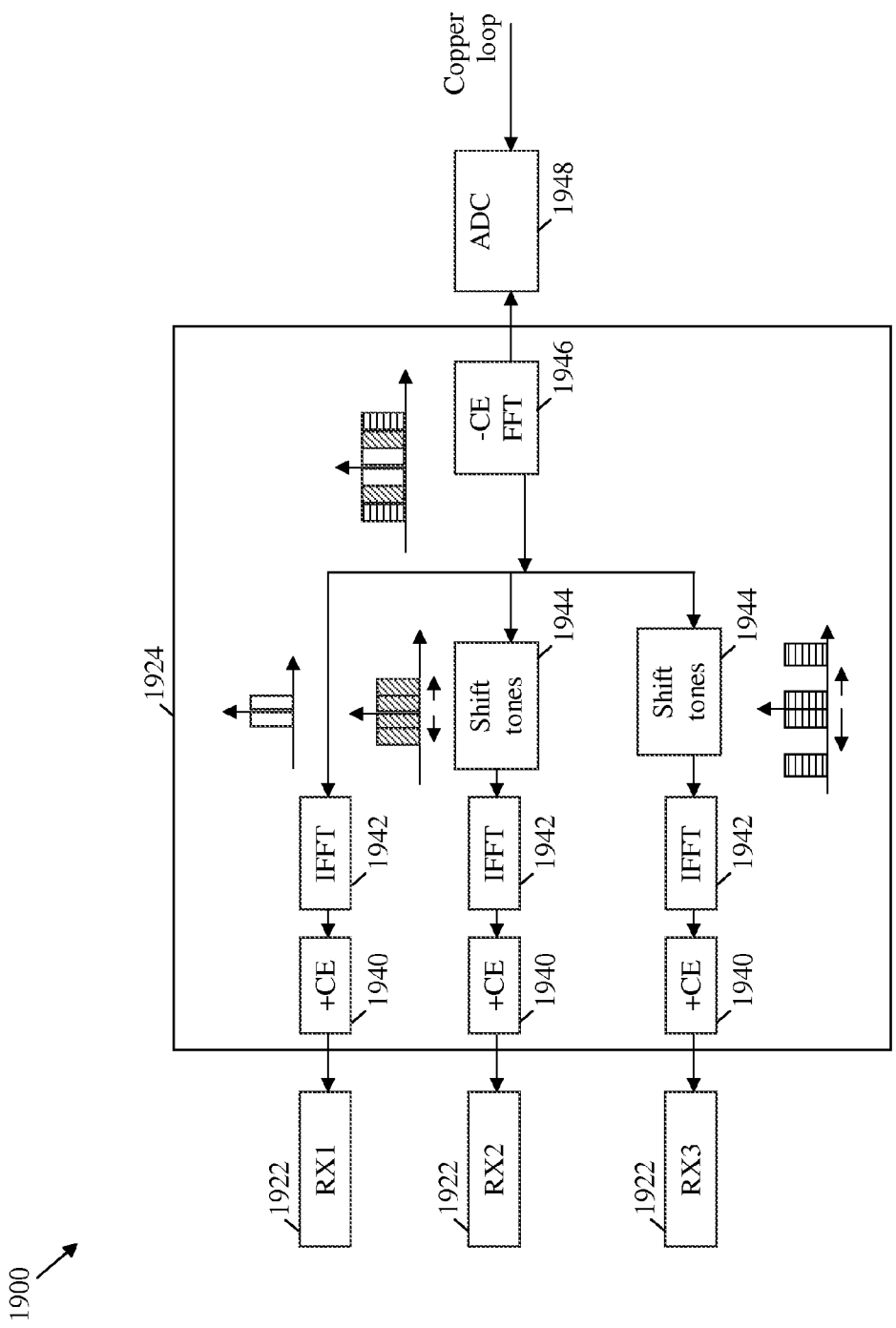
FIG. 19 is a schematic diagram of an embodiment of a frequency domain multi-receiver.

FIG. 19 illustrates an embodiment of a frequency domain multi-receiver 1900 that may be configured to split a received signal into a plurality of sub-signals with different sub-bands using digital components and techniques in the time domain. The frequency domain multi-receiver 1900 may be a VDSL2 based multi-receiver and may comprise about three parallel receivers 1922 (labeled RX1, RX2, and RX3), about three CE insertion blocks 1940, about three IFFT blocks 1942, about two tone down-shift blocks 1944, a CE discard and FFT block 1946, and an ADC 1948. The CE insertion blocks 1940, the IFFT blocks 1942, the tone down-shift blocks 1944, and the CE discard and FFT block 1946 may be part of a three-to-one combiner 1924. The components of the frequency domain multi-receiver 1900 may be arranged as shown in FIG. 19. The receivers 1922, CE insertion blocks 1940, IFFT blocks 1942, tone down-shift blocks 1944, CE discard and FFT block 1946, and ADC 1948 may be configured substantially similar to the corresponding components of the multi-receiver 1520. FIG. 19 also shows the PSD of the received combined bandwidth and the sub-bands received by the corresponding receivers 1922.

Figure 20:
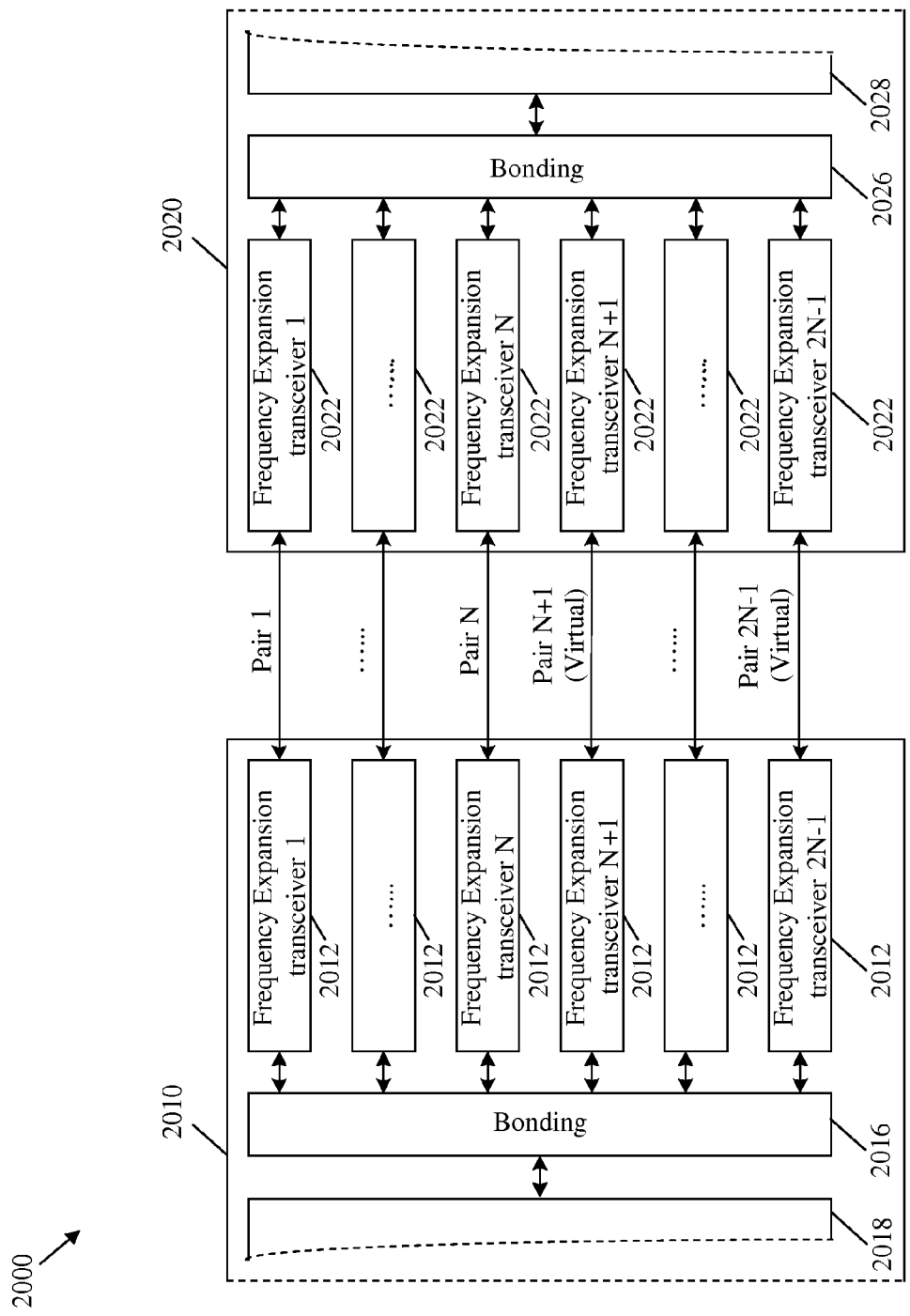
FIG. 20 is a schematic diagram of an embodiment of a multi-pair multi-transceiver system.

The multi-transceiver schemes described above may be implemented for multi-pair DSL systems that comprise a plurality of physical pairs and virtual pairs. FIG. 20 illustrates an embodiment of a multi-pair multi-transceiver system 2000 that may be used to provide substantially high speed access. The multi-pair multi-transceiver system 2000 may be used for high speed access on short loops, e.g., less than about 200 meters in length, over multi-pair copper wires. The multi-pair multi-transceiver system 2000 may comprise a first multi-transceiver 2010 that may be located at XTU-O and a second multi-transceiver 2020 that may be located at XTU-R. The first multi-transceiver 2010 and the second multi-transceiver 2020 may be coupled to each other via a plurality of multi-pairs, including physical pairs and virtual pairs. Using multi-pairs may increase the bandwidth and thus further increase the access speed, where any of the multi-transceiver schemes described above may be implemented for each pair between the first multi-transceiver 2010 and the second multi-transceiver 2020. For instance, the bandwidth for each pair may be extended using the multi-transceiver scheme from about 30 MHz to about 100 MHz or more.

The first multi-transceiver 2010 may comprise a plurality of frequency (or bandwidth) expansion transceivers 2012 in parallel, a data stream bonding circuit 2016, and one or more additional data processing circuitry 2018. Similarly, the second multi-transceiver 2020 may comprise a plurality of second frequency (or bandwidth) expansion transceivers 2022 in parallel, a second data stream bonding circuit 2026, and one or more second additional data processing circuitry 2028. The components of the multi-transceiver 2010, and similarly the second multi-transceiver 2020, may be configured similar to the corresponding components of the first transceiver 110. Specifically, the frequency expansion transceivers 2012, and similarly the second frequency expansion transceivers 2022, may be configured substantially similar to the transceivers 110. The transceivers may also comprise and/or may be coupled to one or more components (not shown) configured to shift and combine a plurality of sub-bands for a plurality of transmitted sub-signals from the transceivers into a total bandwidth for a combined signal in the multi-pairs, split the total bandwidth into the sub-bands, or both.

For instance, the frequency expansion transceivers 2012, and similarly the second frequency expansion transceivers 2022, may be coupled to a combiner/splitter similar to the combiner/splitter 114 or to one or more components similar to the components described in the multi-transceiver architectures described above. As such, the sub-bands of the sub-signals in the frequency expansion transceivers 2012, and similarly the second frequency expansion transceivers 2022, may be shifted with respect to each other to form the total bandwidth. The sub-signals may be shifted and combined in the time domain, e.g., using analog components or digital components, or in the frequency domain, as described in the schemes above.

The quantity of frequency expansion transceivers 2012, and similarly the second frequency expansion transceivers 2022, may be equal to up to 2N−1, where N is the number of physical copper pairs and N is an integer. The frequency expansion transceivers 2012 and the second frequency expansion transceivers 2020 may be coupled by up to 2N−1 corresponding pairs. The 2N−1 pairs may comprise N physical pairs and up to N−1 virtual pairs. Each virtual pair may be obtained by combining two of the physical wires other than the regular physical pair, or two common mode wires from two other physical or virtual pairs, or using other techniques, to substantially increase the number of channels between the transceivers and thus the total data rate between the transceivers by a factor of up to about (2N−1)/N. The physical copper wires may be combined to form the virtual pairs in addition to the regular physical pairs using various techniques, such as SuperMIMO or "Phantom Mode." Phantom Mode is based on common mode technique. The "Phantom Mode" technique is described in European Patent Application No. EP2091196 and in U.S. Pat. No. 6,507,608, both of which are incorporated herein by reference.

Figure 21:
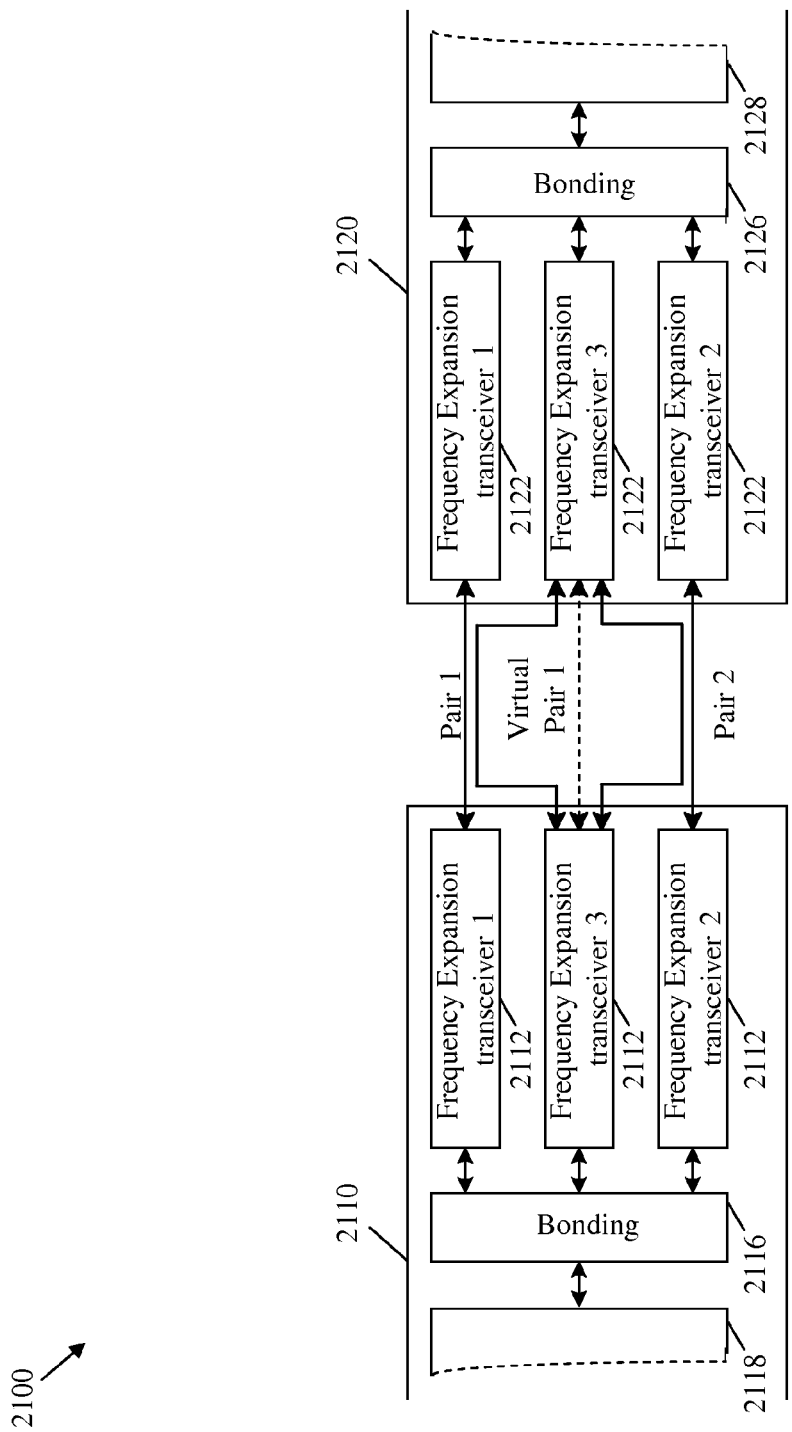
FIG. 21 is a schematic diagram of another embodiment of a multi-pair multi-transceiver system.

Some residential sites may have two or more copper pairs connected to a CO or distribution center. FIG. 21 illustrates an embodiment of another multi-pair multi-transceiver system 2100, where two multi-transceivers may be coupled via about two physical pairs. The multi-pair multi-transceiver system 2100 may comprise a first multi-transceiver 2110 and a second multi-transceiver 2120 that may be coupled via the physical pairs and may implement any of the multi-transceiver schemes described above to increase the access speed or data rate (e.g., using a frequency band substantially beyond about 30 MHz). The first multi-transceiver 2110 may comprise about three frequency expansion transceivers 2112 in parallel, a data stream bonding circuit 2116, and one or more additional data processing circuitry 2118. Similarly, the second multi-transceiver 2120 may comprise about three second frequency expansion transceivers 2122 in parallel, a second data stream bonding circuit 2126, and one or more second additional processing circuitry 2128.

The components of the multi-transceiver 2110, and similarly the second multi-transceiver 2120, may be configured substantially similar to the corresponding components of the multi-pair multi-transceiver system 2000. The frequency expansion transceivers 2112 may be coupled to the second frequency expansion transceivers 2122 via the two physical pairs (pair 1 and pair 2) and an additional virtual pair (virtual pair 1) that may be obtained by channel expansion techniques such as, for example, the SuperMIMO technique. As such, about two physical channels and about one virtual channel may be established between the transceivers. The virtual pair/channel may be formed using wire formation other than the normal physical pairs. For example, the common-mode of pair 1 and the common mode of pair 2 may be used to form virtual pair 1. Alternatively, the virtual pair/channel may be formed using one of the two wires in pair 1 and one of the two wires in pair 2.

Figure 22:
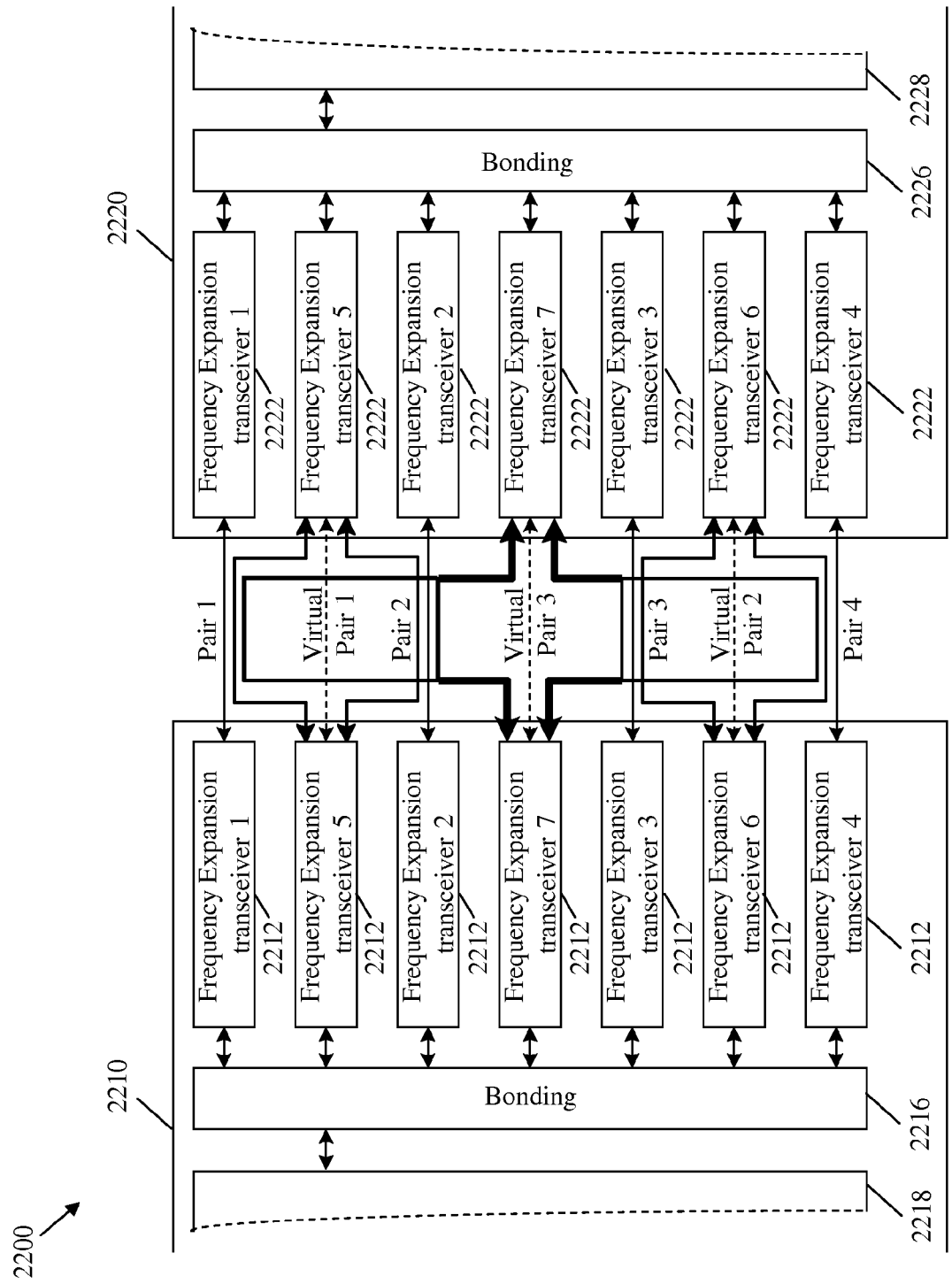
FIG. 22 is a schematic diagram of another embodiment of a multi-pair multi-transceiver system.

FIG. 22 illustrates an embodiment of another multi-pair multi-transceiver system 2200, where two multi-transceivers may be coupled via about four physical pairs and three virtual pairs. The multi-pair multi-transceiver system 2200 may comprise a first multi-transceiver 2210 and a second multi-transceiver 2220 that may be coupled via the physical and virtual pairs and may implement any of the multi-transceiver schemes described above to increase the access speed or data rate (e.g., using frequency band substantially beyond about 30 MHz). The first multi-transceiver 2210 may comprise about seven frequency expansion transceivers 2212 in parallel, a data stream bonding circuit 2216, and one or more additional data processing circuitry 2218. Similarly, the second multi-transceiver 2220 may comprise about seven second frequency expansion transceivers 2222 in parallel, a second data stream bonding circuit 2226, and one or more second additional data processing circuitry 2228.

The components of the multi-transceiver 2210, and similarly the second multi-transceiver 2220, may be configured substantially similar to the corresponding components of the multi-pair multi-transceiver system 2000. The frequency expansion transceivers 2212 may be coupled to the second frequency expansion transceivers 2222 via the four physical pairs (pair 1, pair 2, pair 3, and pair 4) and three additional virtual pairs (virtual pair 1, virtual pair 2, and virtual pair 3) that may be obtained from the four physical pairs, e.g., using SuperMIMO. As such, about four physical channels and about three virtual channels may be established between the transceivers. The virtual pairs/channels may be formed similar to the virtual pair/channel in the multi-pair multi-transceiver 2100.

Figure 23:
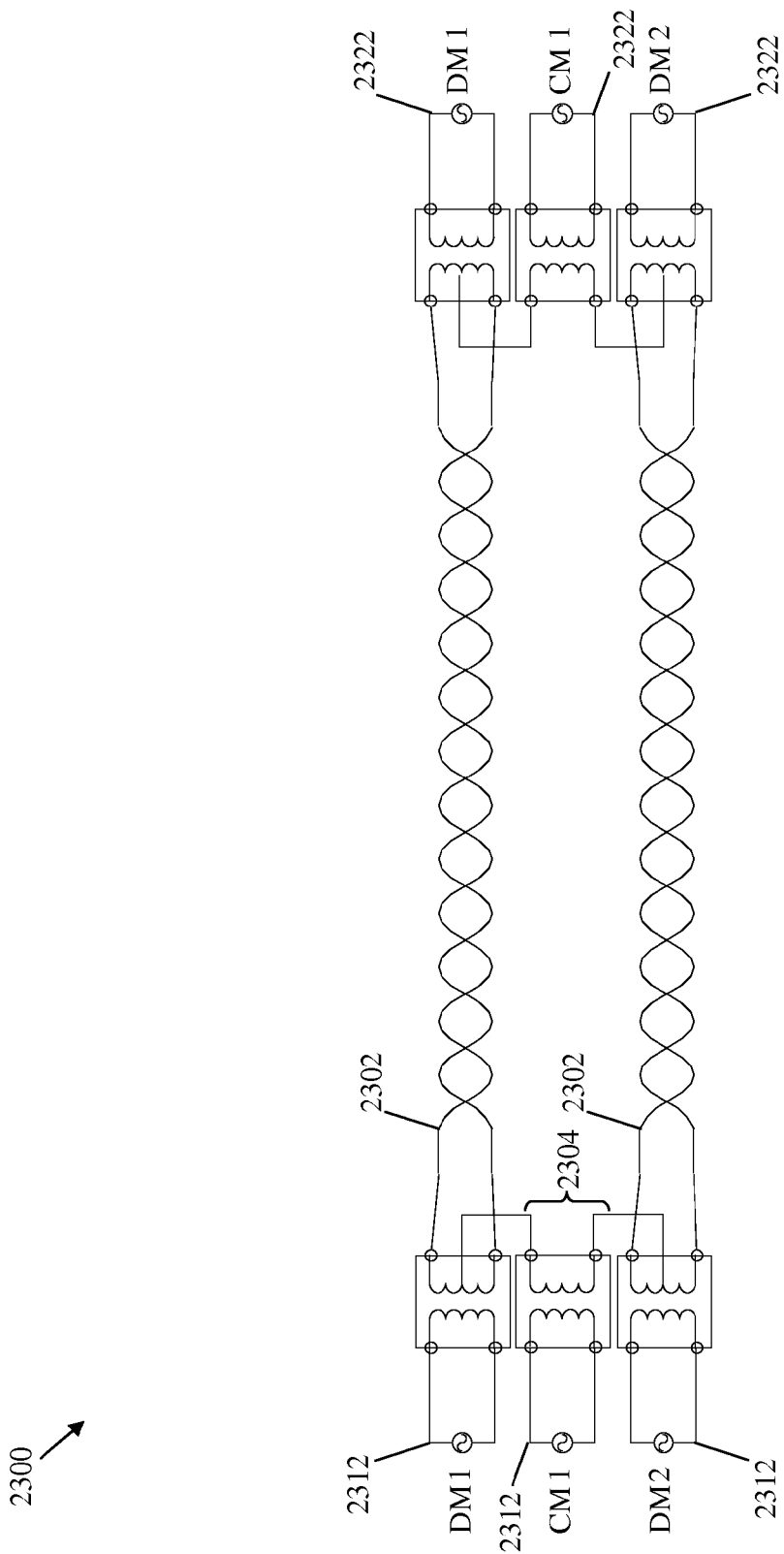
FIG. 23 is a schematic diagram of an embodiment of a multi-pair virtual channel configuration.

FIG. 23 illustrates an embodiment of a multi-pair virtual channel configuration 2300 that may be used in the multi-pair multi-transceiver system 2100. The multi-pair virtual channel configuration 2300 may comprise about three parallel transceivers 2312 that may be coupled to about three corresponding second parallel transceivers 2322 via a about two physical pairs 2302 and about one virtual pair 2304. The transceivers 2312 may correspond to the frequency expansion transceivers 2112 and the second transceivers 2122 may correspond to the second frequency expansion transceivers 2112. The physical pairs 2302 may be established using the differential modes in each of the physical pairs 2302 (e.g., DM1 and DM2), and the virtual pair 2304 may be established according to the SuperMIMO technique, e.g., combining a common mode of one of the physical pairs 2302 and a common mode of the other physical pair 2302 (CM1). Thus, the transceivers 2312 may communicate with the second transceivers 2322 via two physical channels that correspond to the physical pairs 2302 and one virtual channel that corresponds to the virtual pair 2304.

Figure 24:
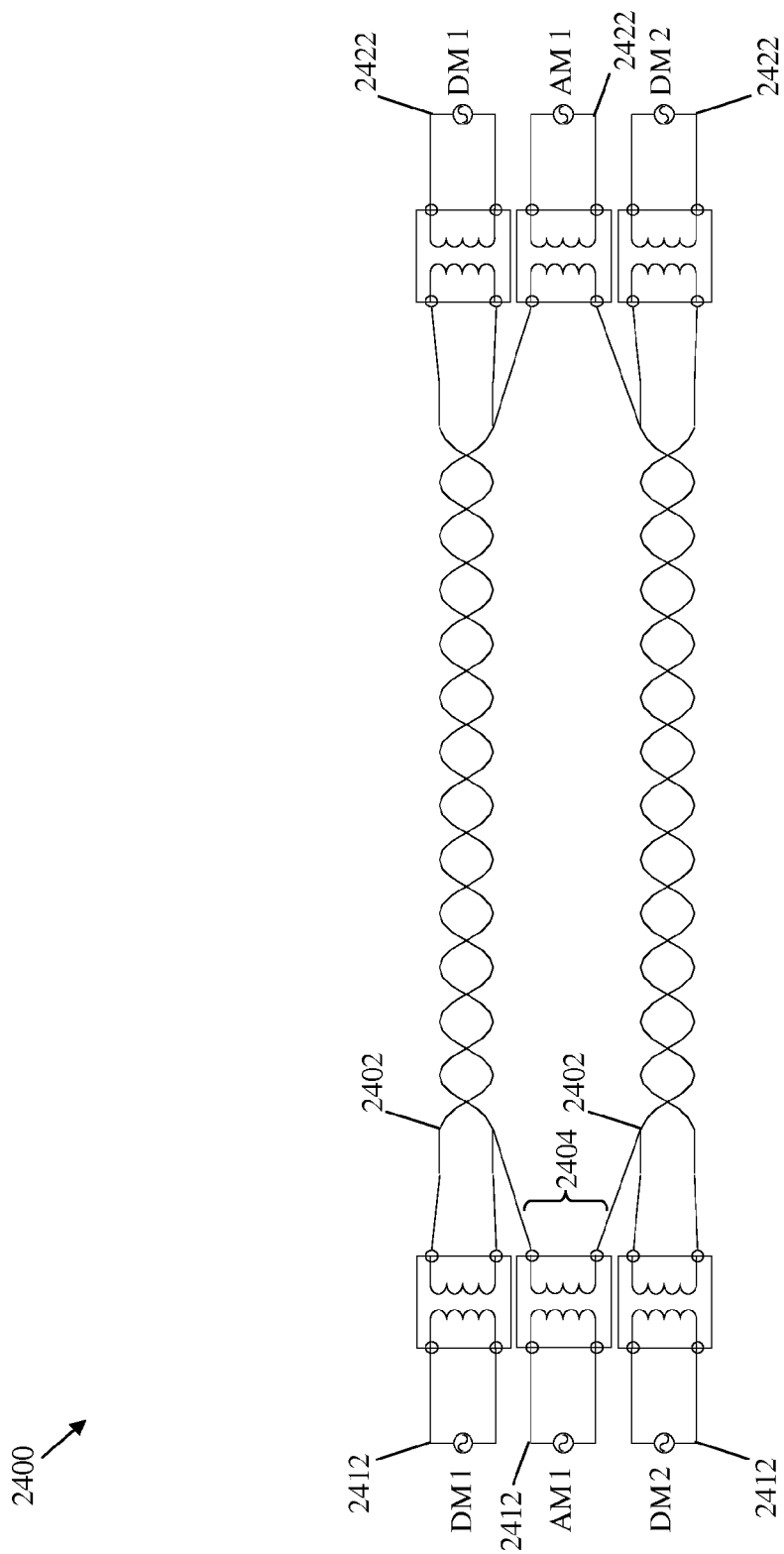
FIG. 24 is a schematic diagram of another embodiment of a multi-pair virtual channel configuration.

FIG. 24 illustrates an embodiment of another multi-pair virtual channel configuration 2400 that may be used in the multi-pair multi-transceiver system 2100. The multi-pair virtual channel configuration 2400 may comprise about three parallel transceivers 2412 that may be coupled to about three corresponding second parallel transceivers 2422 via a about two physical pairs 2402 and about one virtual pair 2404. The transceivers 2412 may correspond to the frequency expansion transceivers 2112 and the second transceivers 2422 may correspond to the second frequency expansion transceivers 2122. The physical pairs 2402 may be established using the regular differential modes in each of the physical pairs 2402 (e.g., DM1 and DM2), and the virtual pair 2404 may be established by combining one wire in one of the physical pairs 2302 and a second wire in the other physical pair 2302 and thus establish an alternative mode (AM1). Thus, the transceivers 2412 may communicate with the second transceivers 2422 via two physical channels that correspond to the physical pairs 2402 and one virtual channel that corresponds to the virtual pair 2404.

Figure 25:
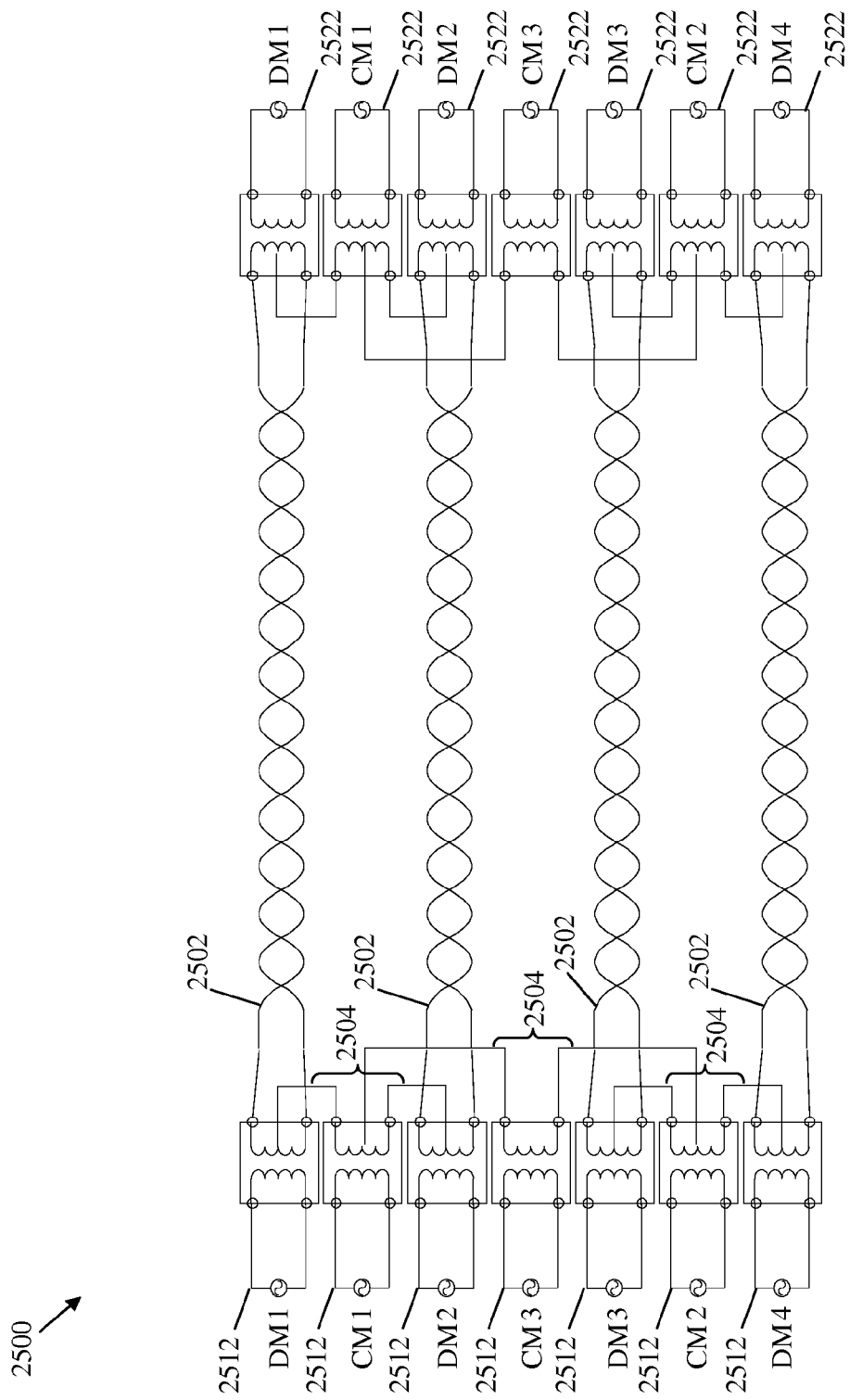
FIG. 25 is a schematic diagram of another embodiment of a multi-pair virtual channel configuration.

FIG. 25 illustrates an embodiment of another multi-pair virtual channel configuration 2500 that may be used in the multi-pair multi-transceiver system 2200. The multi-pair virtual channel configuration 2500 may comprise about seven parallel transceivers 2512 that may be coupled to about seven corresponding second parallel transceivers 2522 via a about four physical pairs 2502 and about three virtual pairs 2504. The transceivers 2512 may correspond to the frequency expansion transceivers 2212 and the second transceivers 2222 may correspond to the second frequency expansion transceivers 2222. The physical pairs 2502 may be established using the differential modes in each of the physical pairs 2302 (e.g., DM1, DM2, DM3, and DM4), and the virtual pair 2204 may be established by according to the SuperMIMO technique, e.g., combining a common mode between each two adjacent physical pairs 2502 (e.g., CM1, CM2) or combining a common mode between two virtual channels (CM3). Thus, the transceivers 2512 may communicate with the second transceivers 2222 via four physical channels that correspond to the physical pairs 2502 and three virtual channels that correspond to the virtual pair 2504.

Figure 26:
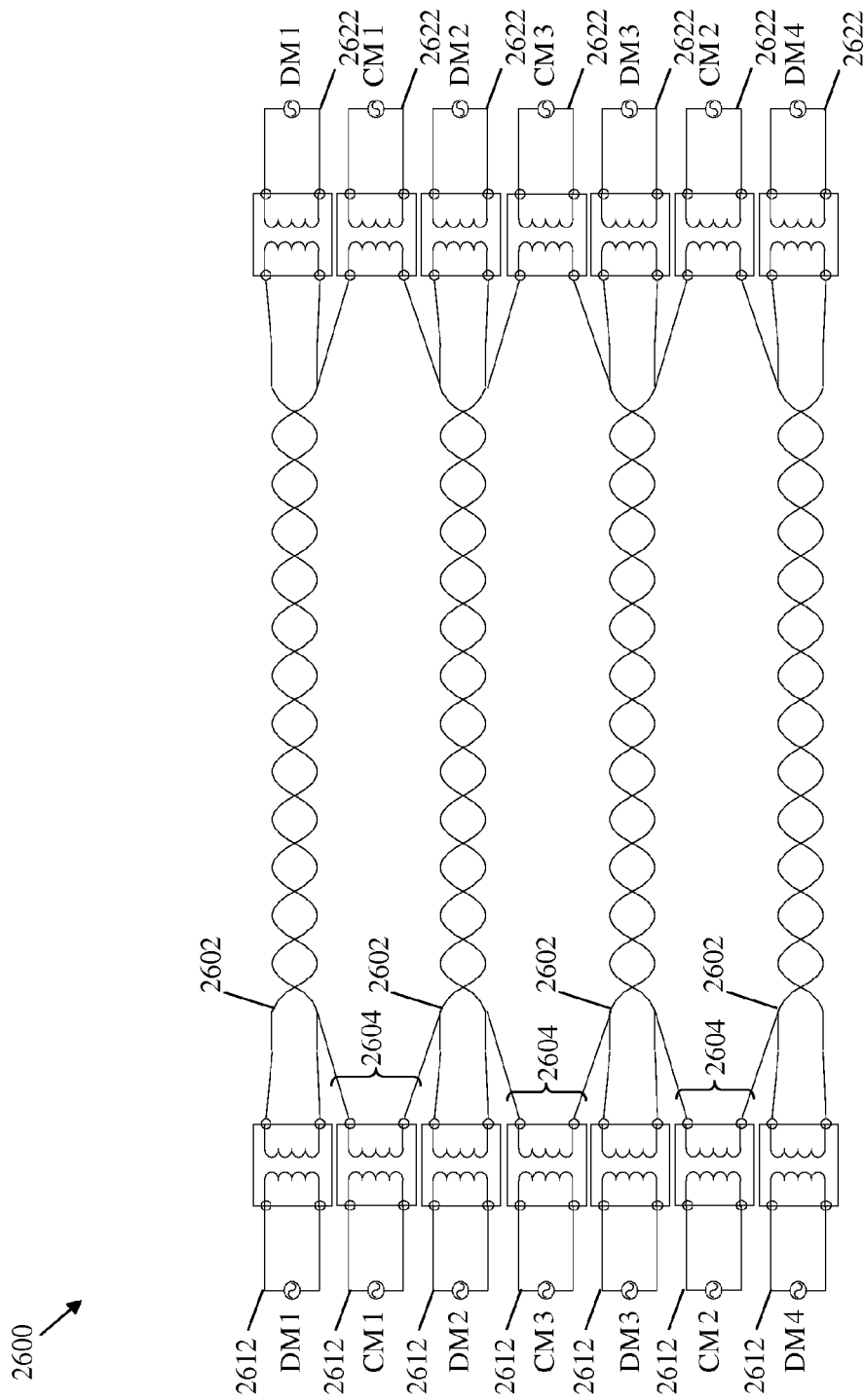
FIG. 26 is a schematic diagram of another embodiment of a multi-pair virtual channel configuration.

FIG. 26 illustrates an embodiment of another multi-pair virtual channel configuration 2600 that may be used in the multi-pair multi-transceiver system 2200. The multi-pair virtual channel configuration 2600 may comprise about seven parallel transceivers 2612 that may be coupled to about seven corresponding second parallel transceivers 2622 via about four physical pairs 2602 and about three virtual pairs 2604. The transceivers 2612 may correspond to the frequency expansion transceivers 2212 and the second transceivers 2622 may correspond to the second frequency expansion transceivers 2222. The physical pairs 2602 may be established using the differential modes in each of the physical pairs 2602 (e.g., DM1, DM2, DM3, and DM4), and the virtual pairs 2604 may be established by combining wires from each adjacent physical pairs 2602 to establish an alternative mode (e.g., AM1, AM2, and AM3). Thus, the transceivers 2612 may communicate with the second transceivers 2622 via four physical channels that correspond to the physical pairs 2602 and three virtual channels that correspond to the virtual pair 2604.

Figure 27:
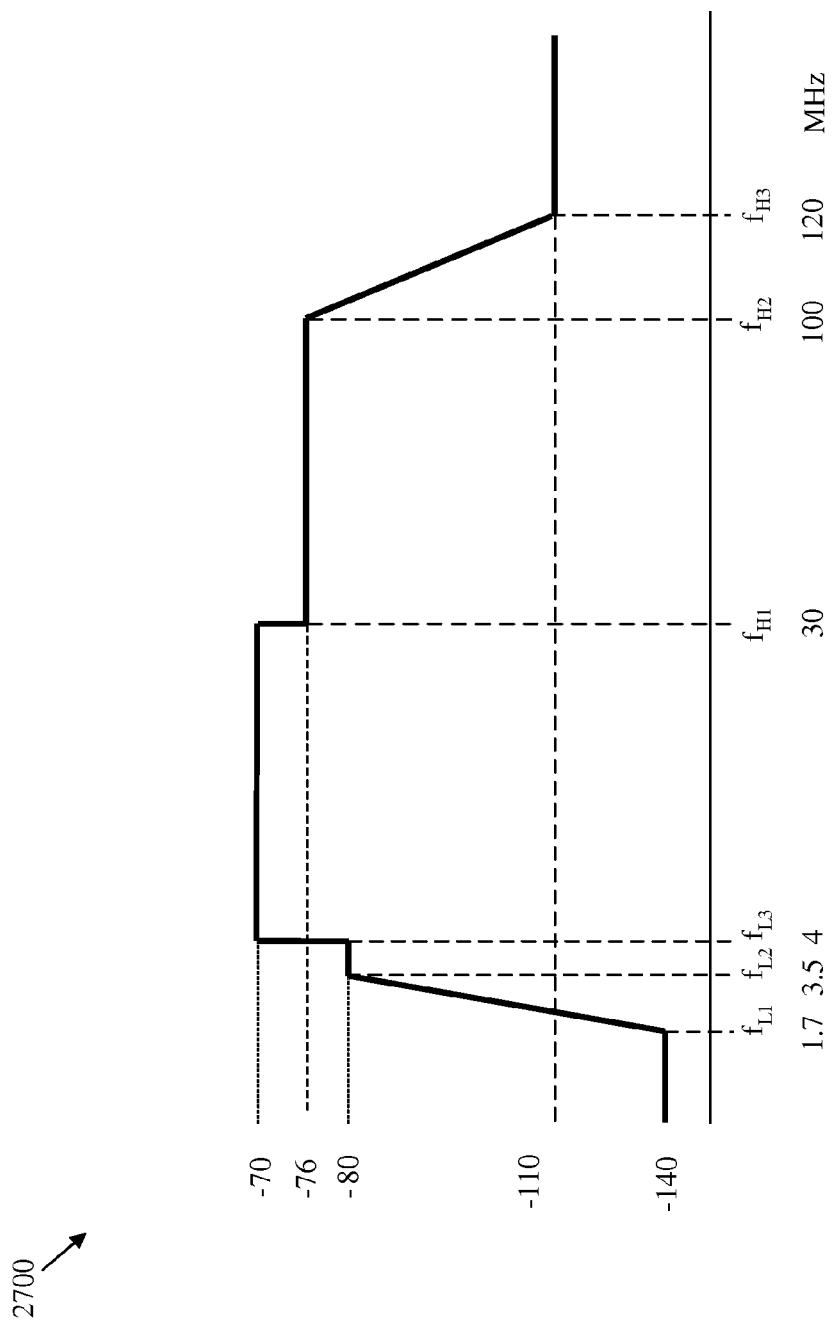
FIG. 27 is a schematic diagram of an embodiment of a phone line signal power spectral density (PSD).

FIG. 27 illustrates an embodiment of a phone line signal PSD 2700. The phone line signal PSD may comprise an advanced ADSL (ADSL2) PSD from about 1.7 MHz ($f_{L1}$) to about 3.5 MHz ($f_{L2}$) or about 4 MHz ($f_{L3}$) and a VDSL2 PSD from about 4 MHz to about 30 MHz ($f_{H1}$). The phone line signal PSD 2700 may also comprise an extended DSL (or VDSL2) PSD from about 30 MHz to about 100 MHz ($f_{H2}$) or about 120 MHz ($f_{H3}$). The extended DSL PSD may be achieved by shifting and combining a plurality of signals that have a VDSL2 PSD (e.g., of about 30 MHz in range) using any of the multi-transceiver schemes described above.

Figure 28:
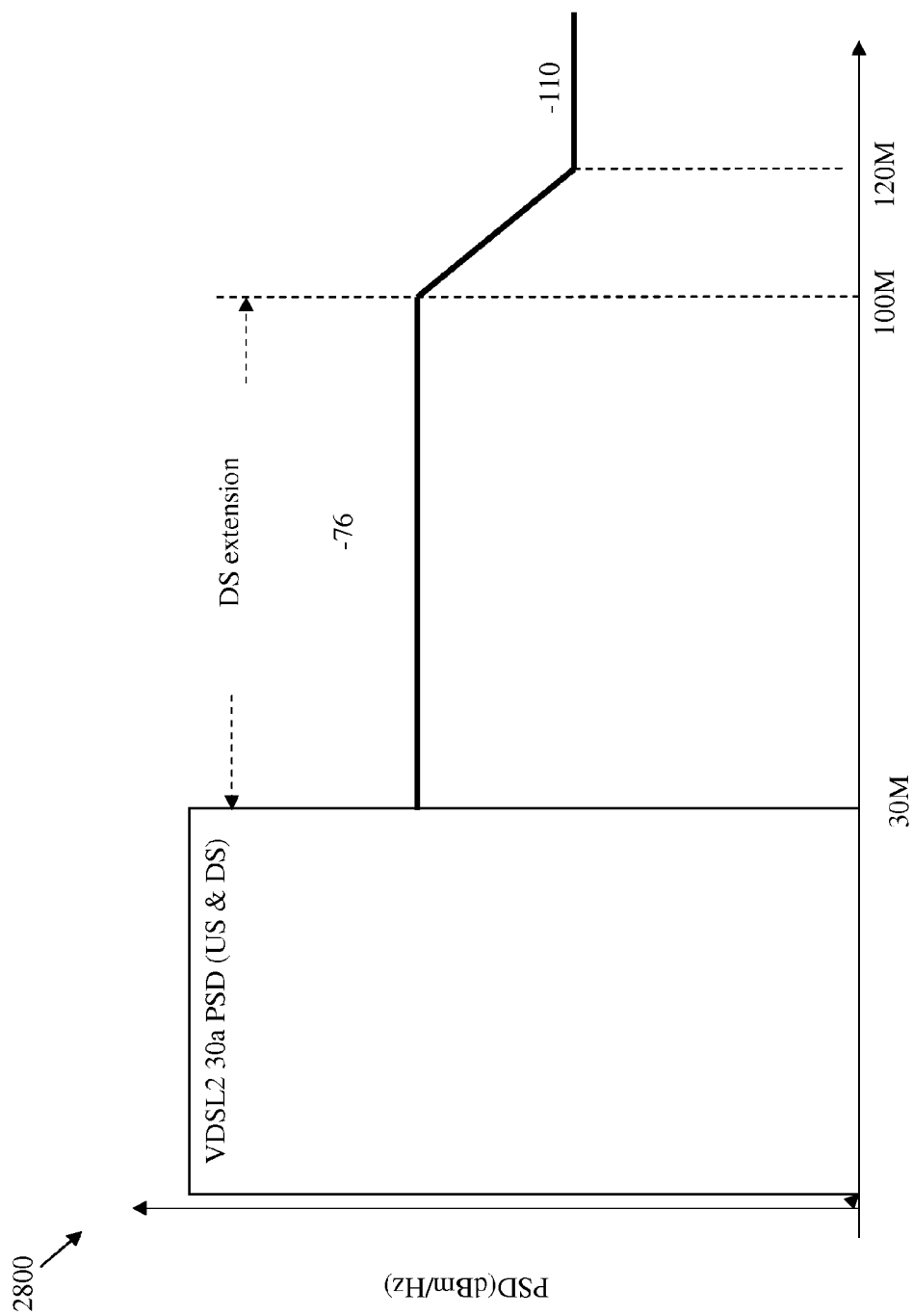
FIG. 28 is a schematic diagram of an embodiment of a DSL signal PSD.

FIG. 28 illustrates an embodiment of a DSL PSD 2800 that may be part of the phone line signal PSD 2700. The DSL PSD may comprise a VDSL2 30a PSD from about zero MHz to about 30 MHz, which may be used for both upstream (US) and downstream (DS) communications. The DSL PSD 2700 may also comprise an extended DSL PSD from about 30 MHz to about 100 MHz or about 120 MHz, which may be achieved by shifting and combining a plurality of signals that have a DSL PSD using any of the multi-transceiver schemes described above.

Figure 29:
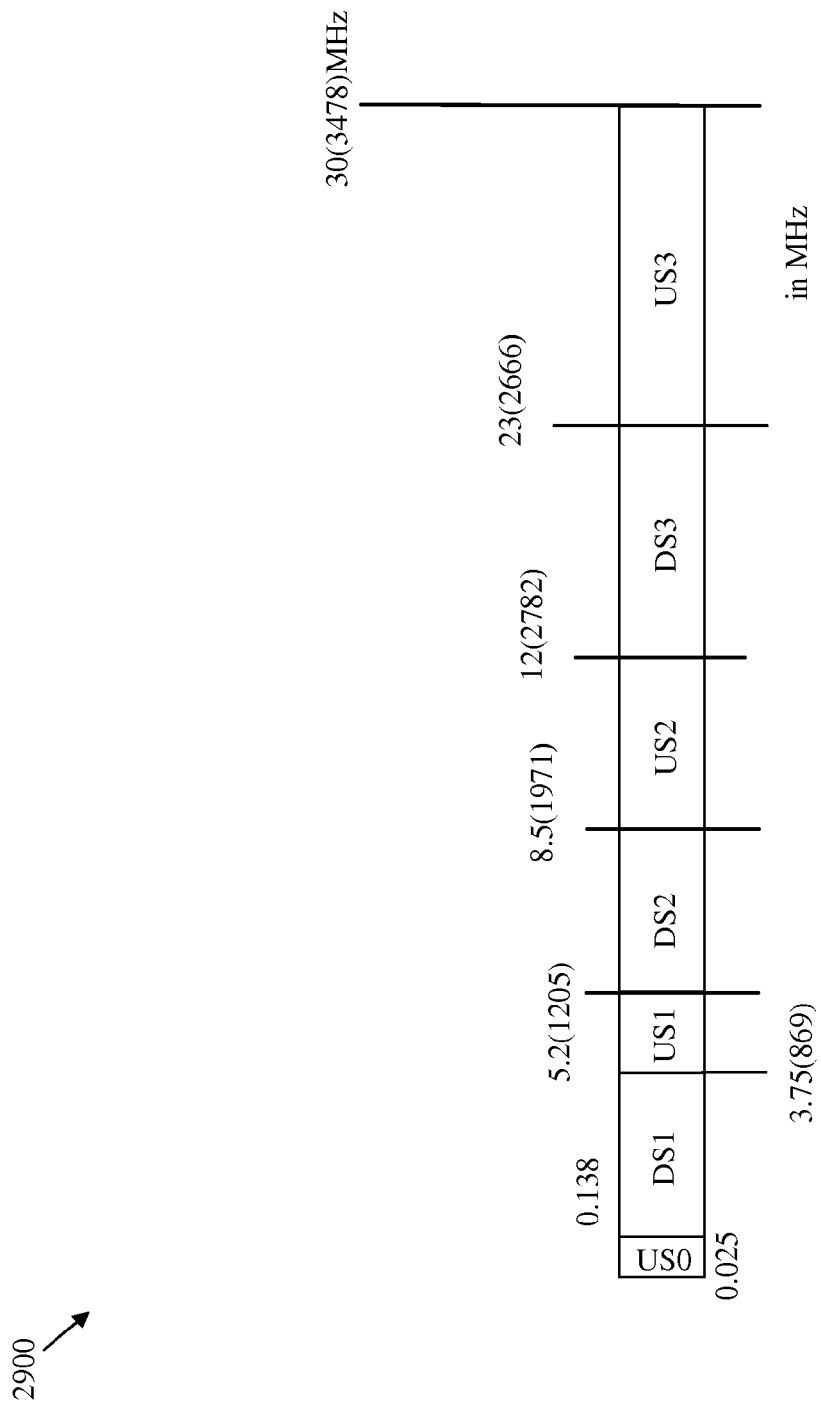
FIG. 29 is a schematic diagram of an embodiment of a DSL bandwidth profile.

FIG. 29 illustrates an embodiment of a DSL bandwidth profile 2900 that may correspond to the VDSL2 PSD in the DSL PSD 2800. The DSL bandwidth profile 2900 may comprise a plurality of US and DS channels that may be arranged in an alternating sequence. The US and DS channels may also increase in bandwidth along the VDSL2 PSD bandwidth profile. For instance, a first US channel (US0) may extend from about 0.025 MHz to about 0.138 MHz, a second US channel (US1) may extend from about 3.75 MHz to about 5.2 MHz, a third US channel (US 2) may extend from about 8.5 MHz to about 12 MHz, and a fourth US channel (US3) may extend from about 23 MHz to about 30 MHz. Additionally, a first DS channel (DS1) may extend from about 0.138 MHz to about 3.75 MHz, a second DS channel (DS2) may extend from about 5.2 MHz to about 8.5 MHz, and a third DS channel (DS3) may extend from about 12 MHz to about 23 MHz.

Figure 30:
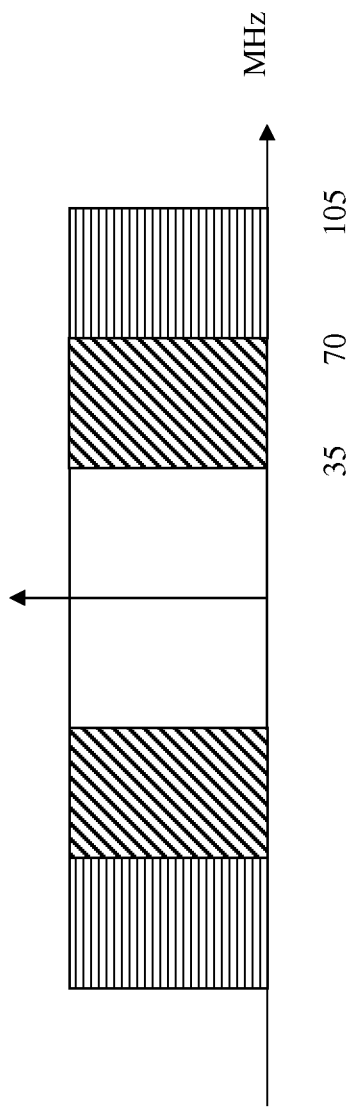
FIG. 30 is a schematic diagram of an embodiment of a DSL signal window.

FIG. 30 illustrates a DSL signal window 3000 that may correspond to the DSL PSD 2800. The DSL signal window 3000 may comprise both a VDSL2 PSD from about zero MHz to about 30 MHz and an extended DSL PSD from about 30 MHz to about 100 MHz. Specifically, the DSL signal window 3000 may comprise about three sub-bands, from about zero MHz to about 30 MHz, from about 30 MHz to about 70 MHz, and from about 70 MHz to about 100 MHz. The three sub-bands may be transmitted and/or received using any of the multi-transceiver schemes described above.

Figure 31:
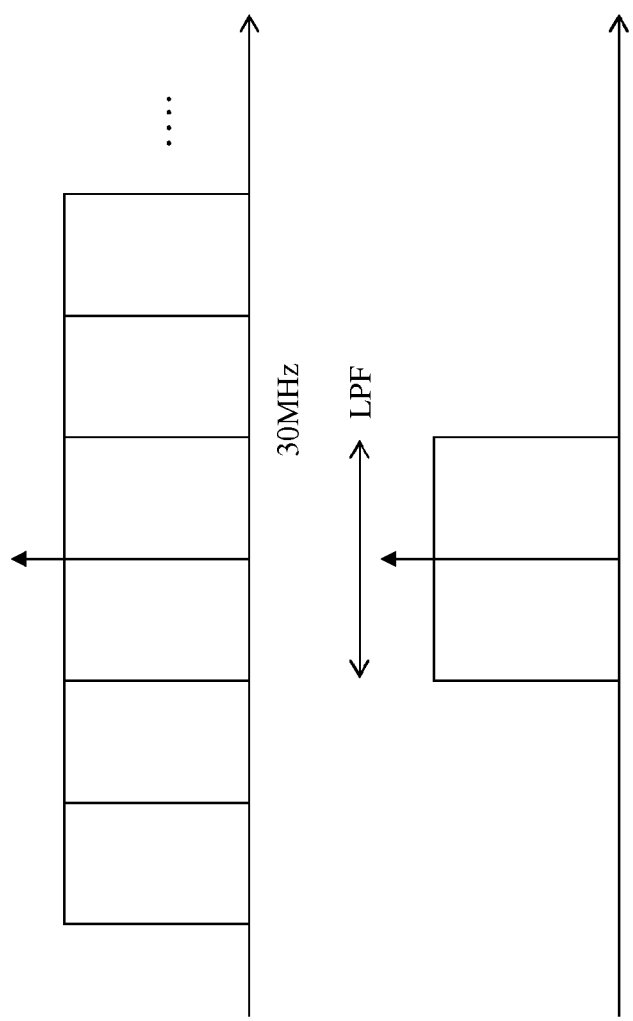
FIG. 31 is a schematic diagram of an embodiment of a DSL signal sub-window.
Figure 32:
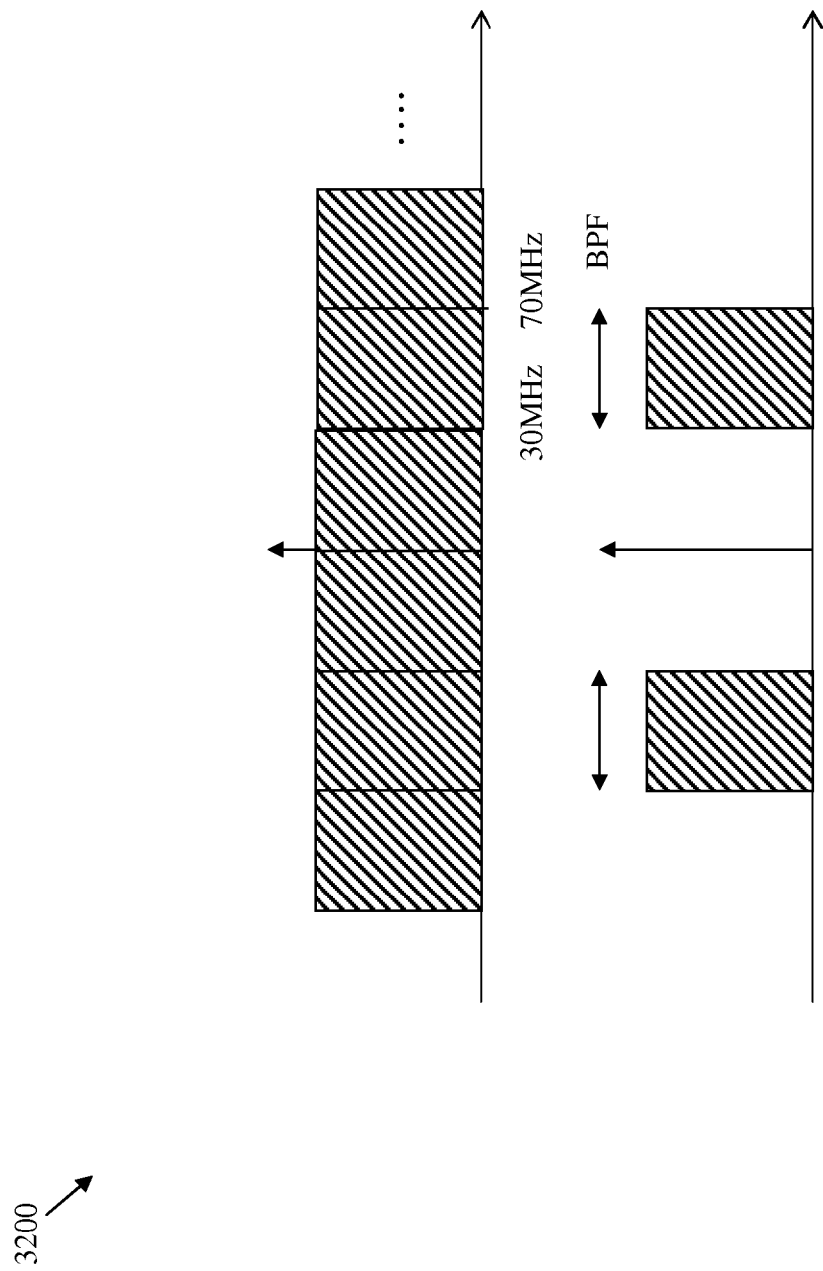
FIG. 32 is a schematic diagram of another embodiment of a DSL signal sub-window.
Figure 33:
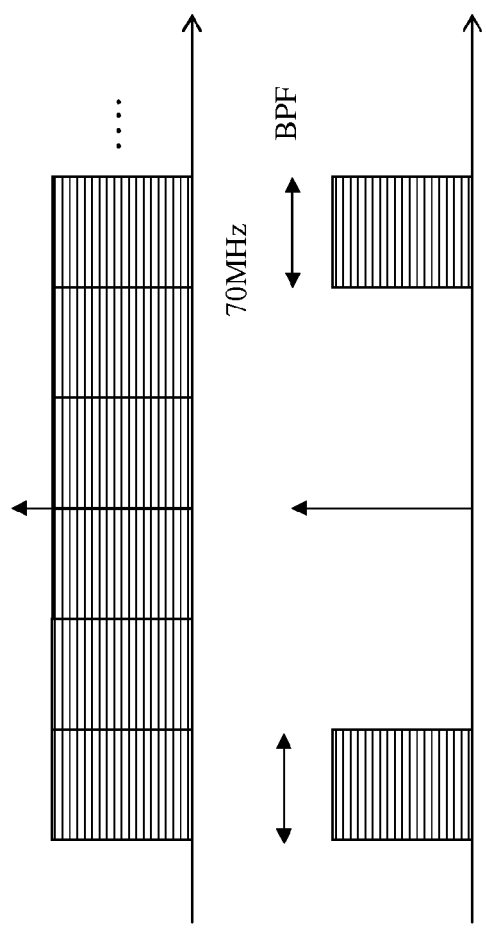
FIG. 33 is a schematic diagram of another embodiment of a DSL signal sub-window.

FIG. 31 illustrates a DSL signal sub-window 3100 that corresponds to a first sub-band of the DSL signal window 3000, e.g., from about zero MHz to about 30 MHz. The DSL signal sub-window 3100 may be filtered from the DSL signal window 3000 (for reception or transmission) using a LPF that only passes frequencies below about 30 MHz. FIG. 32 illustrates another DSL signal sub-window 3200 that corresponds to a second sub-band of the DSL signal window 3000, e.g., from about 30 MHz to about 70 MHz. The DSL signal sub-window 3200 may be filtered from the DSL signal window 3000 (for reception or transmission) using a BPF that only passes frequencies between about 30 MHz and about 70 MHz. FIG. 33 illustrates another DSL signal sub-window 3300 that corresponds to a third sub-band of the DSL signal window 3000, e.g., from about 70 MHz to about 100 MHz. The DSL signal sub-window 3300 may be filtered from the DSL signal window 3000 (for reception or transmission) using a BPF that only passes frequencies between about 70 MHz and about 100 MHz. Alternatively, the DSL signal sub-window 3300 may be filtered from the DSL signal window 3000 using a HPF that only passes frequencies above about 70 MHz.

Figure 34:
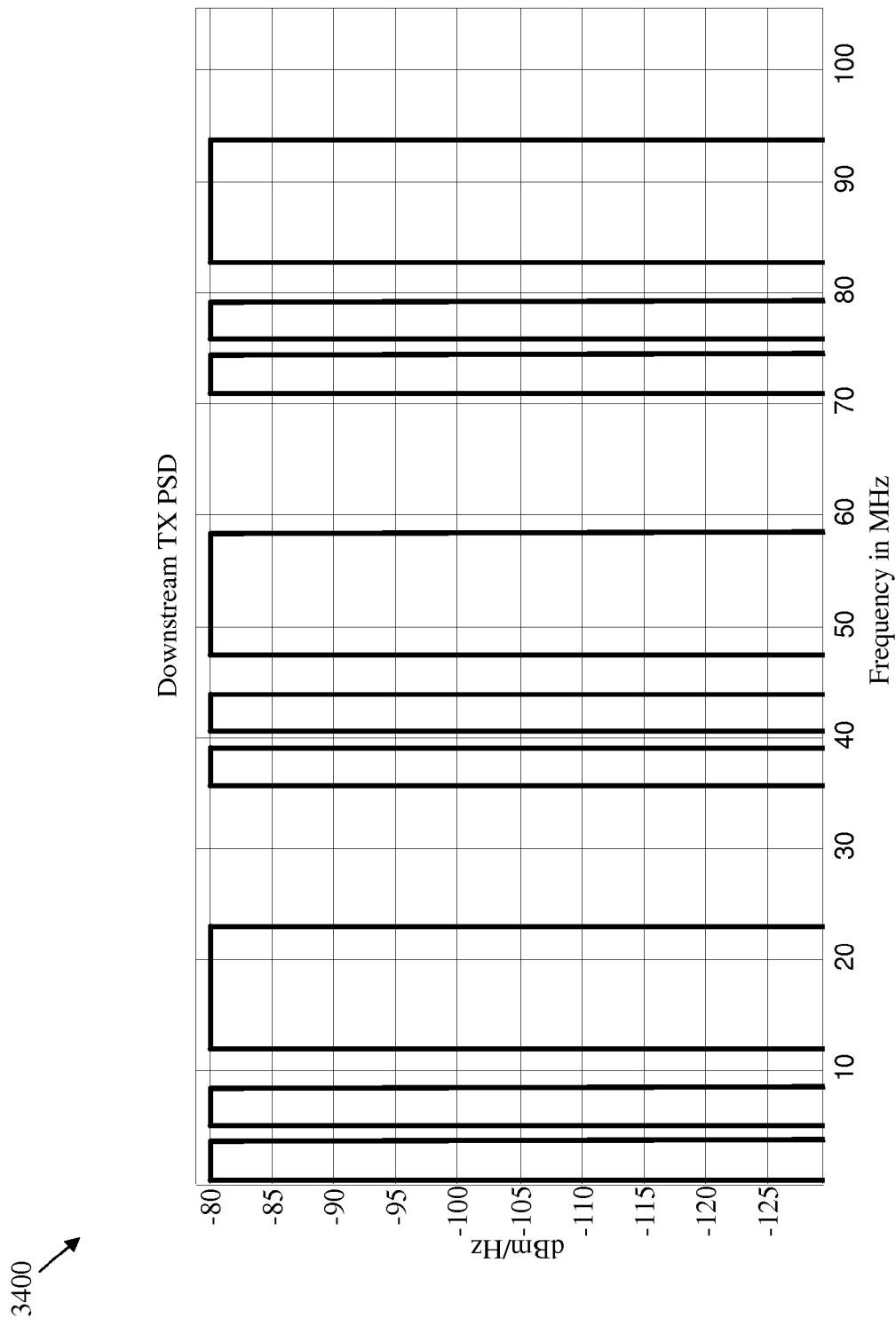
FIG. 34 is a chart of a DSL downstream transmission PSD.

FIG. 34 illustrates a DSL downstream transmission PSD 3400, that may correspond to the DSL PSD 2800. The DSL downstream transmission PSD 3400 may comprise a plurality of DS channels that may be separated by US channels and/or band guards (not shown). The DS channels may have varying bandwidths along the DSL downstream transmission PSD. For instance, about three separate DS channels may extend in a first sub-band between about zero MHz and about 30 MHz, about three other separate DS channels may extend in a second sub-band between about 30 MHz and about 70 MHz, and about three additional separate DS channels may extend in a third sub-band between about 70 MHz and about 100 MHz.

Figure 35:
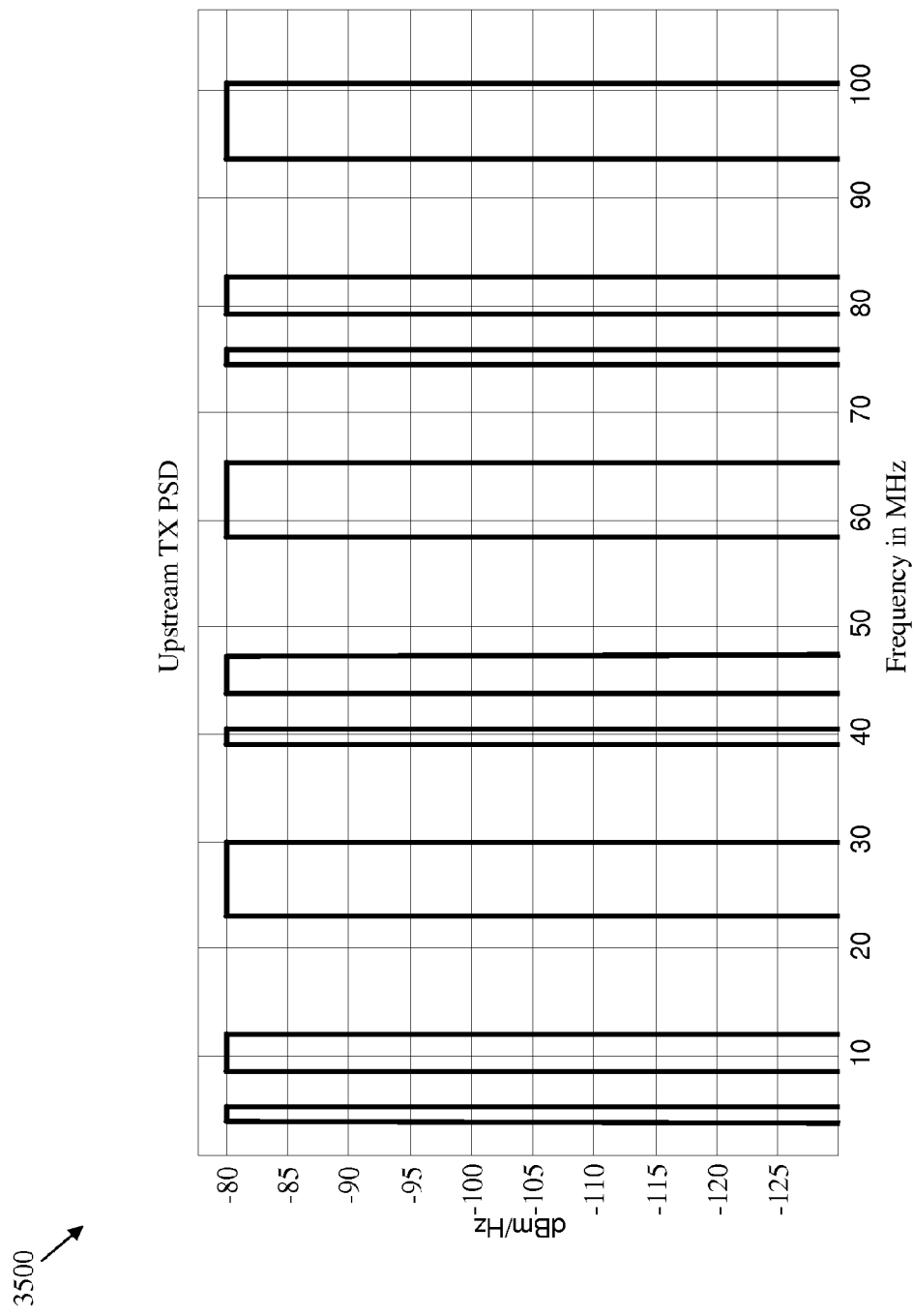
FIG. 35 is a chart of a DSL upstream transmission PSD.

FIG. 35 illustrates a DSL upstream transmission PSD 3500, that may correspond to the DSL PSD 2800. The DSL upstream transmission PSD 3500 may comprise a plurality of US channels that may be separated by the DS channels above and/or band guards (not shown). The US channels may have varying bandwidths along the DSL upstream transmission PSD 3500. For instance, about three separate US channels may extend in a first sub-band between about zero MHz and about 30 MHz, about three other separate US channels may extend in a second sub-band between about 30 MHz and about 70 MHz, and about three additional separate US channels may extend in a third sub-band between about 70 MHz and about 100 MHz.

The DSL downstream transmission PSD 3400 and DSL upstream transmission PSD 3500 were used in computer simulations to study the resulting or achieved data rates. Some of assumptions and parameters of the computer simulations include:

Single pair and single port;
Tone spacing=24.4140625 kHz and FFT size=4096;
Symbol Rate=Tone spacing×16/17 (1/16 CE);
US and DS PSD in 0-30 MHz is the same as VDSL2 30a profile with reduced PSD, and it is duplicated twice at 35.328 MHz and at 70.636 MHz;
Effect of echo at CPE receiver has been considered;
0.5 mm European Telecommunications Standards Institute (ETSI) loop models extended to 100 MHz (and higher) and used;
5 decibel (dB) net coding gain assumed;
6 dB Target Margin and signal to noise ratio (SNR) Gap=9.8 dB (1e-7 bit error rate (BER));
Additive White Gaussian Noise (AWGN)=−140 dB meter (dBm)/Hz added (only);
Total Transmission Power=less than 0 dBm;
Bi_Max=15;
DAC+LD Signal to noise and distortion ratio (SNDR) assumed to be 67 dB over 100 MHz band;
ADC SNDR is 70 dB over 100 MHz; and
Downstream, upstream and aggregate achievable data rates are shown (Line Rate minus the coding overheads).

Figure 36:
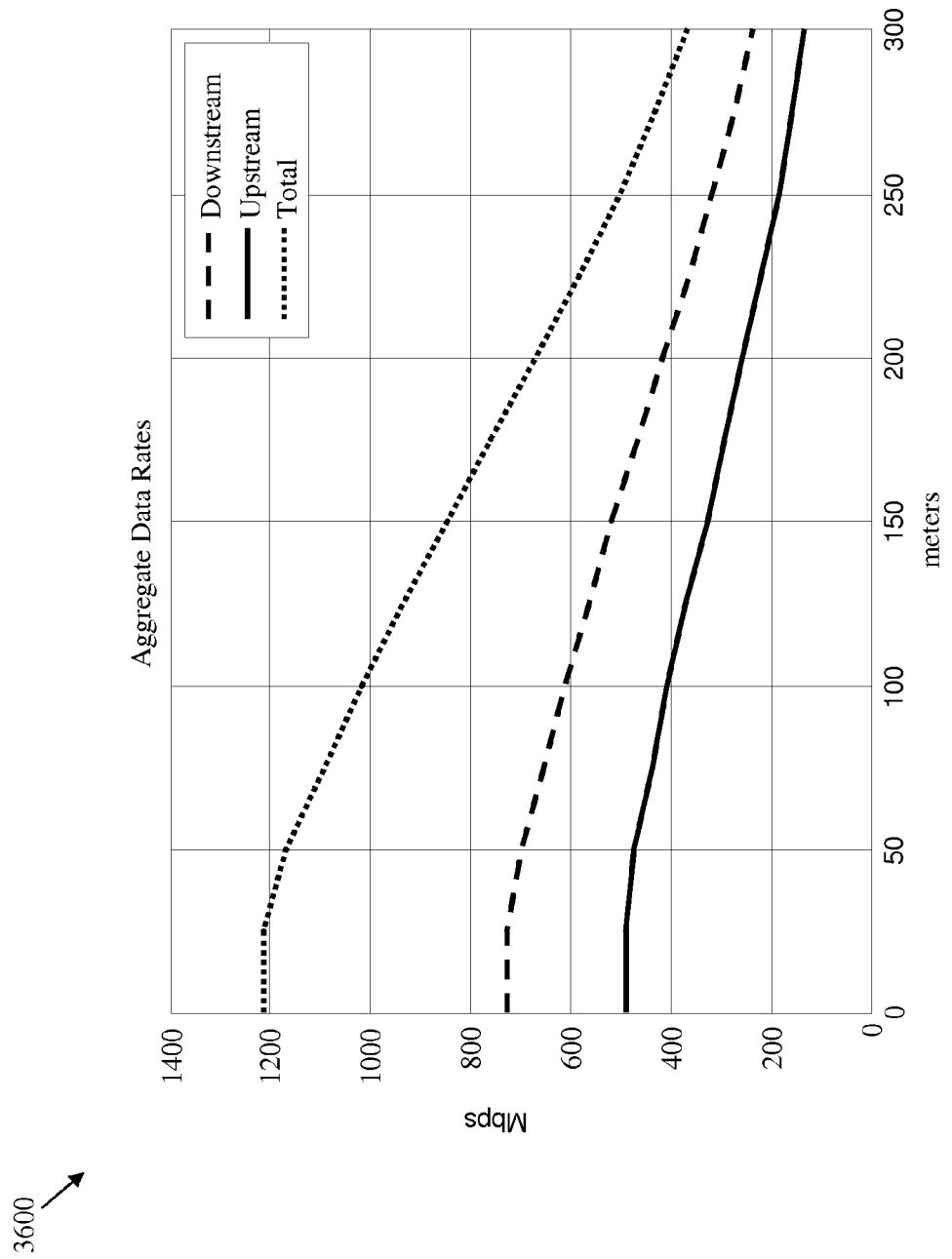
FIG. 36 is a chart of a plurality of DSL data rates.

FIG. 36 is a chart of a plurality of DSL data rates 3600 that were achieved using the DSL downstream transmission PSD 3400 and DSL upstream transmission PSD 3500 in the computer simulations. The data rates are shown (in mega bits per second (mbps)) for a range of loop (wire) distances (in meters) for US transmissions, DS transmissions, and the combination of US and DS transmissions (total transmissions). As shown, the data rates for US, DS, and total transmissions decrease as the loop distance increases (from about zero meters to about 300 meters). For instance, at about 200 meters loop distance, the data rates for downstream transmissions and upstream transmissions are about 400 mbps and about 200 mbps, respectively.

Figure 37:
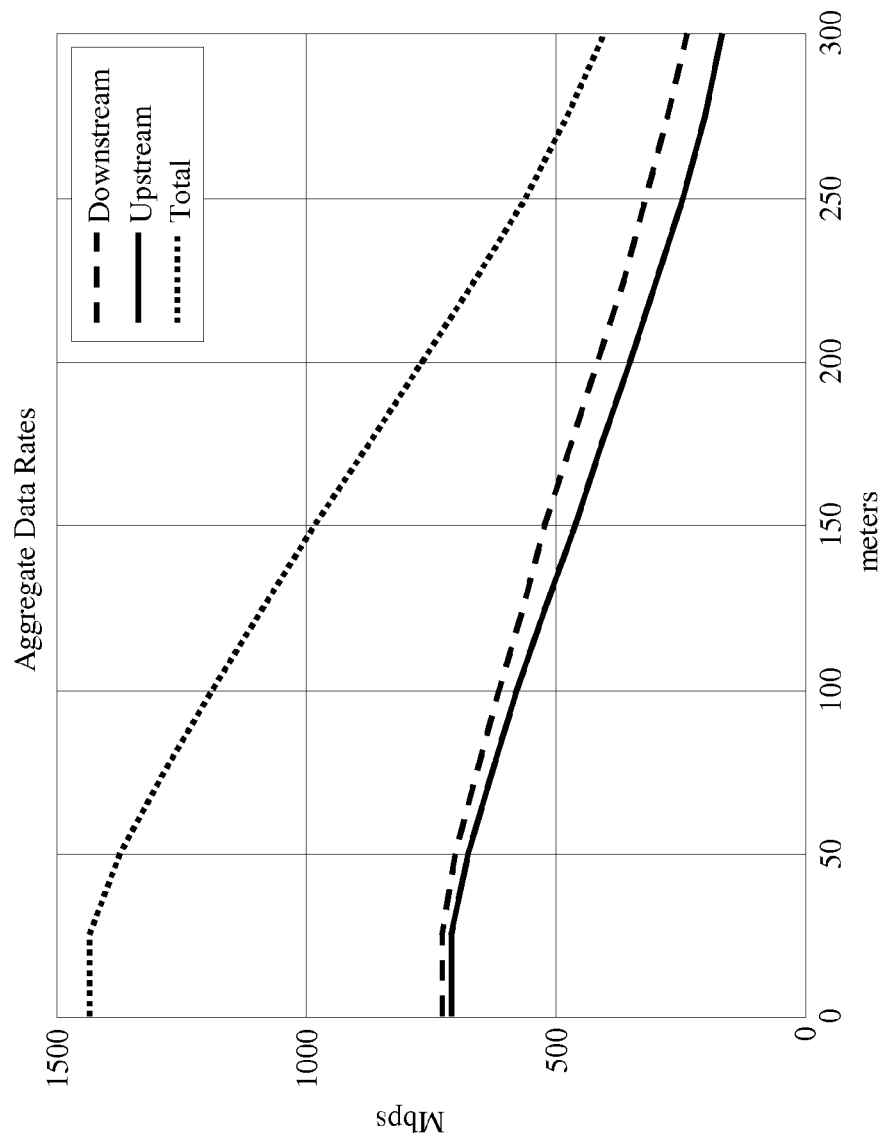
FIG. 37 is a chart of a plurality of other DSL data rates.

The computer simulations above were repeated by extending the sub-bands from about 30 MHz range to about 35.328 MHz range. FIG. 37 is another chart of DSL data rates 3600 that were achieved using the DSL downstream transmission PSD 3400, the DSL upstream transmission PSD 3500, and the extended sub-bands. The data rates are shown (in mbps) for the same range of loop distances (0-300 meters) for US transmissions, DS transmissions, and total transmissions.

Similar to the DSL data rates 3600, the DSL data rates 3700 for US, DS, and total transmissions decrease as the loop distance increases. However, the data rates for US transmissions may improve in comparison to the case above. For instance, at about 200 meters distance, the data rates for downstream transmissions and similarly upstream transmissions are close to about 400 MHz.

Figure 38:
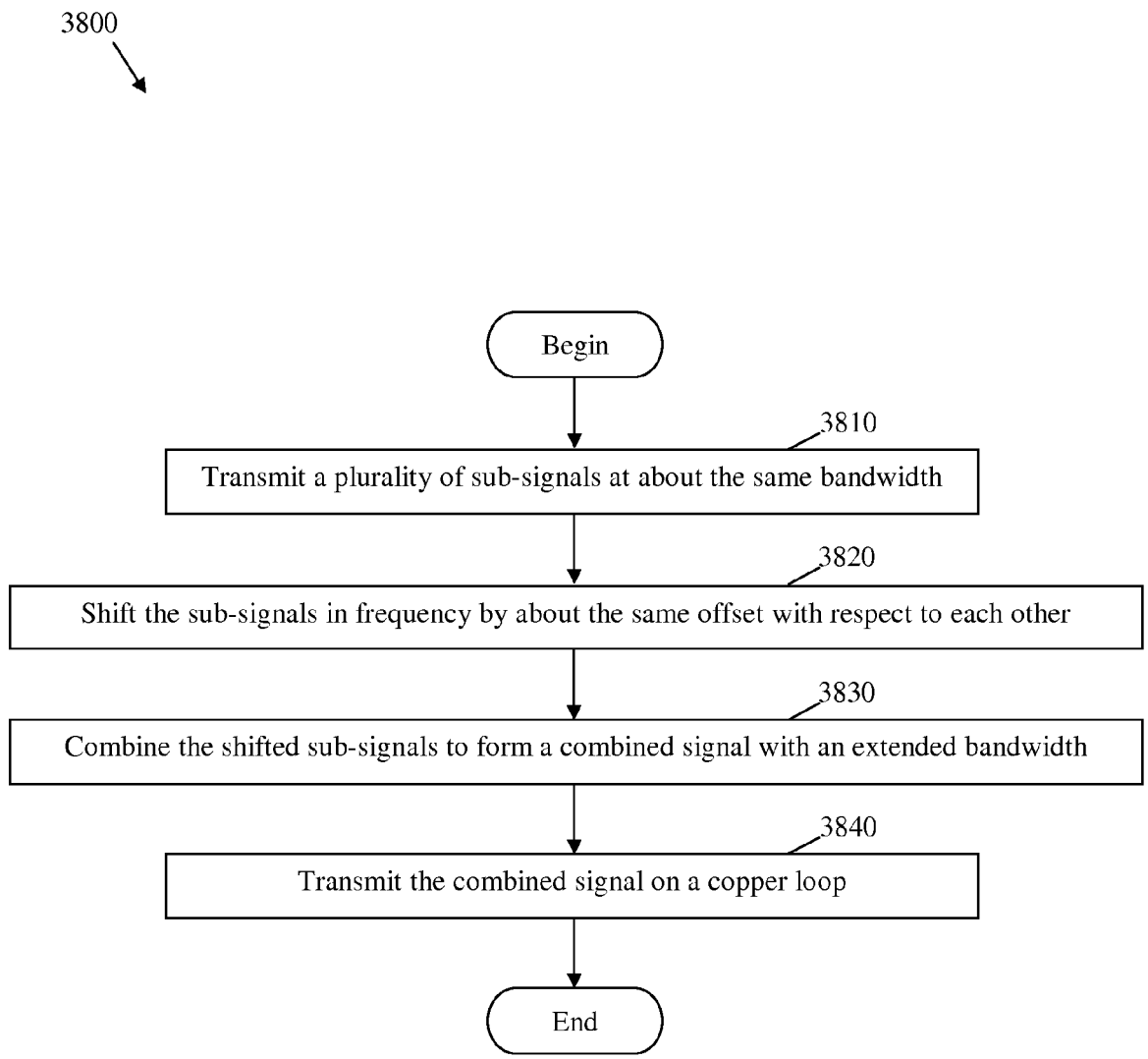
FIG. 38 is a flowchart of an embodiment of a gigabit DSL transmissions method.

FIG. 38 illustrates an embodiment of a GDSL transmissions method 3800 that may be used to extend the bandwidth and thus the data rates of DSL signals. The GDSL transmissions method 3800 may be implemented for relatively shorter loop distances (e.g., less than or equal to about 200 meters) and using any of the multi-transceiver schemes described above. The GDSL transmission method 3800 may comprise shifting and combining a plurality of sub-signals from a plurality of parallel transmitters, which may have about the same sub-bands or bandwidth, e.g., of about 30 MHz or about 35 MHz in range.

The GDSL transmissions method 3800 may begin at step 3810, where a plurality of sub-signals may be transmitted at about the same bandwidth. For example, a VDSL2 based multi-transceiver may transmit about three sub-signals that range from about 0 MHz to about 30 MHz using about three parallel transmitters, such as in the multi-transceiver 110 or 210. At block 3820, the sub-signals may be shifted in frequency by an integer multiples of about the same offset. Thus, each sub-signal may still have about the same bandwidth range but at shifted frequencies. The sub-signals may be shifted in analog domain, such as using the combiner 314, in digital domain, such as using the combiner 814, or in frequency domain, such using the combiner 1514. At block, 3830, the shifted sub-signals may be combined to form a combined signal with an extended bandwidth, e.g., of about 100 MHz or about 120 MHz in range. The shifted sub-signals may be combined in analog domain, such as using the combiner 314, in digital domain, such as using the combiner 814, or in frequency domain, such using the combiner 1514. At block 3840, the combined signal may be transmitted on a copper loop. The method 3800 may then end.

A similar method may be implemented on the receiver side, e.g., in a corresponding multi-transceiver, such as the second multi-transceiver 120 or 220. For instance, the method on the receiver side may comprise receiving the combined signal, splitting the combined signal into the shifted sub-signals, reverse shifting the signals into the same bandwidth, and detecting each sub-signal via a corresponding receiver. Similar to the method 3800, splitting the combined signal and reverse shifting the sub-signals may be implemented in analog domain, digital domain, or frequency domain.

Figure 39:
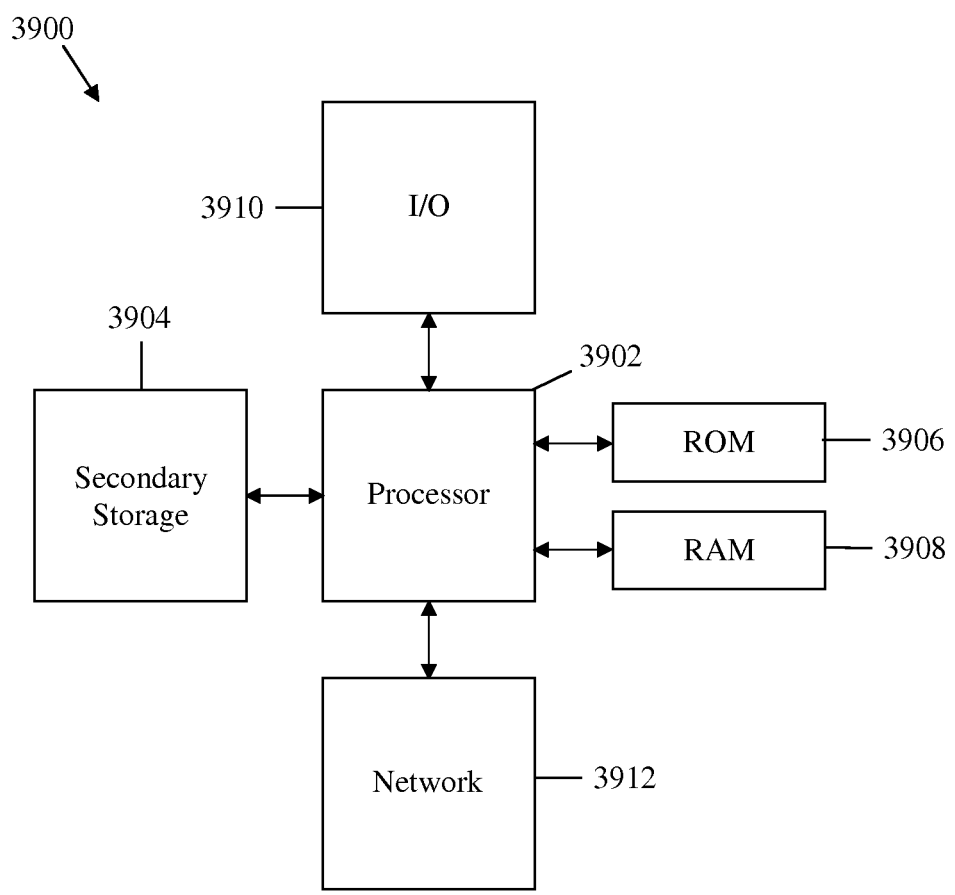
FIG. 39 is a schematic diagram of one embodiment of a general-purpose computer system.

The components described above may be operated in conjunction with any general-purpose network component, such as a computer or network component with sufficient processing power, memory resources, and network throughput capability to handle the necessary workload placed upon it. FIG. 39 illustrates a typical, general-purpose network component 3900 suitable for implementing one or more embodiments of the components disclosed herein. The network component 3900 may include a processor 3902 (which may be referred to as a central processor unit or CPU) that is in communication with any memory devices including secondary storage 3904, read only memory (ROM) 3906, random access memory (RAM) 3908, input/output (I/O) devices 3910, and network connectivity devices 3912, or combinations thereof. The processor 3902 may be implemented as one or more CPU chips, or may be part of one or more application specific integrated circuits (ASICs).

The secondary storage 3904 is typically comprised of one or more disk drives or tape drives and is used for non-volatile storage of data and as an over-flow data storage device if RAM 3908 is not large enough to hold all working data. Secondary storage 3904 may be used to store programs that are loaded into RAM 3908 when such programs are selected for execution. The ROM 3906 is used to store instructions and perhaps data that are read during program execution. ROM 3906 is a non-volatile memory device that typically has a small memory capacity relative to the larger memory capacity of secondary storage 3904. The RAM 3908 is used to store volatile data and perhaps to store instructions. Access to both ROM 3906 and RAM 3908 is typically faster than to secondary storage 3904.

Although described primarily with reference to DSL, copper wires, and copper loops, those skilled in the art will recognize that other variations, combinations, and/or modifications of the embodiment(s) are possible without departing from the scope and spirit of the present disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
a plurality of parallel digital signal transmitters that each receive one of a plurality of digital sub-signals wherein each of the plurality of digital signal transmitters is configured to transmit one of the plurality of digital sub-signals that each have about the same bandwidth; and
a combiner coupled to the transmitters and configured to shift some of the plurality of digital sub-signals and to combine the plurality of shifted digital sub-signals into a combined digital signal that has a total bandwidth of the plurality of digital sub-signals, wherein the total bandwidth of the combined digital signal is approximately equal to the sum of the bandwidths of the plurality of digital sub-signals;
wherein the total bandwidth comprises a plurality of shifted bandwidths of the plurality of digital sub-signals at about the same offset with respect to each other,
wherein the combined digital signal is transmitted over a digital subscriber loop, and
wherein the digital signal transmitters are coupled to a plurality of second parallel digital signal receivers via N physical pairs of electrically conducting wires, where N is an integer, and wherein 2N−1 pairs of electrically conducting wires comprise N pairs of physical wires using a regular differential mode and up to N−1 virtual pairs using a common mode or an alternative mode.

2. The apparatus of claim 1, wherein the bandwidth of the signals transmitted form the digital signal transmitters ranges from about zero hertz (Hz) to about 30 MHz or from about zero hertz (Hz) to about 35 MHz.

3. The apparatus of claim 1, wherein the offset between the shifted bandwidths is equal to about 30 megahertz (MHz) or about 35 megahertz (MHz).

4. The apparatus of claim 1, wherein the quantity of digital signal transmitters is equal to n, where n is an integer, and wherein the digital signal transmitters are Very High Speed Digital Subscriber Line (VDSL2) transmitters.

5. The apparatus of claim 1, wherein the shifted bandwidths of the digital sub-signals comprise a first sub-band that ranges from about zero megahertz (MHz) to about 30 MHz or about 35 MHz and one or more additional sub-bands wherein a kth additional sub-band ranges from about k*35 MHz to about k*35+30 MHz or about k*35+35 MHz, where k is a positive integer.

6. An apparatus comprising:
a plurality of parallel digital signal transmitters that each receive one of a plurality of digital sub-signals wherein each of the plurality of digital signal transmitters is configured to transmit one of the plurality of digital sub-signals that each have about the same bandwidth; and a combiner coupled to the transmitters and configured to shift some of the plurality of digital sub-signals and to combine the plurality of shifted digital sub-signals into a combined digital signal that has a total bandwidth of the plurality of digital sub-signals, wherein the total bandwidth of the combined digital signal is approximately equal to the sum of the bandwidths of the plurality of digital sub-signals, wherein the total bandwidth comprises a plurality of shifted bandwidths of the plurality of digital sub-signals at about the same offset with respect to each other, wherein the combined digital signal is transmitted over a digital subscriber loop, and wherein the combiner is an analog domain based combiner that comprises:

a plurality of parallel mixers coupled to some of the digital signal transmitters;

a plurality of parallel high pass filters (HPFs) coupled to the mixers; and an adder coupled to the HPFs and to one of the digital signal transmitters that is not coupled to a mixer and a HPF, wherein the quantity of mixers and similarly the quantity of HPFs is less than the quantity of digital signal transmitters by one.

7. An apparatus comprising:
a plurality of parallel digital signal transmitters that each receive one of a plurality of digital sub-signals wherein each of the plurality of digital signal transmitters is configured to transmit one of the plurality of digital sub-signals that each have about the same bandwidth; and a combiner coupled to the transmitters and configured to shift some of the plurality of digital sub-signals and to combine the plurality of shifted digital sub-signals into a combined digital signal that has a total bandwidth of the plurality of digital sub-signals, wherein the total bandwidth of the combined digital signal is approximately equal to the sum of the bandwidths of the plurality of digital sub-signals, wherein the total bandwidth comprises a plurality of shifted bandwidths of the plurality of digital sub-signals at about the same offset with respect to each other, wherein the combined digital signal is transmitted over a digital subscriber loop, and wherein the combiner is a digital domain based combiner that comprises:

a plurality of parallel analog-to-digital converters (ADCs) coupled to some of the digital signal transmitters;

a plurality of parallel interpolator and low pass filter (LPF) blocks coupled to the ADCs;

a plurality of parallel mixer and high pass filter (HPF) blocks coupled to the interpolator and LPF blocks;

an adder coupled to the mixer and HPF blocks;

a digital-to-analog converter (DAC) coupled to the adder; and a second adder coupled to the DAC and one of the digital signal transmitters that is not coupled to an ADC, an interpolator and LPF block, and a mixer and HPF block, wherein the quantity of ADCs, the quantity of interpolator and LPF blocks, and similarly the quantity of mixer and HPF blocks is less than the quantity of signal transmitters by one.

8. An apparatus comprising:
a plurality of parallel digital signal transmitters that each receive one of a plurality of digital sub-signals wherein each of the plurality of digital signal transmitters is configured to transmit one of the plurality of digital sub-signals that each have about the same bandwidth; and a combiner coupled to the transmitters and configured to shift some of the plurality of digital sub-signals and to combine the plurality of shifted digital sub-signals into a combined digital signal that has a total bandwidth of the plurality of digital sub-signals, wherein the total bandwidth of the combined digital signal is approximately equal to the sum of the bandwidths of the plurality of digital sub-signals, wherein the total bandwidth comprises a plurality of shifted bandwidths of the plurality of digital sub-signals at about the same offset with respect to each other, wherein the combined digital signal is transmitted over a digital subscriber loop, and wherein the combiner is a frequency domain based combiner that comprises:

a plurality of parallel cyclic extension (CE) discard blocks coupled to the digital signal transmitters;

a plurality of parallel Fast Fourier Transform (FFT) blocks coupled to the CE discard blocks;

a plurality of parallel tone up-shift blocks coupled to some of the FFT blocks;

a tone combiner coupled to the tone up-shift blocks and to one of the FFT blocks that is not coupled to a tone up-shift block;

an inverse FFT (IFFT) and CE insertion block coupled to the tone combiner;

a digital-to-analog converter (DAC) coupled to the IFFT and CE insertion block; and a filter and line driver (LD) block coupled to the DAC, wherein the quantity of tone up-shift blocks is less than the quantity of digital signal transmitters by one.

9. A method comprising:
transmitting a plurality of digital sub-signals at about the same bandwidth;

shifting the digital signals in frequency such that each of the plurality of digital sub-signals comprises a different bandwidth and an offset between successive shifted digital sub-signals is about the same with respect to other successive shifted digital sub-signals;

combining the shifted digital sub-signals to form a combined digital signal that has an extended bandwidth; and transmitting the combined digital signal over a digital subscriber loop, wherein a first sub-band of a first digital signal of the combined DSL signal is filtered using a low pass filter (LPF) that passes frequencies below about 30 megahertz (MHz), a second sub-band of a second digital signal of the combined DSL signal is filtered using a band pass filter (BPF) that passes frequencies between about 35 MHz and about 70 MHz, and a third sub-band of a third digital signal of the combined digital signal is filtered using a high pass filter (HPF) that passes frequencies above about 70 MHz.

10. The method of claim 9, wherein each of the digital signals comprises a plurality of upstream and downstream channels in an alternating sequence.

11. The method of claim 9, wherein the bandwidth of the digital signals corresponds to a Very High Speed Digital Subscriber Line (VDSL2) power spectral density (PSD) from about zero Hertz (Hz) to about 30 MHz, and wherein the extended bandwidths comprises the VDSL2 PSD and an extended DSL PSD from about 30 MHz to about 100 MHz or higher.

12. The method of claim 9, wherein the combined digital signal is received on a receiver side and split into the shifted digital sub-signals, and wherein each of the shifted digital sub-signals is reversed shifted and then detected by a corresponding digital signal receiver.

* * * * *